US012574829B2

(12) United States Patent
Yang et al.

(10) Patent No.: US 12,574,829 B2
(45) Date of Patent: Mar. 10, 2026

(54) ACCESS CONTROL METHOD AND COMMUNICATIONS APPARATUS

(71) Applicant: HUAWEI TECHNOLOGIES CO., LTD., Shenzhen (CN)

(72) Inventors: Chenchen Yang, Ottawa (CA); Huan Li, Shenzhen (CN); Feng Han, Shanghai (CN); Yinghao Jin, Boulogne Billancourt (FR)

(73) Assignee: Huawei Technologies Co., LTD., Shenzhen (CN)

( * ) Notice: Subject to any disclaimer, the term of this patent is extended or adjusted under 35 U.S.C. 154(b) by 453 days.

(21) Appl. No.: 17/735,738

(22) Filed: May 3, 2022

(65) Prior Publication Data

US 2022/0264435 A1     Aug. 18, 2022

Related U.S. Application Data

(63) Continuation of application No. PCT/CN2019/116891, filed on Nov. 8, 2019.

(51) Int. Cl.
*H04W 4/00*          (2018.01)
*H04W 48/08*        (2009.01)
(Continued)

(52) U.S. Cl.
CPC .......... *H04W 48/16* (2013.01); *H04W 48/08* (2013.01); *H04W 76/18* (2018.02); *H04W 76/30* (2018.02); *H04W 84/042* (2013.01)

(58) Field of Classification Search
None
See application file for complete search history.

(56) References Cited

U.S. PATENT DOCUMENTS

2006/0268907 A1     11/2006  Lee et al.
2020/0329422 A1*    10/2020  Sirotkin ................ H04W 48/18

FOREIGN PATENT DOCUMENTS

CN          106572508 A       4/2017
CN          110213808 A       9/2019
(Continued)

OTHER PUBLICATIONS

3GPP TS 23.501 V15.6.0 (Jun. 2019), "3rd Generation Partnership Project; Technical Specification Group Services and System Aspects; System Architecture for the 5G System; Stage 2 (Release 15)," Jun. 2019, 243 pages.

(Continued)

*Primary Examiner* — Zewdu A Beyen
(74) *Attorney, Agent, or Firm* — Fish & Richardson P.C.

(57)          ABSTRACT

Example access control methods and apparatus are described. One example method includes receiving an initial user equipment (UE) message by a core network device from an access network device. The core network device sends an initial context setup request message to the access network device, where the initial context setup request message includes one or more of the following information: public network integrated non-public network (PNI-NPN) identification information of a PNI-NPN accessible by a terminal device, a public land mobile network (PLMN) identity of a PLMN accessible by the terminal device, or an indication of whether the terminal device is allowed to access a network only by using a closed access group (CAG) cell.

11 Claims, 16 Drawing Sheets

(51) Int. Cl.
| | | |
|---|---|---|
| *H04W 48/16* | (2009.01) | |
| *H04W 76/18* | (2018.01) | |
| *H04W 76/30* | (2018.01) | |
| H04W 84/04 | (2009.01) | |

(56) References Cited

FOREIGN PATENT DOCUMENTS

| | | | |
|---|---|---|---|
| EP | 4017155 A1 | 6/2022 | |
| WO | WO-2020100053 A1 * | 5/2020 | ........... H04W 76/19 |
| WO | 2021066171 A1 | 4/2021 | |

OTHER PUBLICATIONS

3GPP TS 38.300 V15.7.0 (Sep. 2019), "3rd Generation Partnership Project; Technical Specification Group Radio Access Network; NR; NR and NG-RAN Overall Description; Stage 2 (Release 15)," Sep. 2019, 99 pages.
3GPP TS 38.413 V15.5.0 (Sep. 2019), "3rd Generation Partnership Project; Technical Specification Group Radio Access Network; NG-RAN; NG Application Protocol (NGAP)(Release 15)," Sep. 2019, 329 pages.
China Telecom, "CR to 38.413 for introducing PNI-NPN in Rel-16," 3GPP TSG RAN WG3 #105b, R3-195396, Chongqing, China, Oct. 14-18, 2019, 17 pages.
CMCC, "Left issues in idle and inactive mode for NPN," 3GPP TSG-RAN WG2 #107bis, R2-1912924, Chongqing, China, Oct. 14-18, 2019, 9 pages.
Ericsson, "Feasibility to support a deployment independent solution, " 3GPP TSG-SA WG2 Meeting #132, S2-1903383, Xi'an, China, Apr. 8-12, 2019, 10 pages.
Ericsson, "Introducing NPN," 3GPP TSG-RAN WG3 Meeting #105bis, R3-195876, Chongqing, P.R. China, Oct. 14-18, 2019, 10 pages.
Ericsson et al., Introducing support for Non-Public Networks, 3GPP TSG-SA WG2 Meeting #131, S2-1901574, Tenerife, Spain, Feb. 25-Mar. 1, 2019, 11 pages.
Ericsson, "Submission for information on Commonalities in solutions for Non-Public Network," 3GPP TSG-RAN WG2 #106, Tdoc R2-1907313, Reno, USA, May 13-17, 2019, 10 pages.
NEC, "(TP for NR BL CR for TS 38.413): Core Network Assistance Information," 3GPP TSG-RAN WG3 #NR AH-1807, R3-183926, Montreal, Canada, Jul. 2-6, 2018, 29 pages.
Office Action issued in Chinese Application No. 202011633828.2 on Oct. 21, 2021, 14 pages (with English translation).
PCT International Search Report and Written Opinion issued in International Application No. PCT/CN2019/116891 on Jul. 28, 2020, 16 pages (with English translation).
Qualcomm Incorporated, "Discussion on access control," 3GPP TSG-RAN WG3 Meeting #105bis, R3-195816, Chongqing, China, Oct. 14-18, 2019, 2 pages.
China Telecom, "Discussion on Support of Public Network Integrated NPN over NG Interface," 3GPP TSG RAN WG3 #105bis, R3-195398, Chongqing, China, Oct. 14-18, 2019, 6 pages.
Extended European Search Report issued in European Application No. 19951697.2 on Oct. 6, 2022, 13 pages.
Huawei et al., "General Support of NPN over F1," 3GPP TSG-RAN WG3 Meeting #105, R3-194485, Ljubljana, Slovenia, Aug. 26-30, 2019, 5 pages.
Huawei et al., "General Support of Public Network Integrated NPN," 3GPP TSG-RAN3 Meeting #105, R3-194413, Ljubljana, Slovenia, Aug. 26-30, 2019, 5 pages.
Huawei, "Initial UE Message for NPN," 3GPP TSG-RAN3 Meeting #105bis, R3-195763, Chongqing, China, Oct. 14-18, 2019, 3 pages.

* cited by examiner

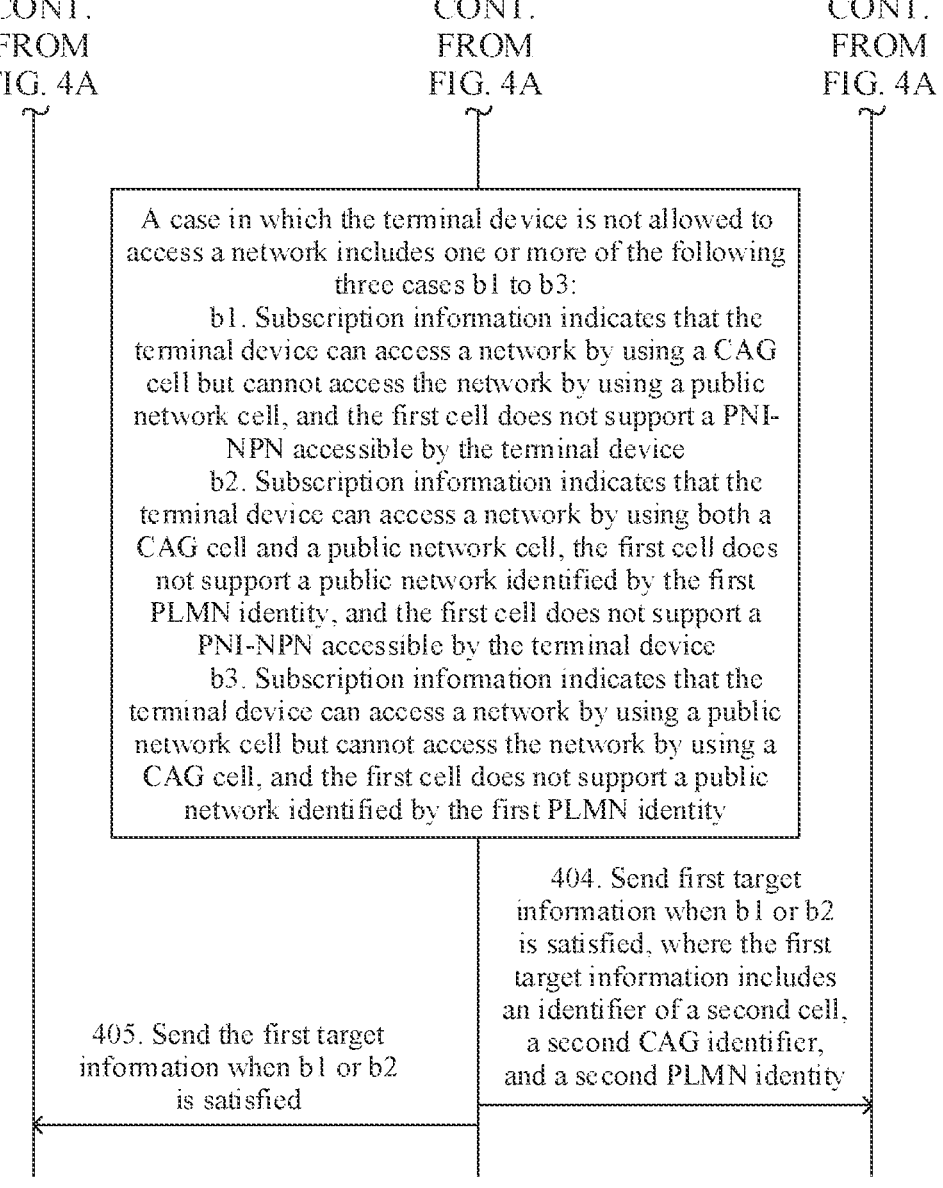

CONT.
FROM
FIG. 4A

CONT.
FROM
FIG. 4A

CONT.
FROM
FIG. 4A

A case in which the terminal device is not allowed to access a network includes one or more of the following three cases b1 to b3:

b1. Subscription information indicates that the terminal device can access a network by using a CAG cell but cannot access the network by using a public network cell, and the first cell does not support a PNI-NPN accessible by the terminal device b2. Subscription information indicates that the terminal device can access a network by using both a CAG cell and a public network cell, the first cell does not support a public network identified by the first PLMN identity, and the first cell does not support a PNI-NPN accessible by the terminal device b3. Subscription information indicates that the terminal device can access a network by using a public network cell but cannot access the network by using a CAG cell, and the first cell does not support a public network identified by the first PLMN identity 404. Send first target information when b1 or b2 is satisfied, where the first target information includes an identifier of a second cell, a second CAG identifier, and a second PLMN identity 405. Send the first target information when b1 or b2 is satisfied

FIG. 4B

CONT.
FROM
FIG. 5A

CONT.
FROM
FIG. 5A

CONT.
FROM
FIG. 5A

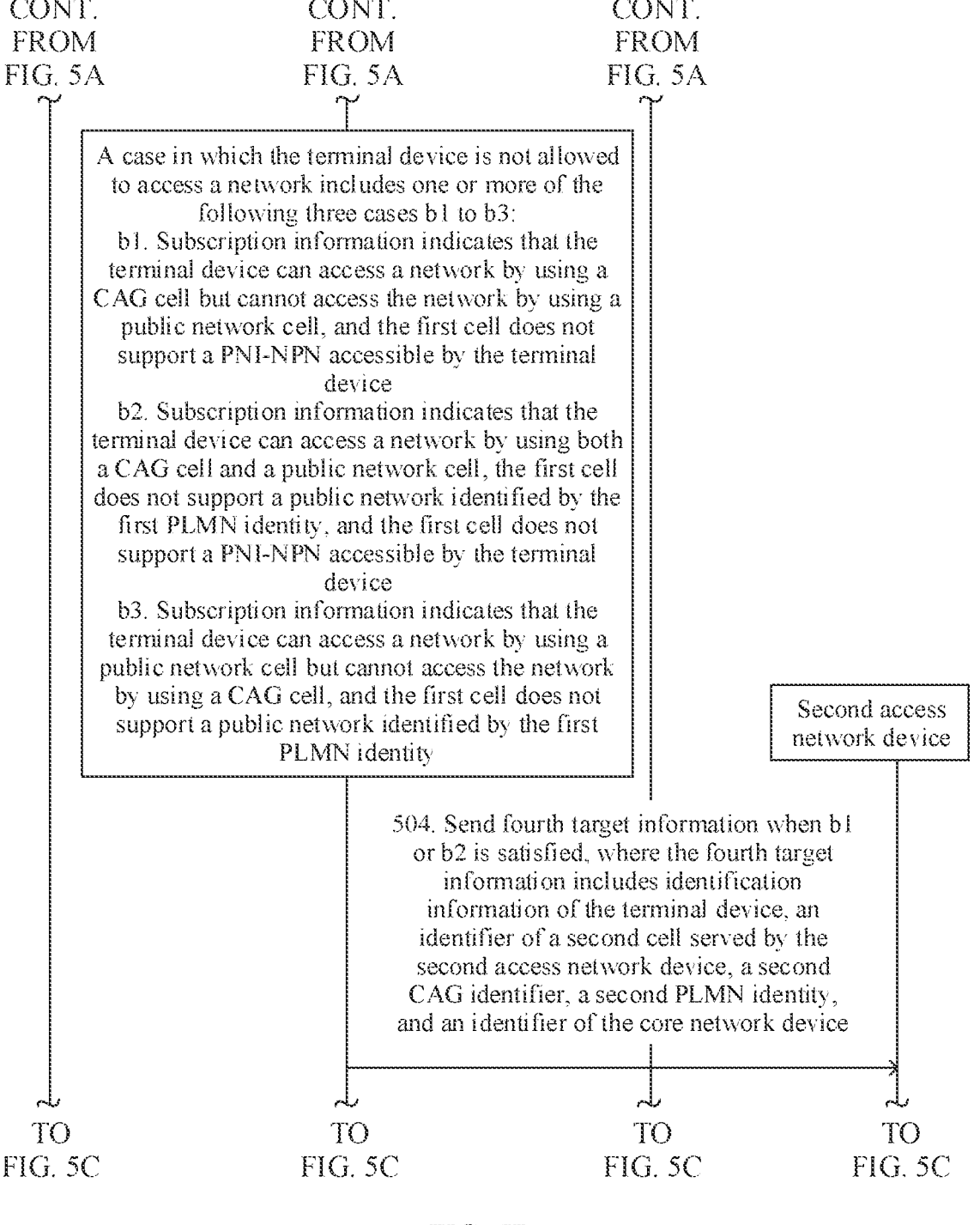

A case in which the terminal device is not allowed
to access a network includes one or more of the
following three cases b1 to b3:
b1. Subscription information indicates that the
terminal device can access a network by using a
CAG cell but cannot access the network by using a
public network cell, and the first cell does not
support a PNI-NPN accessible by the terminal
device
b2. Subscription information indicates that the
terminal device can access a network by using both
a CAG cell and a public network cell, the first cell
does not support a public network identified by the
first PLMN identity, and the first cell does not
support a PNI-NPN accessible by the terminal
device
b3. Subscription information indicates that the
terminal device can access a network by using a
public network cell but cannot access the network
by using a CAG cell, and the first cell does not
support a public network identified by the first
PLMN identity Second access
network device 504. Send fourth target information when b1
or b2 is satisfied, where the fourth target
information includes identification
information of the terminal device, an
identifier of a second cell served by the
second access network device, a second
CAG identifier, a second PLMN identity,
and an identifier of the core network device

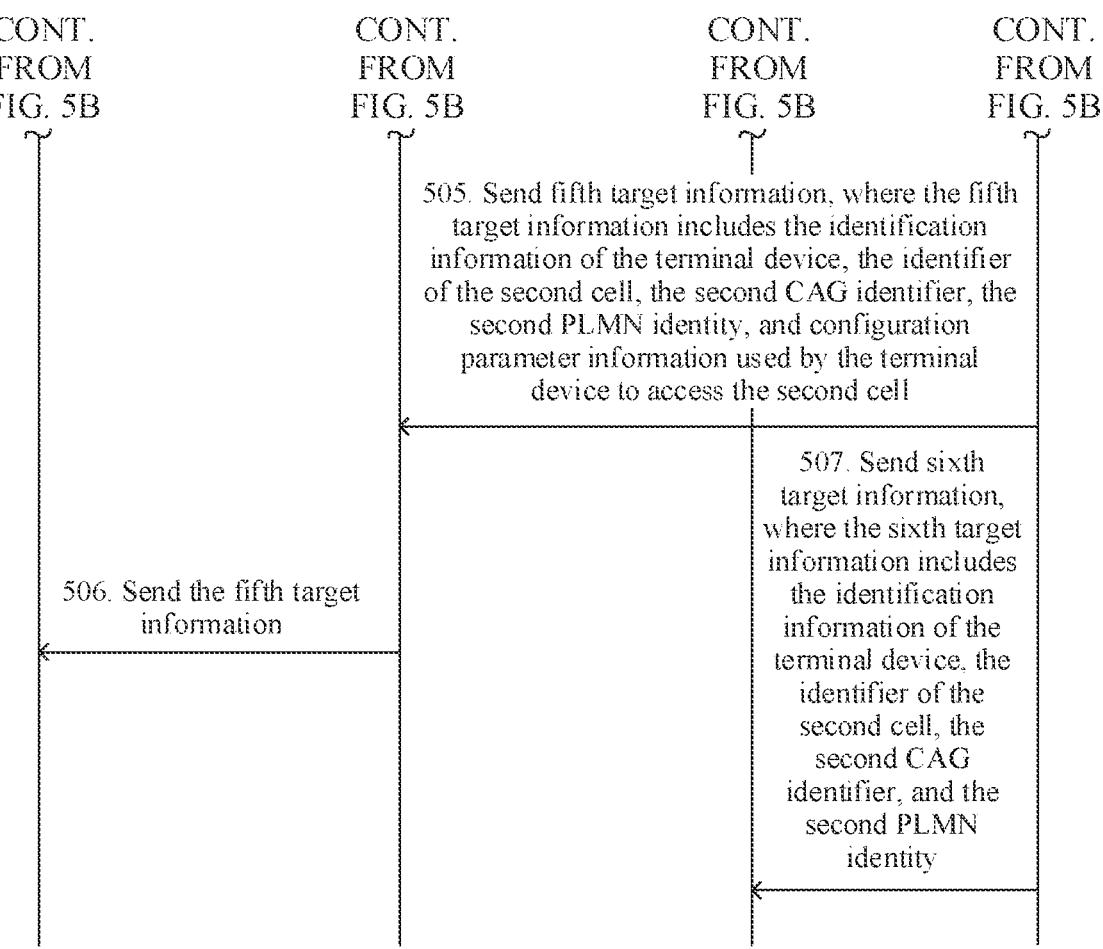

CONT.
FROM
FIG. 5B

CONT.
FROM
FIG. 5B

CONT.
FROM
FIG. 5B

CONT.
FROM
FIG. 5B

505. Send fifth target information, where the fifth target information includes the identification information of the terminal device, the identifier of the second cell, the second CAG identifier, the second PLMN identity, and configuration parameter information used by the terminal device to access the second cell 507. Send sixth target information, where the sixth target information includes the identification information of the terminal device, the identifier of the second cell, the second CAG identifier, and the second PLMN identity 506. Send the fifth target information

FIG. 5C

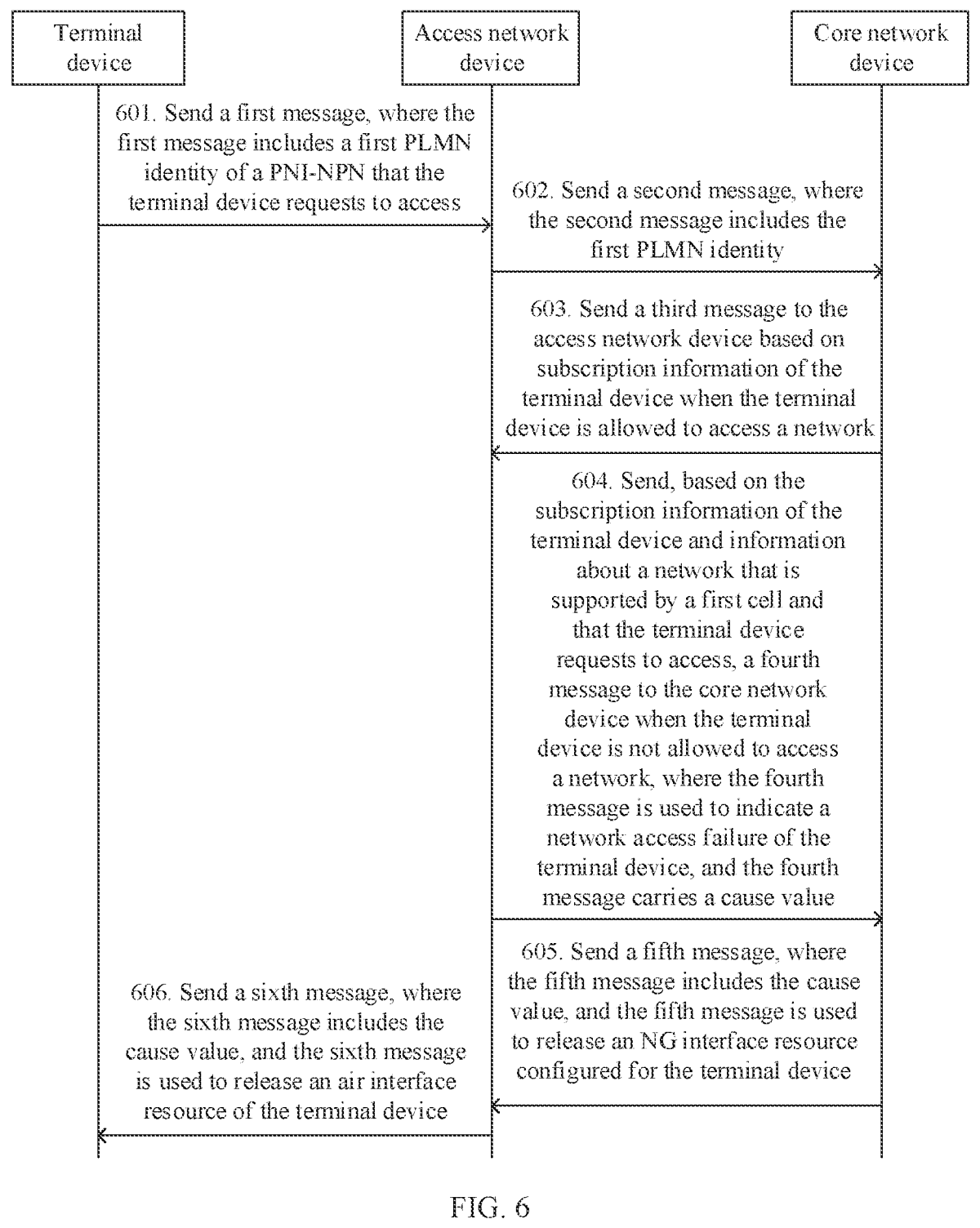

| Terminal device | Access network device | Core network device |
|---|---|---|

601. Send a first message, where the first message includes a first PLMN identity of a PNI-NPN that the terminal device requests to access 602. Send a second message, where the second message includes the first PLMN identity 603. Send a third message to the access network device based on subscription information of the terminal device when the terminal device is allowed to access a network 604. Send, based on the subscription information of the terminal device and information about a network that is supported by a first cell and that the terminal device requests to access, a fourth message to the core network device when the terminal device is not allowed to access a network, where the fourth message is used to indicate a network access failure of the terminal device, and the fourth message carries a cause value 605. Send a fifth message, where the fifth message includes the cause value, and the fifth message is used to release an NG interface resource configured for the terminal device 606. Send a sixth message, where the sixth message includes the cause value, and the sixth message is used to release an air interface resource of the terminal device

FIG. 6

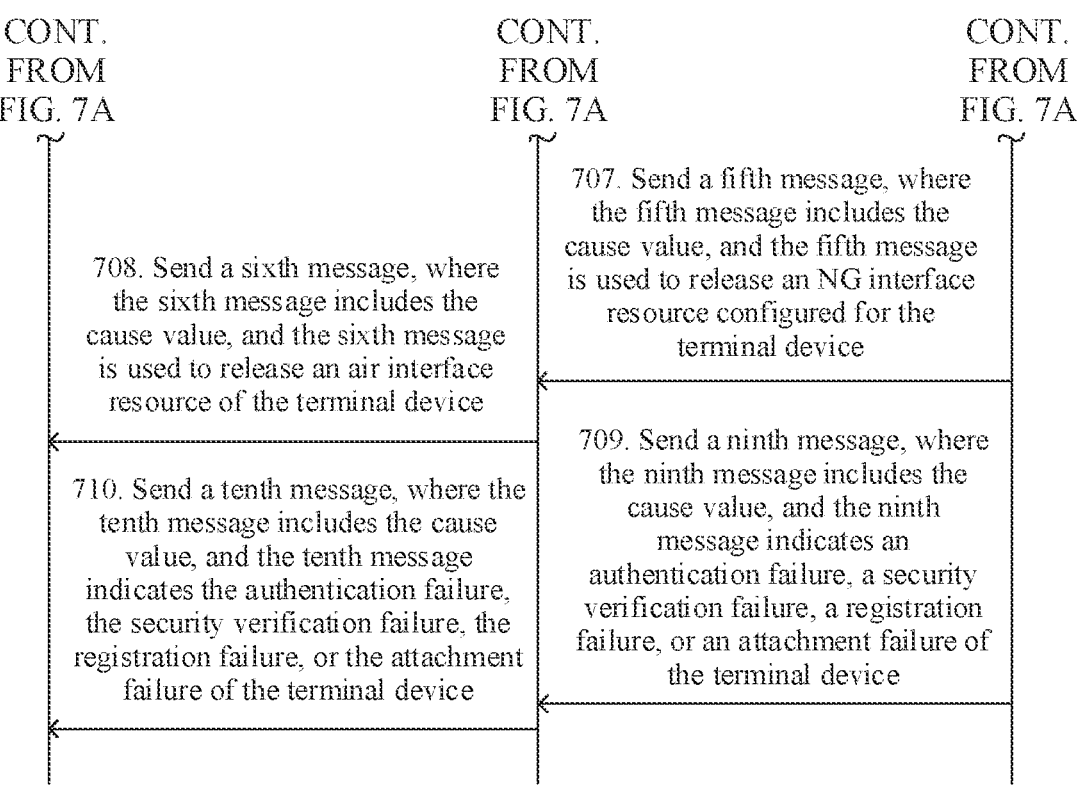

CONT.
FROM
FIG. 7A

CONT.
FROM
FIG. 7A

CONT.
FROM
FIG. 7A

707. Send a fifth message, where
the fifth message includes the
cause value, and the fifth message
is used to release an NG interface
resource configured for the
terminal device 708. Send a sixth message, where
the sixth message includes the
cause value, and the sixth message
is used to release an air interface
resource of the terminal device 709. Send a ninth message, where
the ninth message includes the
cause value, and the ninth
message indicates an
authentication failure, a security
verification failure, a registration
failure, or an attachment failure of
the terminal device 710. Send a tenth message, where the
tenth message includes the cause
value, and the tenth message
indicates the authentication failure,
the security verification failure, the
registration failure, or the attachment
failure of the terminal device

FIG. 7B

ACCESS CONTROL METHOD AND COMMUNICATIONS APPARATUS

CROSS-REFERENCE TO RELATED APPLICATIONS

This application is a continuation of International Application No. PCT/CN2019/116891, filed on Nov. 8, 2019, the disclosure of which is hereby incorporated by reference in its entirety.

TECHNICAL FIELD

This application relates to the field of communications technologies, and in particular, to an access control method and a communications apparatus.

BACKGROUND

A non-public network (non-public networks, NPNs) is a network that is being discussed in the 3GPP standard. Different from a conventional cellular network, the NPN network allows access of only some users with specific rights. 3GPP defines two NPN deployment modes: a stand-alone NPN (Stand-alone non-public networks, SNPN) and a non-stand-alone NPN. The non-stand-alone NPN network is also referred to as a public network integrated NPN (PNI-NPN) network.

The public network integrated NPN (PNI-NPN) network and a public land mobile network (PLMN) share a core network and/or an access network. The PNI-NPN is deployed depending on the PLMN, and the PNI-NPN network may be identified by using a PLMN ID.

To prevent unauthorized user equipment (UE) from accessing a PNI-NPN cell, a concept of a closed access group (CAG) is defined. One CAG represents one group of users who can access a CAG cell (PNI-NPN cell). The CAG may be represented by a closed access group identifier (CAG ID). In such a network architecture, how to ensure that a terminal device accesses a correct cell is a problem worth considering.

SUMMARY

Embodiments of this application provide an access control method and a communications apparatus, so that a terminal device can access a correct cell.

According to a first aspect, an embodiment of this application provides an access control method. The method includes: An access network device receives a first message from a terminal device, where the first message includes a first public land mobile network (PLMN) identity of a network that the terminal device requests to access and indication information, and the indication information is used to indicate that the terminal device requests to access a public network integrated non-public network (PNI-NPN) supported by a first cell. The access network device sends a second message to a core network device, where the second message includes the first PLMN identity and information about a network supported by the first cell. The access network device receives a third message from the core network device, where the third message is used to instruct the access network device to release a resource configured for the terminal device. The access network device sends a fourth message to the terminal device, where the fourth message is used to instruct the terminal device to release a radio resource control (RRC) connection.

Based on the method described in the first aspect, the access network device may send information about a network supported by a cell to the core network device, so that the core network device can perform access control on the terminal device based on the information about the network supported by the cell. This helps the terminal device access a correct cell.

In a possible implementation, the information about the network supported by the first cell includes one or more of the following information: a closed access group (CAG) identifier that corresponds to the first PLMN identity and that is supported by the first cell, PNI-NPN identification information supported by the first cell, or a PLMN identity supported by the first cell, where the PNI-NPN identification information includes a PLMN identity and a CAG identifier.

In a possible implementation, the second message further includes the indication information. The indication information is carried in the second message, to indicate, to the core network device, that the terminal device requests to access the PNI-NPN.

In a possible implementation, the third message and the fourth information each further include a cause value, and the cause value is used to indicate a cause of an access failure of the terminal device. The third message and the fourth message include the cause value, so that the access network device and the terminal device can determine, based on the cause value, a cause for rejecting a network access of the terminal device by the core network device.

According to a second aspect, an embodiment of this application provides an access control method. The method includes: A core network device receives a second message from an access network device, where the second message includes a first public land mobile network (PLMN) identity of a network that a terminal device requests to access and information about a network supported by a first cell. The core network device sends, when the terminal device is not allowed to access a network, a third message to the access network device based on the information about the network supported by the first cell and subscription information of the terminal device, where the third message is used to instruct the access network device to release a resource configured for the terminal device.

Based on the method described in the second aspect, the core network device can perform access control on the terminal device based on the information about the network supported by the cell. This helps the terminal device access a correct cell.

In a possible implementation, the information about the network supported by the first cell includes one or more of the following information: a closed access group (CAG) identifier that corresponds to the first PLMN identity and that is supported by the first cell, PNI-NPN identification information supported by the first cell, or a PLMN identity supported by the first cell, where the PNI-NPN identification information includes a PLMN identity and a CAG identifier.

In a possible implementation, the subscription information of the terminal device includes one or more of the following information: public network integrated non-public network (PNI-NPN) identification information of a PNI-NPN accessible by the terminal device, a PLMN identity of a PLMN accessible by the terminal device, or an indication of whether the terminal device is allowed to access a network only by using a closed access group (CAG) cell. The public network integrated non-public network (PNI-NPN) identification information of the PNI-NPN accessible by the terminal device may include a list of identifier of CAG (Allowed CAG List) that the UE is allowed to access, the indication of whether the terminal device is allowed to access a network only by using the closed access group (CAG) cell includes a CAG-only indication.

In a possible implementation, that the terminal device is not allowed to access a network includes one or more of the following cases: when the subscription information indicates that the terminal device is allowed to access a network by using a CAG cell but is not allowed to access the network by using a public network cell, the first cell does not support the PNI-NPN accessible by the terminal device or the PNI-NPN identification information of the PNI-NPN accessible by the terminal device is empty; when the subscription information indicates that the terminal device is allowed to access a network by using both a CAG cell and a public network cell, and the first cell does not support the PNI-NPN accessible by the terminal device or the PNI-NPN identification information of the PNI-NPN accessible by the terminal device is empty, the first cell does not support a public network identified by the first PLMN identity or the PLMN identity of the PLMN accessible by the terminal device does not include the first PLMN identity; or when the subscription information indicates that the terminal device is allowed to access a network by using a public network cell but is not allowed to access the network by using a CAG cell, the first cell does not support a public network identified by the first PLMN identity or the PLMN identity of the PLMN accessible by the terminal device does not include the first PLMN identity.

This possible implementation helps the terminal device access a correct cell.

In a possible implementation, that the terminal device is not allowed to access a network includes one or more of the following cases: when the subscription information indicates that the terminal device is allowed to access a network by using a CAG cell but is not allowed to access the network by using a public network cell, the first cell does not support a first PNI-NPN identified by the first CAG identifier and the first PLMN identity or the first PNI-NPN is not a PNI-NPN accessible by the terminal device; when the subscription information indicates that the terminal device is allowed to access a network by using both a CAG cell and a public network cell, and the first cell does not support the first PNI-NPN or the first PNI-NPN is not a PNI-NPN accessible by the terminal device, the first cell does not support a public network identified by the first PLMN identity or the PLMN identity of the PLMN accessible by the terminal device does not include the first PLMN identity; or when the subscription information indicates that the terminal device is allowed to access a network by using a public network cell but is not allowed to access the network by using a CAG cell, the first cell does not support a public network identified by the first PLMN identity or the PLMN identity of the PLMN accessible by the terminal device does not include the first PLMN identity.

This possible implementation helps the terminal device access a correct cell.

In a possible implementation, that the terminal device is not allowed to access a network includes one or more of the following cases: when the subscription information indicates that the terminal device is allowed to access a network by using a CAG cell but is not allowed to access the network by using a public network cell, the first cell does not support a PNI-NPN that is identified by the first PLMN identity and that is accessible by the terminal device or the PNI-NPN identification information of the PNI-NPN accessible by the terminal device does not include the first PLMN identity; when the subscription information indicates that the terminal device is allowed to access a network by using both a CAG cell and a public network cell, and the first cell does not support a PNI-NPN that is identified by the first PLMN identity and that is accessible by the terminal device or the PNI-NPN identification information of the PNI-NPN accessible by the terminal device does not include the PLMN identity, the first cell does not support a public network identified by the first PLMN identity or the PLMN identity of the PLMN accessible by the terminal device does not include the first PLMN identity; or the subscription information indicates that the terminal device is allowed to access a network by using a public network cell but is not allowed to access the network by using a CAG cell, and the first cell does not support a public network identified by the first PLMN identity or the PLMN identity of the PLMN accessible by the terminal device does not include the first PLMN identity.

This possible implementation helps the terminal device access a correct cell.

In a possible implementation, the third message further includes a cause value, and the cause value is used to indicate a cause of a network access failure of the terminal device.

In a possible implementation, the second message further includes indication information, and the indication information is used to indicate that the terminal device requests to access a public network integrated non-public network (PNI-NPN) supported by the first cell.

According to a third aspect, an embodiment of this application provides an access control method. The method includes: A terminal device sends a first message to an access network device, where the first message includes a first public land mobile network (PLMN) identity of a network that the terminal device requests to access and indication information, and the indication information is used to indicate that the terminal device requests to access a public network integrated non-public network (PNI-NPN) supported by a first cell. The terminal device receives a fourth message, where the fourth message is used to instruct the terminal device to release a radio resource control (RRC) connection. The terminal device releases the RRC connection.

Based on the method described in the third aspect, the terminal device can indicate, to the access network device, that the terminal device requests to access the public network integrated non-public network (PNI-NPN) supported by the first cell. Therefore, when the terminal device requests to access the PNI-NPN supported by the first cell, the access network device sends information about a network supported by the cell to a core network device, so that the core network device can perform access control on the terminal device based on the information about the network supported by the cell. This helps the terminal device to access a correct cell.

In a possible implementation, the fourth message includes a cause value, and the cause value is used to indicate a cause of a network access failure of the terminal device.

In a possible implementation, the first PLMN identity corresponds to at least two closed access group (CAG) identifiers.

In a possible implementation, when the terminal device requests to access a PNI-NPN, the indication information is carried in the first message only when the first PLMN identity of the PNI-NPN that the terminal device requests to access corresponds to at least two CAG identifiers.

According to a fourth aspect, an embodiment of this application provides an access control method. The method includes: An access network device receives a first message from a terminal device, where the first message includes a first public land mobile network (PLMN) identity of a public network integrated non-public network (PNI-NPN) that the terminal device requests to access. The access network device sends a second message to a core network device, where the second message includes the first PLMN identity. The access network device receives a third message from the core network device, where the third message includes subscription information of the terminal device. The access network device sends, based on the subscription information of the terminal device and information about a network that is supported by a first cell and that the terminal device requests to access, a fourth message to the core network device when the terminal device is not allowed to access a network, where the fourth message is used to indicate a network access failure of the terminal device.

Based on the method described in the fourth aspect, the access network device may receive the subscription information of the terminal device that is from the core network device, so that the access network device can perform access control on the terminal device based on the information about the network supported by the first cell and the subscription information of the terminal device. This helps the terminal device access a correct network.

In a possible implementation, the subscription information of the terminal device includes public network integrated non-public network (PNI-NPN) identification information of a PNI-NPN accessible by the terminal device, and/or an indication of whether the terminal device is allowed to access a network only by using a closed access group (CAG) cell. The information about the network supported by the first cell includes PNI-NPN identification information and/or a PLMN identity, where the PNI-NPN identification information includes a PLMN identity and a CAG identifier.

In a possible implementation, that the terminal device is not allowed to access a network includes one or more of the following cases: the subscription information indicates that the terminal device is allowed to access a network by using a CAG cell but is not allowed to access the network by using a public network cell, and the first cell does not support the PNI-NPN accessible by the terminal device; the subscription information indicates that the terminal device is allowed to access a network by using both a CAG cell and a public network cell, the first cell does not support a public network identified by the first PLMN identity, and the first cell does not support the PNI-NPN accessible by the terminal device; or the subscription information indicates that the terminal device is allowed to access a network by using a public network cell but is not allowed to access the network by using a CAG cell, and the first cell does not support a public network identified by the first PLMN identity. This possible implementation helps the terminal device access a correct cell.

In a possible implementation, that the terminal device is not allowed to access a network includes one or more of the following cases: the subscription information indicates that the terminal device is allowed to access a network by using a CAG cell but is not allowed to access the network by using a public network cell, and the first cell does not support a first PNI-NPN identified by a first CAG identifier and the first PLMN identity; the subscription information indicates that the terminal device is allowed to access a network by using both a CAG cell and a public network cell, the first cell does not support a public network identified by the first PLMN identity, and the first cell does not support a first PNI-NPN; or the subscription information indicates that the terminal device is allowed to access a network by using a public network cell but is not allowed to access the network by using a CAG cell, and the first cell does not support a public network identified by the first PLMN identity. This possible implementation helps the terminal device access a correct cell.

In a possible implementation, that the terminal device is not allowed to access a network includes one or more of the following cases: the subscription information indicates that the terminal device is allowed to access a network by using a CAG cell but is not allowed to access the network by using a public network cell, and the first cell does not support a PNI-NPN that is identified by the first PLMN identity and that is accessible by the terminal device; the subscription information indicates that the terminal device is allowed to access a network by using both a CAG cell and a public network cell, the first cell does not support a public network identified by the first PLMN identity, and the first cell does not support a PNI-NPN that is identified by the first PLMN identity and that is accessible by the terminal device; or the subscription information indicates that the terminal device is allowed to access a network by using a public network cell but is not allowed to access the network by using a CAG cell, and the first cell does not support a public network identified by the first PLMN identity. This possible implementation helps the terminal device access a correct cell.

In a possible implementation, the fourth message further includes a cause value, and the cause value is used to indicate a cause of a network access failure of the terminal device. The fourth message includes the cause value, so that the core network device can determine, based on the cause value, a cause for rejecting a network access of the terminal device by the access network device.

In a possible implementation, the access network device receives a fifth message from the core network device, where the fifth message includes the cause value, and the fifth message is used to instruct the access network device to release a resource configured for the terminal device. The access network device sends a sixth message to the terminal device, where the sixth message includes the cause value, and the sixth message is used to instruct the terminal device to release a radio resource control (RRC) connection. Based on this possible implementation, when the terminal device is not allowed to access a network, the radio resource control (RRC) connection and the resource that is configured for the terminal device can be released in time.

In a possible implementation, before the access network device sends the fourth message to the core network device, the access network device receives a seventh message from the core network device, where the seventh message indicates an authentication success, a security verification success, a registration success, or an attachment success of the terminal device; and the access network device sends an eighth message to the terminal device, where the eighth message indicates the authentication success, the security verification success, the registration success, or the attachment success of the terminal device. After the access network device sends the cause value to the core network device, the access network device receives a ninth message from the core network device, where the ninth message includes the cause value, and the ninth message indicates an authentication failure, a security verification failure, a registration failure, or an attachment failure of the terminal device; and The access network device sends a tenth message to the terminal device, where the tenth message includes the cause value, and the tenth message indicates the authentication failure, the security verification failure, the registration failure, or the attachment failure of the terminal device. Based on this possible implementation, when the terminal device is not allowed to access a network, registration release information of the terminal device can be released in time.

According to a fifth aspect, an embodiment of this application provides an access control method. The method includes: A core network device receives a second message from an access network device, where the second message includes a first public land mobile network (PLMN) identity of a public network integrated non-public network (PNI-NPN) that a terminal device requests to access. The core network device sends a third message to the access network device based on subscription information of the terminal device when the terminal device is allowed to access a network, where the third message includes the subscription information of the terminal device. The core network device receives a fourth message from the access network device, where the fourth message is used to indicate that a network access failure of the terminal device.

In a possible implementation, the subscription information of the terminal device includes one or more of the following information: PNI-NPN identification information of a PNI-NPN accessible by the terminal device, a PLMN identity of a PLMN accessible by the terminal device, or an indication of whether the terminal device is allowed to access a network only by using a closed access group (CAG) cell. The PNI-NPN identification information includes a PLMN identity and a CAG identifier.

In a possible implementation, that the terminal device is allowed to access a network includes one or more of the following cases: when the subscription information indicates that the terminal device is allowed to access a network by using a CAG cell but is not allowed to access the network by using a public network cell, the PNI-NPN identification information of the PNI-NPN accessible by the terminal device is not empty; when the subscription information indicates that the terminal device is allowed to access a network by using both a CAG cell and a public network cell, the PLMN identity of the PLMN accessible by the terminal device includes the first PLMN identity, or the PNI-NPN identification information of the PNI-NPN accessible by the terminal device is not empty; or the subscription information indicates that the terminal device is allowed to access a network by using a public network cell but is not allowed to access the network by using a CAG cell, and the PLMN identity of the PLMN accessible by the terminal device includes the first PLMN identity.

In a possible implementation, that the terminal device is allowed to access a network includes one or more of the following cases: when the subscription information indicates that the terminal device is allowed to access a network by using a CAG cell but is not allowed to access the network by using a public network cell, a first PNI-NPN identified by a first CAG identifier and the first PLMN identity is a PNI-NPN accessible by the terminal device; when the subscription information indicates that the terminal device is allowed to access a network by using both a CAG cell and a public network cell, the PLMN identity of the PLMN accessible by the terminal device includes the first PLMN identity, or a first PNI-NPN is a PNI-NPN accessible by the terminal device; or the subscription information indicates that the terminal device is allowed to access a network by using a public network cell but is not allowed to access the network by using a CAG cell, and the PLMN identity of the PLMN accessible by the terminal device includes the first PLMN identity.

In a possible implementation, that the terminal device is allowed to access a network includes one or more of the following cases: when the subscription information indicates that the terminal device is allowed to access a network by using a CAG cell but is not allowed to access the network by using a public network cell, the PNI-NPN identification information of the PNI-NPN accessible by the terminal device includes the first PLMN identity; when the subscription information indicates that the terminal device is allowed to access a network by using both a CAG cell and a public network cell, the PLMN identity of the PLMN accessible by the terminal device includes the first PLMN identity, or the PNI-NPN identification information of the PNI-NPN accessible by the terminal device includes the first PLMN identity; or the subscription information indicates that the terminal device is allowed to access a network by using a public network cell but is not allowed to access the network by using a CAG cell, and the PLMN identity of the PLMN accessible by the terminal device includes the first PLMN identity.

In a possible implementation, the fourth message further includes a cause value, and the cause value is used to indicate a cause of a network access failure of the terminal device.

In a possible implementation, the core network device sends a fifth message to the access network device, where the fifth message includes the cause value, and the fifth message is used to instruct the access network device to release a resource configured for the terminal device.

In a possible implementation, the core network device sends a seventh message to the access network device, where the seventh message indicates an authentication success, a security verification success, a registration success, or an attachment success of the terminal device. After the core network device receives the cause value from the access network device, the method further includes: The core network device sends a ninth message to the access network device, where the ninth message includes the cause value, and the ninth message indicates an authentication failure, a security verification failure, a registration failure, or an attachment failure of the terminal device.

According to a sixth aspect, an embodiment of this application provides an access control method. The method includes: An access network device receives a first message from a terminal device, where the first message includes a first public land mobile network (PLMN) identity of a public network integrated non-public network (PNI-NPN) that the terminal device requests to access. The access network device sends a second message to a core network device, where the second message includes the first PLMN identity. The access network device receives a third message from the core network device, where the third message includes subscription information of the terminal device. The access network device sends, based on the subscription information of the terminal device and information about a network that is supported by a first cell and that the terminal device requests to access, a message to the core network device when the terminal device is allowed to access a network, where the message is used to indicate a network access success of the terminal device.

In a possible implementation, the subscription information of the terminal device includes PNI-NPN identification information of a PNI-NPN accessible by the terminal device, and/or an indication of whether the terminal device is allowed to access a network only by using a closed access group (CAG) cell. The information about the network supported by the first cell includes PNI-NPN identification information and/or a PLMN identity, where the PNI-NPN identification information includes a PLMN identity and a CAG identifier.

In a possible implementation, that the terminal device is allowed to access a network includes one or more of the following cases: the subscription information indicates that the terminal device is allowed to access a network by using a CAG cell but is not allowed to access the network by using a public network cell, and the first cell supports the PNI-NPN accessible by the terminal device; when the subscription information indicates that the terminal device is allowed to access a network by using both a CAG cell and a public network cell, the first cell supports a public network identified by the first PLMN identity and the PLMN identity of the PLMN accessible by the terminal device includes the first PLMN identity, or the first cell supports the PNI-NPN accessible by the terminal device; or the subscription information indicates that the terminal device is allowed to access a network by using a public network cell but is not allowed to access the network by using a CAG cell, and the first cell supports a public network identified by the first PLMN identity.

In a possible implementation, that the terminal device is allowed to access a network includes one or more of the following cases: the subscription information indicates that the terminal device is allowed to access a network by using a CAG cell but is not allowed to access the network by using a public network cell, and the first cell supports a first PNI-NPN identified by a first CAG identifier and the first PLMN identity; when the subscription information indicates that the terminal device is allowed to access a network by using both a CAG cell and a public network cell, the first cell supports a public network identified by the first PLMN identity and the PLMN identity of the PLMN accessible by the terminal device includes the first PLMN identity; when the subscription information indicates that the terminal device is allowed to access a network by using both a CAG cell and a public network cell, the first cell supports a first PNI-NPN, and the first PNI-NPN is a PNI-NPN accessible by the terminal device; or the subscription information indicates that the terminal device is allowed to access a network by using a public network cell but is not allowed to access the network by using a CAG cell, and the first cell supports a public network identified by the first PLMN identity.

In a possible implementation, that the terminal device is allowed to access a network includes one or more of the following cases:

the subscription information indicates that the terminal device is allowed to access a network by using a CAG cell but is not allowed to access the network by using a public network cell, and the first cell supports a PNI-NPN that is identified by the first PLMN identity and that is accessible by the terminal device; when the subscription information indicates that the terminal device is allowed to access a network by using both a CAG cell and a public network cell, the first cell supports a public network identified by the first PLMN identity and the PLMN identity of the PLMN accessible by the terminal device includes the first PLMN identity; when the subscription information indicates that the terminal device is allowed to access a network by using both a CAG cell and a public network cell, the first cell supports a PNI-NPN that is identified by the first PLMN identity and that is accessible by the terminal device; or the subscription information indicates that the terminal device is allowed to access a network by using a public network cell but is not allowed to access the network by using a CAG cell, and the first cell supports a public network identified by the first PLMN identity.

For beneficial effects of the fifth aspect and beneficial effects of the sixth aspect, refer to the descriptions of the fourth aspect. Details are not described herein again.

According to a seventh aspect, an embodiment of this application provides an access control method. The method includes: An access network device sends information about a network supported by a cell served by the access network device to a core network device. The access network device receives a first message from a terminal device, where the first message includes a first public land mobile network (PLMN) identity of a public network integrated non-public network (PNI-NPN) that the terminal device requests to access. The access network device sends a second message to the core network device, where the second message includes the first public land mobile network (PLMN) identity. The access network device receives a third message from the core network device, where the third message is used to instruct the access network device to release a resource configured for the terminal device. The access network device sends a fourth message to the terminal device, where the fourth message is used to instruct the terminal device to release a radio resource control (RRC) connection.

This possible implementation helps the terminal device access a correct cell.

In a possible implementation, the information about the network supported by the cell served by the access network device includes one or more of the following information: a cell identity, PNI-NPN identification information corresponding to the cell, or a PLMN identity corresponding to the cell. The PNI-NPN identification information includes a PLMN identity and a closed access group (CAG) identifier.

In a possible implementation, the third message and the fourth information each further include a cause value, and the cause value is used to indicate a cause of a network access failure of the terminal device. The third message and the fourth message include the cause value, so that the access network device and the terminal device can determine, based on the cause value, a cause for rejecting a network access of the terminal device by the core network device.

In a possible implementation, the access network device receives information about a network that is supported by a cell served by the core network device from the core network device.

According to an eighth aspect, an embodiment of this application provides an access control method. The method includes: A core network device receives information about a network that is supported by a cell served by an access network device and that is from the access network device. The core network device receives a second message from the access network device, where the second message includes a first public land mobile network (PLMN) identity of a public network integrated non-public network (PNI-NPN) that a terminal device requests to access. The core network device sends, based on the subscription information of the terminal device and information about a network that is supported by a first cell and that the terminal device requests to access, a third message to the access network device when the terminal device is not allowed to access a network, where the third message is used to instruct the access network device to release a resource configured for the terminal device.

In a possible implementation, the information about the network supported by the cell served by the access network device includes one or more of the following information: a cell identity, PNI-NPN identification information corresponding to the cell, or a PLMN identity corresponding to the cell. The PNI-NPN identification information includes a PLMN identity and a closed access group (CAG) identifier.

In a possible implementation, the subscription information of the terminal device includes one or more of the following information: PNI-NPN identification information of a PNI-NPN accessible by the terminal device, a PLMN identity of a PLMN accessible by the terminal device, or an indication of whether the terminal device is allowed to access a network only by using a closed access group (CAG) cell. The information about the network supported by the first cell includes one or more of the following information: PNI-NPN identification information or a PLMN identity supported by the first cell.

In a possible implementation, that the terminal device is not allowed to access a network includes one or more of the following cases:

when the subscription information indicates that the terminal device is allowed to access a network by using a CAG cell but is not allowed to access the network by using a public network cell, but the first cell does not support the PNI-NPN accessible by the terminal device or the PNI-NPN identification information of the PNI-NPN accessible by the terminal device is empty; when the subscription information indicates that the terminal device is allowed to access a network by using both a CAG cell and a public network cell, but the first cell does not support the PNI-NPN accessible by the terminal device or the identification information of the PNI-NPN accessible by the terminal device is empty, and the first cell does not support a public network identified by the first PLMN identity or the PLMN identity of the PLMN accessible by the terminal device does not include the first PLMN identity; or when the subscription information indicates that the terminal device is allowed to access a network by using a public network cell and is not allowed to access the network by using a CAG cell, the first cell does not support a public network identified by the first PLMN identity or the PLMN identity of the PLMN accessible by the terminal device does not include the first PLMN identity In a possible implementation, that the terminal device is not allowed to access a network includes one or more of the following cases:

when the subscription information indicates that the terminal device is allowed to access a network by using a CAG cell but is not allowed to access the network by using a public network cell, the first cell does not support a first PNI-NPN identified by the first CAG identifier and the first PLMN identity or the first PNI-NPN is not a PNI-NPN accessible by the terminal device; when the subscription information indicates that the terminal device is allowed to access a network by using both a CAG cell and a public network cell, the first cell does not support the first PNI-NPN or the first PNI-NPN is not a PNI-NPN accessible by the terminal device, and the first cell does not support a public network identified by the first PLMN identity or the PLMN identity of the PLMN accessible by the terminal device does not include the first PLMN identity; or when the subscription information indicates that the terminal device is allowed to access a network by using a public network cell but is not allowed to access the network by using a CAG cell, the first cell does not support a public network identified by the first PLMN identity or the PLMN identity of the PLMN accessible by the terminal device does not include the first PLMN identity.

In a possible implementation, that the terminal device is not allowed to access a network includes one or more of the following cases:

when the subscription information indicates that the terminal device is allowed to access a network by using a CAG cell but is not allowed to access the network by using a public network cell, the first cell does not support a PNI-NPN that is identified by the first PLMN identity and that is accessible by the terminal device or the PNI-NPN identification information of the PNI-NPN accessible by the terminal device does not include the first PLMN identity; when the subscription information indicates that the terminal device is allowed to access a network by using both a CAG cell and a public network cell, the first cell does not support a PNI-NPN that is identified by the first PLMN identity and that is accessible by the terminal device or the PNI-NPN identification information of the PNI-NPN accessible by the terminal device does not include the first PLMN identity, and the first cell does not support a public network identified by the first PLMN identity or the PLMN identity of the PLMN accessible by the terminal device does not include the first PLMN identity; or the subscription information indicates that the terminal device is allowed to access a network by using a public network cell but is not allowed to access the network by using a CAG cell, and the first cell does not support a public network identified by the first PLMN identity or the PLMN identity of the PLMN accessible by the terminal device does not include the first PLMN identity.

In a possible implementation, the third message further includes a cause value, and the cause value is used to indicate a cause of a network access failure of the terminal device.

In a possible implementation, the core network device sends, to the access network device, information about a network supported by a cell served by the core network device.

According to a ninth aspect, a communications apparatus is provided. The apparatus may be an access network device, an apparatus in an access network device, or an apparatus that can coordinate with an access network device. The communications apparatus may alternatively be a chip system. The communications apparatus may perform the method according to the first aspect, the fourth aspect, the sixth aspect, or the seventh aspect. Functions of the communications apparatus may be implemented by hardware, or may be implemented by hardware executing corresponding software. The hardware or the software includes one or more units corresponding to the foregoing functions. The units may be software and/or hardware. For operations performed by the communications apparatus and beneficial effects of the communications apparatus, refer to the method and beneficial effects described in the first aspect, the fourth aspect, the sixth aspect, or the seventh aspect. No repeated description is provided.

According to a tenth aspect, an embodiment of this application provides a communications apparatus. The communications apparatus may be a core network device, an apparatus in a core network device, or an apparatus that can coordinate with a core network device. The communications apparatus may alternatively be a chip in a core network device. The communications apparatus includes a communications interface and a processor. The communications interface is configured for communication between the apparatus and another device, for example, receiving and sending of data or a signal. For example, the communications interface may be a transceiver, a circuit, a bus, a module, or a communications interface of another type, and the another device may be a terminal device or a core network device. The processor is configured to invoke a group of programs, instructions, or data, to perform the method described in the second aspect, the fifth aspect, or the eighth aspect. The apparatus may further include a memory, configured to store the programs, the instructions, or the data to be invoked by the processor. The memory is coupled to the processor. When executing the instructions or the data stored in the memory, the processor can implement the method described in the second aspect, the sixth aspect, or the eighth aspect.

According to an eleventh aspect, an embodiment of this application provides a communications apparatus. The communications apparatus may be a terminal device, an apparatus in a terminal device, or an apparatus that can coordinate with a terminal device. The communications apparatus may alternatively be a chip in a terminal device. The communications apparatus includes a communications interface and a processor. The communications interface is configured for communication between the apparatus and another device, for example, receiving and sending of data or a signal. For example, the communications interface may be a transceiver, a circuit, a bus, a module, or a communications interface of another type, and the another device may be a terminal device or a terminal device. The processor is configured to invoke a group of programs, instructions, or data, to perform the method described in the third aspect. The apparatus may further include a memory, configured to store the programs, the instructions, or the data to be invoked by the processor. The memory is coupled to the processor, and when executing the instructions or the data stored in the memory, the processor can implement the method described in the third aspect.

According to a twelfth aspect, an embodiment of this application provides a communications apparatus. The communications apparatus may be an access network device, an apparatus in an access network device, or an apparatus that can coordinate with an access network device. The communications apparatus may alternatively be a chip in an access network device. The communications apparatus includes a communications interface and a processor. The communications interface is configured for communication between the apparatus and another device, for example, receiving and sending of data or a signal. For example, the communications interface may be a transceiver, a circuit, a bus, a module, or another type of communications interface, and the another device may be a network device. The processor is configured to invoke a group of programs, instructions, or data, to perform the method described in the first aspect, the fourth aspect, the sixth aspect, or the seventh aspect. The apparatus may further include a memory, configured to store the programs, the instructions, or the data to be invoked by the processor. The memory is coupled to the processor. When executing the instructions or the data stored in the memory, the processor can implement the method described in the first aspect, the third aspect, the fifth aspect, or the seventh aspect.

According to a thirteenth aspect, an embodiment of this application provides a communications apparatus. The communications apparatus may be a core network device, an apparatus in a core network device, or an apparatus that can coordinate with a core network device. The communications apparatus may alternatively be a chip in a core network device. The communications apparatus includes a communications interface and a processor. The communications interface is configured for communication between the apparatus and another device, for example, receiving and sending of data or a signal. For example, the communications interface may be a transceiver, a circuit, a bus, a module, or another type of communications interface, and the another device may be a network device. The processor is configured to invoke a group of programs, instructions, or data, to perform the method described in the second aspect, the fifth aspect, or the eighth aspect. The apparatus may further include a memory, configured to store the programs, the instructions, or the data to be invoked by the processor. The memory is coupled to the processor. When executing the instructions or the data stored in the memory, the processor can implement the method described in the second aspect, the sixth aspect, or the eighth aspect.

According to a fourteenth aspect, an embodiment of this application provides a communications apparatus. The communications apparatus may be a terminal device, an apparatus in a terminal device, or an apparatus that can coordinate with a terminal device. The communications apparatus may alternatively be a chip in a terminal device. The communications apparatus includes a communications interface and a processor. The communications interface is configured for communication between the apparatus and another device, for example, receiving and sending of data or a signal. For example, the communications interface may be a transceiver, a circuit, a bus, a module, or another type of communications interface, and the another device may be a network device. The processor is configured to invoke a group of programs, instructions, or data, to perform the method described in the third aspect. The apparatus may further include a memory, configured to store the programs, the instructions, or the data to be invoked by the processor. The memory is coupled to the processor, and when executing the instructions or the data stored in the memory, the processor can implement the method described in the third aspect.

According to a fifteenth aspect, an embodiment of this application provides a chip system. The chip system includes a processor, may further include a memory, and is configured to implement the method according to any one of the first aspect to the eighth aspect. The chip system may include a chip, or may include a chip and another discrete component.

According to a sixteenth aspect, an embodiment of this application provides a computer-readable storage medium. The computer-readable storage medium is configured to store instructions. When the instructions are executed, the method according to any one of the first aspect to the eighth aspect is implemented.

According to a seventeenth aspect, an embodiment of this application provides a computer program product including instructions. When the instructions are executed, the method according to any one of the first aspect to the eighth aspect is implemented.

BRIEF DESCRIPTION OF DRAWINGS

FIG. 2 to FIG. 9 are schematic flowcharts of an access control method according to embodiments of this application;

DESCRIPTION OF EMBODIMENTS

To make the objectives, technical solutions, and advantages of this application clearer, the following further describes this application in detail with reference to the accompanying drawings.

To better understand the embodiments of this application, the following describes a system architecture used in the embodiments of this application.

Figure 1:
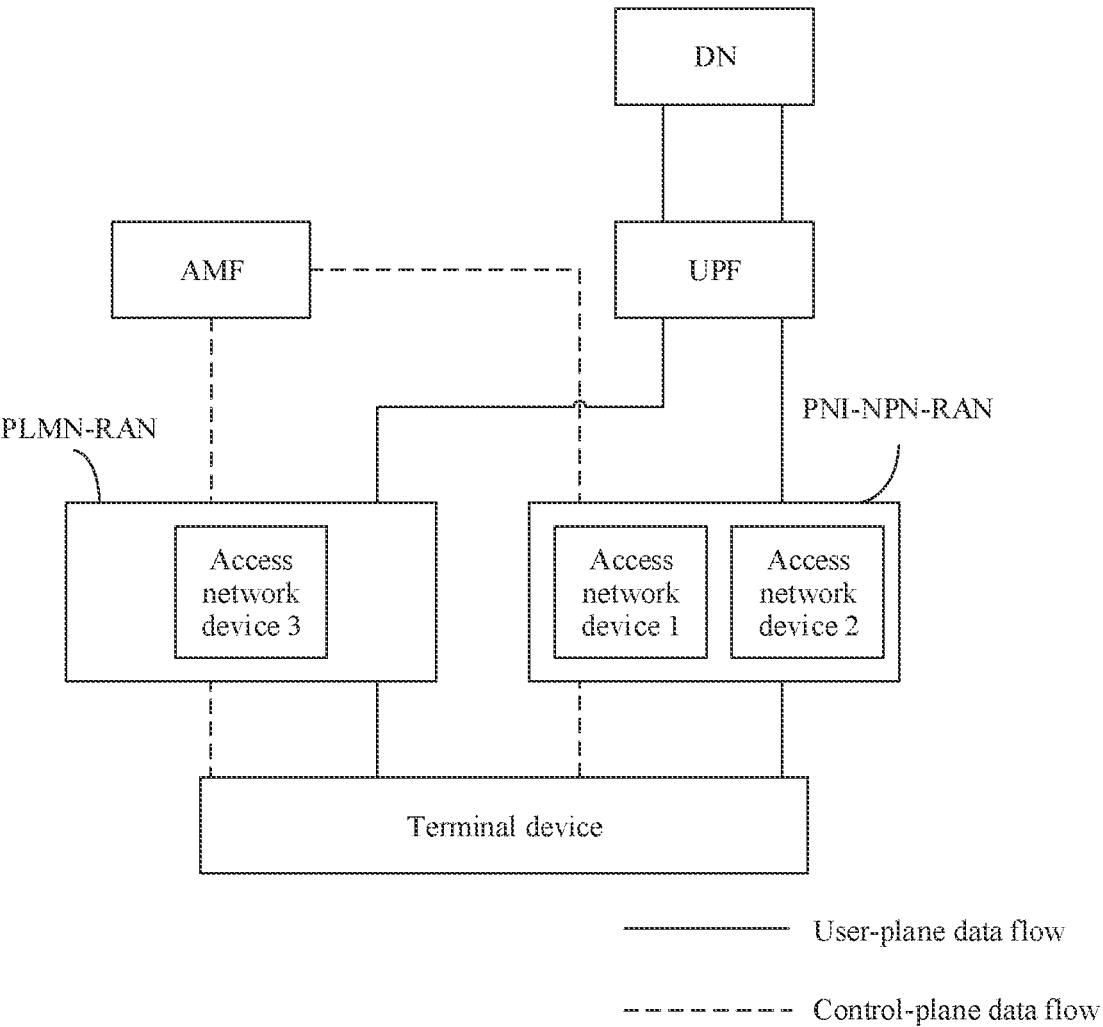
FIG. 1 is a schematic diagram of an architecture of a communications system according to an embodiment of this application.

FIG. 1 is a schematic diagram of a system architecture of a public network integrated NPN (PNI-NPN) according to an embodiment of this application. Different from a conventional cellular network, the PNI-NPN allows access of only some users with specific rights. The PNI-NPN may also be referred to as a non-stand-alone NPN. In this embodiment of this application, the PNI-NPN and a public land mobile network (PLMN) share a core network and/or an access network, the PNI-NPN is deployed depending on the PLMN, and the PNI-NPN network may be identified by using a PLMN ID. The PLMN may also be referred to as a public network. FIG. 1 is described by using an example in which a PNI-NPN network and a PLMN network share a core network.

As shown in FIG. 1, a PNI-NPN-RAN represents an access network of a PNI-NPN, and a PLMN-RAN represents an access network of a public network. The PNI-NPN-RAN includes one or more access network devices, and the PLMN-RAN may also include one or more access network devices. In FIG. 1, for example, the PNI-NPN-RAN includes an access network device 1 and an access network device 2, and the PLMN-RAN includes an access network device 3.

The access network device in this embodiment of this application is a network-side entity configured to transmit or receive a signal, may be configured to mutually convert a received over-the-air frame and an internet protocol (IP) packet, and serves as a router between a terminal device and a remaining part of an access network. The remaining part of the access network may include an IP network and the like. The access network device may further coordinate attribute management of an air interface. For example, the access network device may be an evolved NodeB (evolutional Node B, eNB or e-NodeB) in LTE, a new radio controller (NR controller), a gNodeB (gNB) in a 5G system, a centralized network element (centralized unit), a new radio base station, a radio remote module, a micro base station, a relay, a distributed network element (distributed unit), a transmission reception point (TRP), a transmission point (TP), or any other radio access device. However, the embodiments of this application are not limited thereto.

In the system architecture shown in FIG. 1, an access and mobility management function (AMF) entity and a user plane function (UPF) entity belong to a core network device.

FIG. 1 may further include another core network device. This is not limited in the embodiments of this application.

The AMF entity is a control plane network function provided by the operator network, and is responsible for access control and mobility management for accessing the operator network by the terminal device, for example, including functions such as mobility status management, temporary user identity assignment, and user authentication and authorization.

The UPF entity is a gateway provided by an operator, and is a gateway for communication between an operator network and a data network (DN). The UPF entity has user plane related functions such as data packet routing and transmission, packet detection, traffic reporting, quality of service (QoS) processing, lawful interception, uplink packet detection, and downlink packet storage.

In the system architecture shown in FIG. 1, the data network (DN) may also be referred to as a packet data network (PDN), and is usually a network outside an operator network, for example, a third-party network.

As shown in FIG. 1, the system architecture in this embodiment of this application may further include one or more terminal devices. The terminal device in this embodiment of this application is a user-side entity configured to receive or transmit a signal. The terminal device is a device that provides a user with voice and/or data connectivity, for example, a handheld device or a vehicle-mounted device having a wireless connection function. The terminal device may alternatively be another processing device connected to a wireless modem. The terminal device may communicate with a radio access network (RAN). The terminal device may also be referred to as a wireless terminal, a subscriber unit, a subscriber station, a mobile station, a mobile, a remote station, an access point, a remote terminal, an access terminal, a user terminal, a user agent, a user device, user equipment, or the like. The terminal device may be a mobile terminal, for example, a mobile phone (or referred to as a "cellular" phone), and a computer that has a mobile terminal. For example, the terminal device may be a portable, pocket-size, handheld, computer built-in, or vehicle-mounted mobile apparatus, which exchanges a voice and/or data with the radio access network. For example, the terminal device may alternatively be a device such as a personal communications service (personal communication service, PCS) phone, a cordless telephone set, a session initiation protocol (SIP) phone, a wireless local loop (WLL) station, or a personal digital assistant (PDA). For example, common terminal devices include a mobile phone, a tablet computer, a notebook computer, a palmtop computer, a mobile internet device (MID), and a wearable device such as a smartwatch, a smart band, or a pedometer. How, the embodiments of this application are not limited thereto.

For ease of understanding of an access control method provided in the embodiments of this application, the following provides related descriptions of a closed access group identifier (CAG ID).

To prevent an unauthorized terminal device from accessing a CAG cell (that is, a PNI-NPN cell), a concept of a CAG is defined. One CAG represents one group of users that is allowed to access a CAG cell. A CAG ID is used to identify a CAG and is unique in one PLMN. CAG identifiers in different PLMNs can have a same value. One CAG identifier and one PLMN identity may form one piece of PNI-NPN identification information. One piece of PNI-NPN identification information is used to identify one PNI-NPN. Alternatively, PNI-NPN identification information may include a PLMN identity and/or a CAG identifier. One CAG cell can support a plurality of PNI-NPNs. For example, as shown in the following Table 1, a cell 1 supports a PNI-NPN 1 and a PNI-NPN 2. The PNI-NPN 1 is identified jointly by a PLMN identity 1 and a CAG identifier 1, and the PNI-NPN 2 is identified jointly by a PLMN identity 2 and the CAG identifier 1.

TABLE 1

| PNI-NPN | PNI-NPN identifier |
| --- | --- |
| PNI-NPN 1 | PNI-NPN identification information 1 (PLMN identity 1 and CAG identifier 1) |
| PNI-NPN 2 | PNI-NPN identification information 2 (PLMN identity 2 and CAG identifier 1) |

Different cells may support a same PNI-NPN or different PNI-NPNs. For example, as shown in the following Table 2, a cell 2 supports the PNI-NPN 2 to a PNI-NPN 5. The PNI-NPN 3 is identified by the PLMN identity 2 and a CAG identifier 2, the PNI-NPN 4 is identified by a PLMN identity 4 and the CAG identifier 1, and the PNI-NPN 5 is identified by a PLMN identity 5 and the CAG identifier 1.

TABLE 2

| PNI-NPN | PNI-NPN identifier |
| --- | --- |
| PNI-NPN 2 | PNI-NPN identification information 2 (PLMN identity 2 and CAG identifier 1) |
| PNI-NPN 3 | PNI-NPN identification information 3 (PLMN identity 2 and CAG identifier 1) |
| PNI-NPN 4 | PNI-NPN identification information 4 (PLMN identity 4 and CAG identifier 1) |
| PNI-NPN 5 | PNI-NPN identifier 5 (PLMN identity 5 and CAG identifier 1) |

In a possible implementation, when a PNI-NPN and a PLMN share an access network, a cell may support both the PNI-NPN and the public network. For example, the cell 1 may further support public networks with PLMN identities shown in the following Table 3, and the cell 2 may further support public networks with PLMN identities shown in the following Table 4.

TABLE 3

| Public network | Public network identity |
| --- | --- |
| PLMN 1 | PLMN identity 1 |
| PLMN 2 | PLMN identity 2 |
| PLMN 3 | PLMN identity 3 |

TABLE 4

| Public network | Public network identity |
| --- | --- |
| PLMN 2 | PLMN identity 2 |
| PLMN 3 | PLMN identity 3 |
| PLMN 4 | PLMN identity 4 |
| PLMN 5 | PLMN identity 5 |

In the embodiments of this application, the terminal device stores subscription information of the terminal device, and the subscription information also includes PIN-NPN identification information of a PNI-NPN accessible by the terminal device. For example, the PNI-NPN identification information of the PNI-NPN accessible by the terminal device may be shown in the following, Table 5.

TABLE 5

| PNI-NPN | PNI-NPN identifier |
| --- | --- |
| PNI-NPN 4 | PNI-NPN identifier 4 (PLMN identity 4 and CAG identifier 1) |
| PNI-NPN 5 | PNI-NPN identifier 5 (PLMN identity 5 and CAG identifier 1) |
| PNI-NPN 6 | PNI-NPN identifier 6 (PLMN identity 6 and CAG identifier 1) |
| PNI-NPN 7 | PNI-NPN identifier 7 (PLMN identity 7 and CAG identifier 2) |

In a possible implementation, the subscription information of the terminal device also includes a PLMN identity of a PLMN accessible by the terminal device. For example, the PLMN identity of the PLMN accessible by the terminal device may be shown in the following Table 6.

TABLE 6

| Public network | Public network identity |
| --- | --- |
| PLMN 4 | PLMN identity 4 |
| PLMN 5 | PLMN identity 5 |
| PLMN 6 | PLMN identity 6 |

A cell broadcasts PNI-NPN identification information (PLMN ID(s) and CAG ID(s)) of PNI-NPN(s) by using system information, where access to the PNI-NPN(s) is supported by the cell. After receiving the system information broadcast by the cell, the terminal device may report, to the access network device (or may not report a CAG identifier), PNI-NPN identification information of a PNI-NPN that the terminal device selects to access. Then the access network device sends the PNI-NPN identification information to the AMF. The AMF then performs access control on the terminal device to determine whether to allow the terminal device to access the network. When the terminal device reports the PNI-NPN identification information to the access network device, a PLMN identity and the CAG identifier may be reported in one piece of information or may be reported in different pieces of information. The PLMN identity is usually reported in access stratum (AS) information. A current standard discussion involves that a terminal device reports a selected CAG identifier to an access network device in a following four manners: 1. The terminal device reports the selected CAG identifier by using AS information in a MSG5. 2. The terminal device reports the selected CAG identifier by using non-access stratum (NAS) information (for example, NAS information in a MSG5 or a NAS message after a MSG 5). 3. The terminal device neither reports the selected CAG identifier by using AS information nor reports the selected CAG identifier by using NAS information. In other words, the terminal device does not report the CAG identifier to the access network device. 4. The terminal device reports the CAG identifier in both AS information and NAS information.

In some cases, the terminal device may access an incorrect cell. For example, in the manner 2, because the access network device cannot parse content in the NAS information, after receiving the PNI-NPN identification information reported by the terminal device, the access network device cannot determine whether a cell that the terminal device requests to access supports the network that the terminal device requests to access. In other words, the access network device cannot perform access control on the terminal device based on information about a network supported by the cell. Although the core network device can obtain the CAG identifier by parsing the NAS information, the core network device does not store a PNI-NPN supported by the cell that the terminal device requests to access. Therefore, the core network device cannot perform access control on the terminal device based on the information about the network supported by the cell. Because neither the access network device nor the core network device can perform access control on the terminal device based on the information about the network supported by the cell, a cell that the core network device allows the terminal device to access may be incorrect. Similarly, in the manner 3, the access network device cannot determine a PNI-NPN that the terminal device requests to access, and therefore cannot perform access control on the terminal device based on the information about the network supported by the cell.

Therefore, to enable a terminal device to access a correct cell, the embodiments of this application provide an access control method and an apparatus. In the access control method provided in the embodiments of this application, after receiving a PLMN identity and/or a CAG identifier in PNI-NPN identification information reported by a terminal device, an access network device sends the PLMN identity and/or the CAG identifier to a core network device, and the core network device may send subscription information of the terminal device to the access network device, so that the access network device can perform access control on the terminal device based on information about a network supported by a cell and the subscription information of the terminal device, to access a correct cell.

The following further describes the access control method and the apparatus that are provided in this application.

Figure 2:
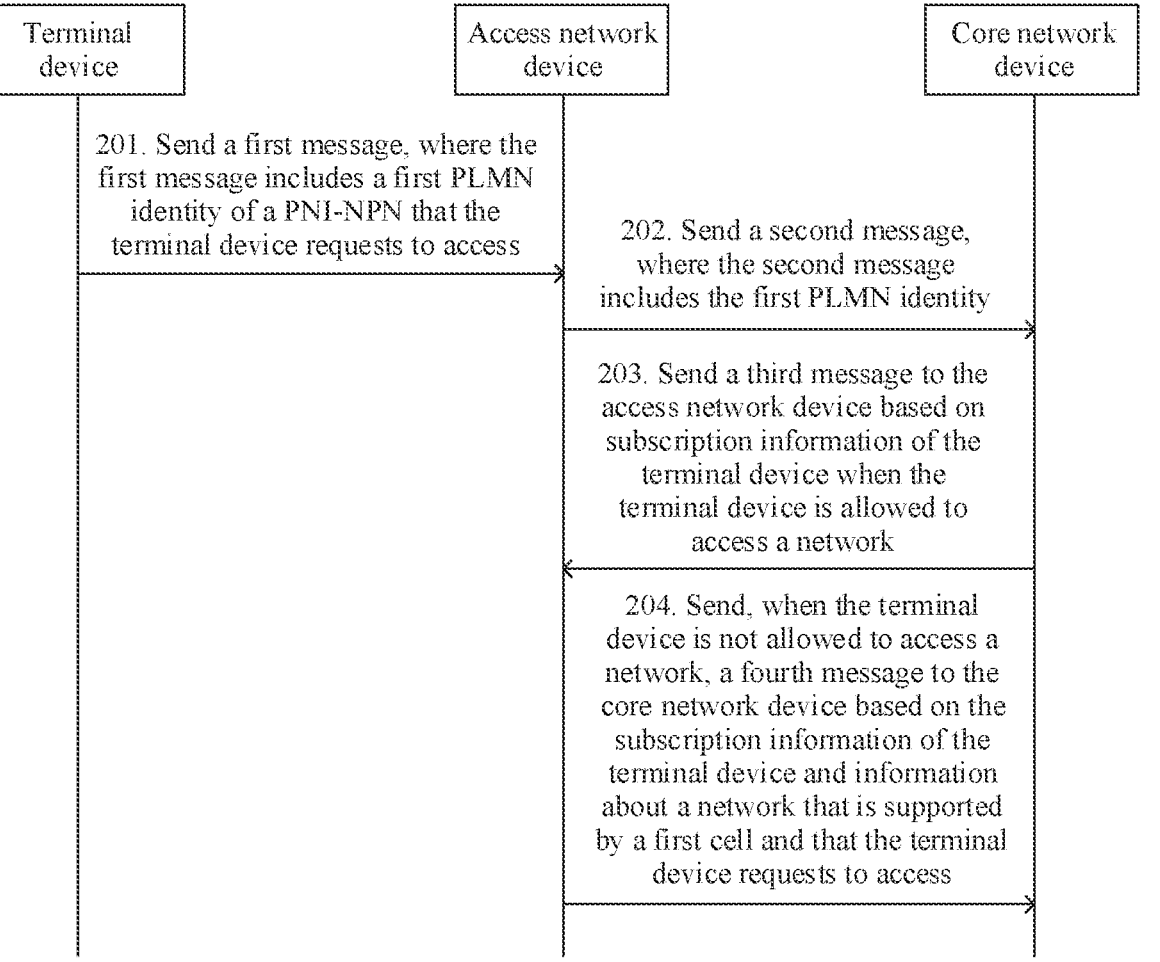

FIG. 2 is a schematic flowchart of an access control method according to an embodiment of this application. As shown in FIG. 2, the access control method includes the following step 201 to step 204. The method shown in FIG. 2 may be performed by a terminal device, an access network device, and a core network device. Alternatively, the method shown in FIG. 2 may be performed by a chip in a terminal device, a chip in an access network device, and a chip in a core network device. In FIG. 2, an example in which the method is performed by a terminal device, an access network device, and a core network device is used for description. An execution body of an access control method shown in another accompanying drawing of the embodiments of this application is similar, and details are not described below Details are as follows:

201. The terminal device sends a first message to the access network device. For example, the first message may be an RRC setup complete message, an RRC setup request message, an RRC resume complete message, or an RRC resume request message.

The first message includes a first PLMN identity of a PNI-NPN that the terminal device requests to access. The first message is used to request to access the PNI-NPN supported by a first cell. The first cell is a cell served by the access network device. After selecting a PNI-NPN that needs to be accessed, the terminal device reports identification information of the selected PNI-NPN to the access network device by using the first message. The first PLMN identity is a PLMN identity in the identification information of the PNI-NPN that needs to be accessed and that is selected by the terminal device. For example, the terminal device chooses to access the PNI-NPN 4 in the foregoing Table 5. In this case, the first PLMN identity is the PLMN identity 4. If the terminal device chooses to access the PNI-NPN 5 in the foregoing Table 5, the first PLMN identity is the PLMN identity 5. It should be understood that the PLMN identity may also be an index of the PLMN identity. Details are similar when the terminal device chooses to access another PNI-NPN, and are not described herein again.

202. The access network device sends a second message to the core network device. For example, the second message may be an initial UE device message (initial UE message).

In this embodiment of this application, after receiving the first message, the access network device sends the second message to the core network device. The second message includes the first PLMN identity.

Content carried in the first message and the second message may have the following two cases:

Case 1: In addition to the first PLMN identity, the first message further includes NAS information, where the NAS information includes a first CAG identifier. In addition to the first PLMN identity, the second message further includes the NAS information, where the NAS information includes the first CAG identifier. That is, both the first message and the second message include the first PLMN identity and the first CAG identifier, and the first CAG identifier is carried in the NAS information. The first CAG identifier is a CAG identifier included in the identification information of the PNI-NPN that needs to be accessed and that is selected by the terminal device. For example, as shown in the foregoing Table 5, if the terminal device requests to access the PNI-NPN 4, the first CAG identifier is the CAG identifier 1. If the terminal device requests to access the PNI-NPN 5, the first CAG identifier is the CAG identifier 1. Details are similar when the terminal device requests to access another PNI-NPN, and are not described herein again. The case 1 is equivalent to the foregoing manner 2 in which the terminal device reports the CAG identifier. Optionally, when the terminal device sends the first PLMN identity and the first CAG identifier to the access network device, the first PLMN identity and the first CAG identifier may not be sent in a same message. When the access network device sends the first PLMN identity and the first CAG identifier to the core network device, the first PLMN identity and the first CAG identifier may not be sent in a same message.

Case 2: The first information includes the first PLMN identity but does not include the first CAG identifier. The second information includes the first PLMN identity but does not include the first CAG identifier. The first CAG identifier is a CAG identifier included in the identification information of the PNI-NPN that needs to be accessed and that is selected by the terminal device. This is equivalent to the foregoing manner 3 in which the terminal device reports the CAG identifier. To be specific, the terminal device reports the selected CAG identifier neither in the AS information nor in the NAS information.

In a possible implementation, because the access network device cannot determine whether the terminal device requests to access a public network or a PNI-NPN, after receiving the first message, the access network device verifies whether the first PLMN identity is a PLMN identity corresponding to a PNI-NPN or a public network supported by the first cell. If the first PLMN identity is a PLMN corresponding to a PNI-NPN or a public network supported by the first cell, the access network device sends the second message to the AMF. If the first PLMN identity is not a PLMN corresponding to a PNI-NPN or a public network supported by the first cell, the access network device directly rejects the access request of the terminal device.

203. The core network device sends a third message to the access network device based on subscription information of the terminal device when the terminal device is allowed to access a network. For example, the third message may be an initial context setup request message.

In this embodiment of this application, after receiving the second message from the access network device, the core network device sends the third message to the access network device based on (or according to) the subscription information and/or registration information of the terminal device when the terminal device is allowed to access a network, where the third message includes the subscription information of the terminal device.

In a possible implementation, the subscription information of the terminal device includes one or more of the following information: identification information of a PNI-NPN accessible by the terminal device, a PLMN identity of a PLMN accessible by the terminal device, or an indication (CAG access only indication) of whether the terminal device is allowed to access a network only by using a CAG cell. For example, the PNI-NPN identification information of the PNI-NPN accessible by the terminal device may be shown in the foregoing Table 5. The PLMN identity of the PLMN accessible by the terminal device may be shown in the foregoing Table 6. When a value of the indication of whether the terminal device is allowed to access a network only by using a CAG cell is yes, it indicates that the terminal device is allowed to access a network only by using a CAG cell, that is, the terminal device is allowed to access a network by using a CAG cell but cannot access the network by using a public network cell. The network may be a 5G network, a 5G system, or another future network. When the value of the indication of whether the terminal device is allowed to access a network only by using a CAG cell is no, it indicates that the terminal device is allowed to access a network by using a CAG cell and is allowed to access the network by using a public network cell. When the subscription information of the terminal device does not include the indication of whether the terminal device is allowed to access a network only by using a CAG cell, and does not include the PNI-NPN identification information of the PNI-NPN accessible by the terminal device, it indicates that the terminal device is allowed to access a network by using a public network cell but cannot access the network by using a CAG cell. When the subscription information of the terminal device does not include the indication of whether the terminal device is allowed to access a network only by using a CAG cell, but includes the PNI-NPN identification information of the PNI-NPN accessible by the terminal device, it indicates that the terminal device is allowed to access a network by using a CAG cell and is allowed to access the network by using a public network cell.

In a possible implementation, the core network device may send the third information to the access network device not only based on the subscription information of the terminal device but also based on the first PLMN identity and/or the first CAG identifier.

For a case in which the core network device allows or does not allow based on the subscription information of the terminal device, the terminal device to access the network, or a case in which the core network device allows or does not allow, based on the subscription information of the terminal device and the first PLMN identity and/or the first CAG identifier, the terminal device to access a network, refer to descriptions corresponding to the following implementation 1 to implementation 3. Details are not described herein.

By performing step 203, the core network device can perform access control on the terminal device based on the subscription information of the terminal device. This helps ensure that a network accessed by the terminal device is a network that the terminal device is capable of accessing.

204. The access network device sends, when the terminal device is not allowed to access a network, a fourth message to the core network device based on the subscription information of the terminal device and information about a network that is supported by the first cell and that the terminal device requests to access. For example, the fourth message may be an initial context setup failure message, a registration reject message, or an error indication message.

In this embodiment of this application, after receiving the third message, the access network device sends, based on the subscription information of the terminal device and the information about the network that is supported by the first cell and that the terminal device requests to access, the fourth message to the core network device when the terminal device is not allowed to access a network, where the fourth message is used to indicate a network access failure of the terminal device.

In a possible implementation, the first cell is a PNI-NPN cell that the terminal device requests to access. The information about the network supported by the first cell includes PNI-NPN identification information and/or a PLMN identity. For example, when the first cell is a cell 1, the information about the network supported by the first cell includes the PNI-NPN identification information shown in the foregoing Table 1, and PLMN identities supported by the first cell may be shown in the foregoing Table 3. If the first cell supports only one PNI-NPN, the PNI-NPN identification information supported by the first cell may not exist in a list form. If the first cell supports only one public network, the PLMN identity supported by the first cell may not exist in a form.

In a possible implementation, the access network device may send the fourth information to the core network device not only based on the information about the network supported by the first cell and the subscription information of the terminal device, but also based on the first PLMN identity and/or the first CAG identifier.

Figure 3:
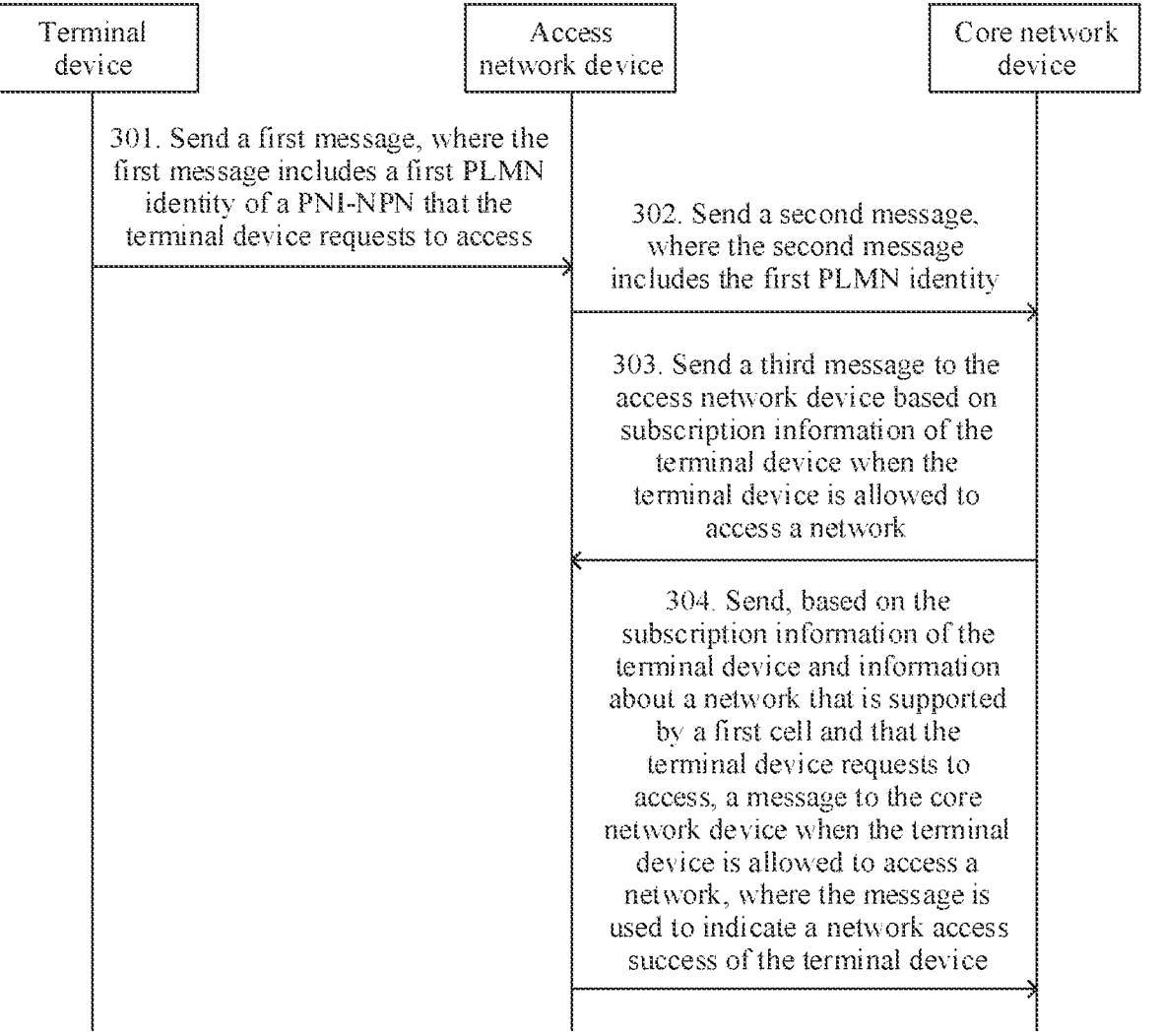

In a possible implementation, as shown in FIG. 3, in step 304, after the access network device receives the third message, the access network device sends, based on the subscription information of the terminal device and the information about the network that is supported by the first cell and that the terminal device requests to access, a message to the core network device when the terminal device is allowed to access a network, where the message is used to indicate a network access success of the terminal device. Specific implementations of step 301 to step 303 are the same as specific implementations of step 201 to step 203, and details are not described herein again.

For a case in which the access network device allows or does not allow, based on the information about the network supported by the first cell and the subscription information of the terminal device, the terminal device to access a network, or a case in which the access network device allows or does not allow, based on the information about the network supported by the first cell, the subscription information of the terminal device, and the first PLMN identity and/or the first CAG identifier, the terminal device to access a network, refer to descriptions corresponding to the following implementation 1 to implementation 3. Details are not described herein.

It can be learned that by performing the method described in FIG. 2, the access network device may receive the subscription information of the terminal device that is from the core network device, so that the access network device can perform access control on the terminal device based on the information about the network supported by the first cell and the subscription information of the terminal device. This helps the terminal device access a correct cell.

Based on three different implementations, the following describes the case in which the core network device allows or does not allow based on the subscription information of the terminal device, the terminal device to access a network, and the case in which the access network device allows or does not allow, based on the information about the network supported by the first cell and the subscription information of the terminal device, the terminal device to access a network.

The subscription information of the terminal device includes one or more of the following information: the PNI-NPN identification information of the PNI-NPN accessible by the terminal device, the identity of the PLMN accessible by the terminal device, or the indication of whether the terminal device is allowed to access a network only by using a CAG cell. The information about the network supported by the first cell includes PNI-NPN identification information and/or a PLMN identity Implementation 1:

In the implementation 1, the NAS information of the first message may include the first CAG identifier, and the NAS information of the second message may also include the first CAG identifier. Alternatively, the first message and the second message may not include the first CAG identifier. The case in which the core network device allows, based on the subscription information of the terminal device, the terminal device to access a network includes one or more of the following three cases a1 to a3:

a1. The subscription information indicates that the terminal device is allowed to access a network by using a CAG cell but cannot access the network by using a public network cell, and the PNI-NPN identification information of the PNI-NPN accessible by the terminal device is not empty.

a2. When the subscription information indicates that the terminal device is allowed to access a network by using both a CAG cell and a public network cell, the PLMN identity of the PLMN accessible by the terminal device includes the first PLMN identity, or the PNI-NPN identification information of the PNI-NPN accessible by the terminal device is not empty.

a3. The subscription information indicates that the terminal device is allowed to access a network by using a public network cell but cannot access the network by using a CAG cell, and the PLMN identity of the PLMN accessible by the terminal device includes the first PLMN identity.

Correspondingly, the case in which the access network device does not allow; based on the information about the network supported by the first cell and the subscription information of the terminal device, the terminal device to access a network includes one or more of the following three cases b1 to b3:

b1. The subscription information indicates that the terminal device is allowed to access a network by using a CAG cell but cannot access the network by using a public network cell, and the first cell does not support the PNI-NPN accessible by the terminal device.

b2. The subscription information indicates that the terminal device is allowed to access a network by using both a CAG cell and a public network cell, the first cell does not support a public network identified by the first PLMN identity, and the first cell does not support the PNI-NPN accessible by the terminal device.

b3. The subscription information indicates that the terminal device is allowed to access a network by using a public network cell but cannot access the network by using a CAG cell, and the first cell does not support a public network identified by the first PLMN identity.

In other words, provided that the core network device determines that the subscription information of the terminal device belongs to any one of the cases a1 to a3, the core network device may allow the terminal device to access the network, and send the third message to the access network device. Provided that the access network device determines the subscription information of the terminal device belongs to any one of the cases b1 to b3, the access network device does not allow the terminal device to access the network, and sends the fourth information to the core network device. Certainly, the case in which the core network device allows the terminal device to access a network may include only two cases or one case in a1 to a3. For example, if the case in which the terminal device is allowed to access a network includes only two cases: a1 and a2, when the core network device determines that the subscription information of the terminal device belongs to a1 or a2, the core network device may send the third message to the access network device. For another example, if the case in which the terminal device is allowed to access a network includes only the case a1, when the core network device determines that the subscription information of the terminal device belongs to a1, the core network device may send the third message to the access network device. The case in which the access network device does not allow, based on the information about the network supported by the first cell and the subscription information of the terminal device, the terminal device to access a network is similar, and details are not described herein. The following implementation method 2 and implementation method 3 are similar to the implementation 1, and details are not described below.

The following further describes, by using specific examples, the case in which the core network device allows, based on the subscription information of the terminal device, the terminal device to access a network and the case in which the access network device does not allow, based on the information about the network supported by the first cell and the subscription information of the terminal device, the terminal device to access a network in the implementation 1.

The terminal device needs to request to access the PNI-NPN 4 of the cell 1. The identification information of the PNI-NPN 4 includes the PLMN identity 4 and the CAG identifier 1. The terminal device sends the first message to the access network device, where the first message includes the PLMN identity 4, and the first message is used to request to access the PNI-NPN 4 of the cell 1. After receiving the first message, the access network device sends the second message to the core network device, where the second message includes the PLMN identity 4.

It is assumed that the value of the indication of whether the terminal device is allowed to access a network only by using a CAG cell is yes (that is, the terminal device is allowed to access a network by using a CAG cell but cannot access the network by using a public network cell). As shown in the foregoing Table 5, because the PNI-NPN identification information of the terminal device is not empty, the core network device sends the third message to the access network device.

It is assumed that the value of the indication of whether the terminal device is allowed to access a network only by using a CAG cell is no (that is, the terminal device is allowed to access a network by using a CAG cell and is allowed to access the network by using a public network cell). Alternatively, when the subscription information of the terminal device does not include the indication of whether the terminal device is allowed to access a network only by using a CAG cell, but includes the PNI-NPN identification information of the PNI-NPN accessible by the terminal device, it indicates that the terminal device is allowed to access a network by using a CAG cell and is allowed to access the network by using a public network cell. As shown in the foregoing Table 5 and Table 6, because of either of two conditions that the PNI-NPN identification information of the terminal device is not empty, and the PLMN identity of the terminal device includes the PLMN identity 4, the core network device sends the third message to the access network device.

It is assumed that the subscription information of the terminal device does not include the indication of whether the terminal device is allowed to access a network only by using a CAG cell, and does not include the PNI-NPN identification information of the PNI-NPN accessible by the terminal device, it indicates that the terminal device is allowed to access a network by using a public network cell but cannot access the network by using a CAG cell. As shown in the foregoing Table 6, because the PLMN identity of the terminal device includes the PLMN identity 4, the core network device sends the third message to the access network device.

After the access network device receives the third message, the access network device determines, based on information about a network supported by the cell 1 and the subscription information of the terminal device, whether to allow the terminal device to access a network. It is assumed that the subscription information of the terminal device indicates that the terminal device is allowed to access a network by using a CAG cell but cannot access the network by using a public network cell. As shown in the foregoing Table 1, the cell 1 does not support the PNI-NPN 4 to the PNI-NPN 7 accessible by the terminal device. Therefore, the access network device determines not to allow the terminal device to access a network, and the access network device sends the fourth message to the core network device, to indicate a network access failure of the terminal device.

It is assumed that the subscription information of the terminal device indicates that the terminal device is allowed to access a network by using a CAG cell and is allowed to access the network by using a public network cell. As shown in the foregoing Table 1, the cell 1 does not support the PIN-NPN 4 to the PNI-NPN 7 accessible by the terminal device. As shown in the foregoing Table 3, the cell 1 does not support the PLMN 4. Therefore, the access network device does not allow the terminal device to access a network.

It is assumed that the subscription information of the terminal device indicates that the terminal device cannot access a network by using a CAG cell but is allowed to access the network by using a public network cell. As shown in the foregoing Table 3, the cell 1 does not support the PLMN 4. Therefore, the access network device does not allow the terminal device to access a network.

The core network device allows the terminal device to access a network only in the foregoing cases a1 to a3. This helps ensure that the network accessed by the terminal device is a network that the terminal device is capable of accessing. In the foregoing cases b1 to b3, the access network device does not allow the terminal device to access a network. This can avoid a case in which a PNI-NPN accessed by the terminal device is a PNI-NPN not supported by the first cell and a case in which a public network accessed by the terminal device is a public network not supported by the first cell.

The following describes the case in which the core network device does not allow, based on the subscription information of the terminal device, the terminal device to access a network.

Corresponding to a1 to a3, the case in which the core network device does not allow, based on the subscription information of the terminal device, the terminal device to access a network includes one or more of the following three cases c1 to c3:

c1. When the subscription information indicates that the terminal device is allowed to access a network by using a CAG cell but cannot access the network by using a public network cell, the PNI-NPN identification information of the PNI-NPN accessible by the terminal device is empty.

c2. The subscription information indicates that the terminal device is allowed to access a network by using both a CAG cell and a public network cell, the PLMN identity of the PLMN accessible by the terminal device does not include the first PLMN identity, and the PNI-NPN identification information of the terminal device is empty.

c3. The subscription information indicates that the terminal device is allowed to access a network by using a public network cell but cannot access the network by using a CAG cell, and the PLMN identity of the PLMN accessible by the terminal device does not include the first PLMN identity.

In the foregoing cases c1 to c3, the core network device does not allow the terminal device to access a network. This helps ensure that the network accessed by the terminal device is a network that the terminal device is capable of accessing.

The following describes the case in which the access network device allows, based on the information about the network supported by the first cell and the subscription information of the terminal device, the terminal device to access a network.

Corresponding to b1 to b3, the case in which the access network device allows, based on the subscription information of the terminal device, the terminal device to access a network includes one or more of the following three cases d1 to d3:

d1. The subscription information indicates that the terminal device is allowed to access a network by using a CAG cell but cannot access the network by using a public network cell, and the first cell supports the PNI-NPN accessible by the terminal device.

d2. When the subscription information indicates that the terminal device is allowed to access a network by using both a CAG cell and a public network cell, the first cell supports a public network identified by the first PLMN identity, and the PLMN identity of the PLMN accessible by the terminal device includes the first PLMN identity. Alternatively, when the subscription information indicates that the terminal device is allowed to access a network by using both a CAG cell and a public network cell, the first cell supports the PNI-NPN accessible by the terminal device.

d3. The subscription information indicates that the terminal device is allowed to access a network by using a public network cell but cannot access the network by using a CAG cell, and the first cell supports a public network identified by the first PLMN identity.

Implementation 2:

The NAS information of the first message and the NAS information of the second message further include the first CAG identifier, and the third message further includes the first CAG identifier.

The case in which the core network device allows, based on the subscription information of the terminal device, the terminal device to access a network includes one or more of the following three cases a1 to a3:

a1. When the subscription information indicates that the terminal device is allowed to access a network by using a CAG cell but cannot access the network by using a public network cell, a first PNI-NPN identified by a first CAG identifier and the first PLMN identity is a PNI-NPN accessible by the terminal device.

a2. When the subscription information indicates that the terminal device is allowed to access a network by using both a CAG cell and a public network cell, the PLMN identity of the PLMN accessible by the terminal device includes the first PLMN identity, or the first PNI-NPN is a PNI-NPN accessible by the terminal device.

a3. This case is the same as a3 in the implementation 1, and details are not described herein again.

Correspondingly, the case in which the access network device does not allow, based on the information about the network supported by the first cell and the subscription information of the terminal device, the terminal device to access a network includes one or more of the following three cases b1 to b3:

b1. The subscription information indicates that the terminal device is allowed to access a network by using a CAG cell but cannot access the network by using a public network cell, and the first cell does not support a first PNI-NPN identified by a first CAG identifier and the first PLMN identity.

b2. The subscription information indicates that the terminal device is allowed to access a network by using both a CAG cell and a public network cell, the first cell does not support a public network identified by the first PLMN identity, and the first cell does not support a first PNI-NPN.

b3. This case is the same as b3 in the implementation 1, and details are not described herein again.

In a possible implementation, when a1 to a3 in the implementation 2 are not satisfied, if a1 to a3 in the implementation 1 are satisfied, the core network device allows the terminal device to access a network, and sends the third message to the access network device. For example, the core network device may first determine whether a1 to a3 in the implementation 2 are satisfied, and then determine, when determining that a1 to a3 in the implementation 2 are not satisfied, whether a1 to a3 in the implementation 1 are satisfied. If a1 to a3 in the implementation 1 are satisfied, the core network device sends the third message to the access network device.

In the foregoing cases a1 to a3, the core network device allows the terminal device to access a network. This helps ensure that the network accessed by the terminal device is a network that the terminal device is capable of accessing. In the foregoing cases b1 to b3, the access network device does not allow the terminal device to access a network. This can avoid a case in which a PNI-NPN accessed by the terminal device is a PNI-NPN not supported by the first cell and a case in which a public network accessed by the terminal device is a public network not supported by the first cell.

The following describes the case in which the core network device does not allow, based on the subscription information of the terminal device, the terminal device to access a network.

Corresponding to a1 to a3 in the implementation 2, the case in which the core network device does not allow, based on the subscription information of the terminal device, the terminal device to access a network includes one or more of the following three cases c1 to c3:

c1. When the subscription information indicates that the terminal device is allowed to access a network by using a CAG cell but cannot access the network by using a public network cell, and a first PNI-NPN identified by a first CAG identifier and the first PLMN identity is not a PNI-NPN accessible by the terminal device.

c2. The subscription information indicates that the terminal device is allowed to access a network by using both a CAG cell and a public network cell, the PLMN identity of the terminal device does not include the first PLMN identity, and the first PNI-NPN is not a PNI-NPN accessible by the terminal device.

c3, This case is the same as c3 in the implementation 1, and details are not described herein again.

In the foregoing cases c1 to c3, the core network device does not allow the terminal device to access a network. This helps ensure that the network accessed by the terminal device is a network that the terminal device is capable of accessing.

The following describes the case in which the access network device allows, based on the information about the network supported by the first cell and the subscription information of the terminal device, the terminal device to access a network.

Corresponding to b1 to b3 in the implementation 2, the case in which the access network device allows, based on the subscription information of the terminal device, the terminal device to access a network includes one or more of the following three cases d1 to d3:

d1. The subscription information indicates that the terminal device is allowed to access a network by using a CAG cell but cannot access the network by using a public network cell, and the first cell supports a first PNI-NPN identified by a first CAG identifier and the first PLMN identity.

d2. When the subscription information indicates that the terminal device is allowed to access a network by using both a CAG cell and a public network cell, the first cell supports a public network identified by the first PLMN identity and the PLMN identity of the terminal device includes the first PLMIN identity, or the first cell supports a first PNI-NPN and the first PNI-NPN is a PNI-NPN accessible by the terminal device.

d3. This case is the same as d3 in the implementation 1, and details are not described herein again.

Implementation 3:

In the implementation 3, the NAS information of the first message may include the first CAG identifier, and the NAS information of the second message may also include the first CAG identifier. Alternatively, the first message and the second message may not include the first CAG identifier.

The case in which the core network device allows, based on the subscription information of the terminal device, the terminal device to access a network includes one or more of the following three cases a1 to a3:

a1. When the subscription information indicates that the terminal device is allowed to access a network by using a CAG cell but cannot access the network by using a public network cell, the PNI-NPN identification information of the PNI-NPN accessible by the terminal device includes the first PLMN identity.

a2. When the subscription information indicates that the terminal device is allowed to access a network by using both a CAG cell and a public network cell, the PLMN identity of the PLMN accessible by the terminal device includes the first PLMN identity, or the PNI-NPN identification information of the PNI-NPN accessible by the terminal device includes the first PLMN identity.

a3. This case is the same as a3 in the implementation 1, and details are not described herein again.

Correspondingly, the case in which the access network device does not allow based on the information about the network supported by the first cell and the subscription information of the terminal device, the terminal device to access a network includes one or more of the following three cases b1 to b3:

b1. The subscription information indicates that the terminal device is allowed to access a network by using a CAG cell but cannot access the network by using a public network cell, and the first cell does not support a PNI-NPN that is identified by the first PLMN identity and that is accessible by the terminal device.

b2. The subscription information indicates that the terminal device is allowed to access a network by using both a CAG cell and a public network cell, the first cell does not support a public network identified by the first PLMN identity, and the first cell does not support a PNI-NPN that is identified by the first PLMN identity and that is accessible by the terminal device.

b3. This case is the same as b3 in the implementation 1, and details are not described herein again.

In the foregoing cases a1 to a3, the core network device allows the terminal device to access a network. This helps ensure that the network accessed by the terminal device is a network that the terminal device is capable of accessing. In the foregoing cases b1 to b3, the access network device does not allow the terminal device to access a network. This can avoid a case in which a PNI-NPN accessed by the terminal device is a PNI-NPN not supported by the first cell and a case in which a public network accessed by the terminal device is a public network not supported by the first cell.

The following describes the case in which the core network device does not allow, based on the subscription information of the terminal device, the terminal device to access a network.

Corresponding to a1 to a3, the case in which the core network device does not allow, based on the subscription information of the terminal device, the terminal device to access a network includes one or more of the following three cases c1 to c3:

c1. When the subscription information indicates that the terminal device is allowed to access a network by using a CAG cell but cannot access the network by using a public network cell, the PNI-NPN identification information of the PNI-NPN accessible by the terminal device does not include the first PLMN identity.

c2. The subscription information indicates that the terminal device is allowed to access a network by using both a CAG cell and a public network cell, the PLMN identity of the PLMN accessible by the terminal device does not include the first PLMN identity, and the PNI-NPN identification information of the terminal device does not include the first PLMN identity.

c3. This case is the same as c3 in the implementation 1, and details are not described herein again.

In the foregoing cases c1 to c3, the core network device does not allow the terminal device to access a network. This helps ensure that the network accessed by the terminal device is a network that the terminal device is capable of accessing.

The following describes the case in which the access network device allows, based on the information about the network supported by the first cell and the subscription information of the terminal device, the terminal device to access a network.

Corresponding to b1 to b3, the case in which the access network device allows, based on the subscription information of the terminal device, the terminal device to access a network includes one or more of the following three cases d1 to d3:

d1. The subscription information indicates that the terminal device is allowed to access a network by using a CAG cell but cannot access the network by using a public network cell, and the first cell supports a PNI-NPN that is identified by the first PLMN identity and that is accessible by the terminal device.

d2. When the subscription information indicates that the terminal device is allowed to access a network by using both a CAG cell and a public network cell, the first cell supports a public network identified by the first PLMN identity and the PLMN identity of the terminal device includes the first PLMN identity, or the first cell supports a PNI-NPN that is identified by the first PLMN identity and that is accessible by the terminal device.

d3. This case is the same as d3 in the implementation 1, and details are not described herein again.

In the foregoing cases d1 to d3, the access network device allows the terminal device to access a network. This can avoid a case in which a PNI-NPN accessed by the terminal device is a PNI-NPN not supported by the first cell and a case in which a public network accessed by the terminal device is a public network not supported by the first cell.

In a possible implementation, the foregoing implementation 1 to implementation 3 may be further improved. The following describes improvements of the implementation 1 to the implementation 3.

Improvement 1 of the Implementation 1:

When b1 or b2 in the implementation 1 is satisfied, the access network device may not send the fourth message to the core network device.

Figure 4A:
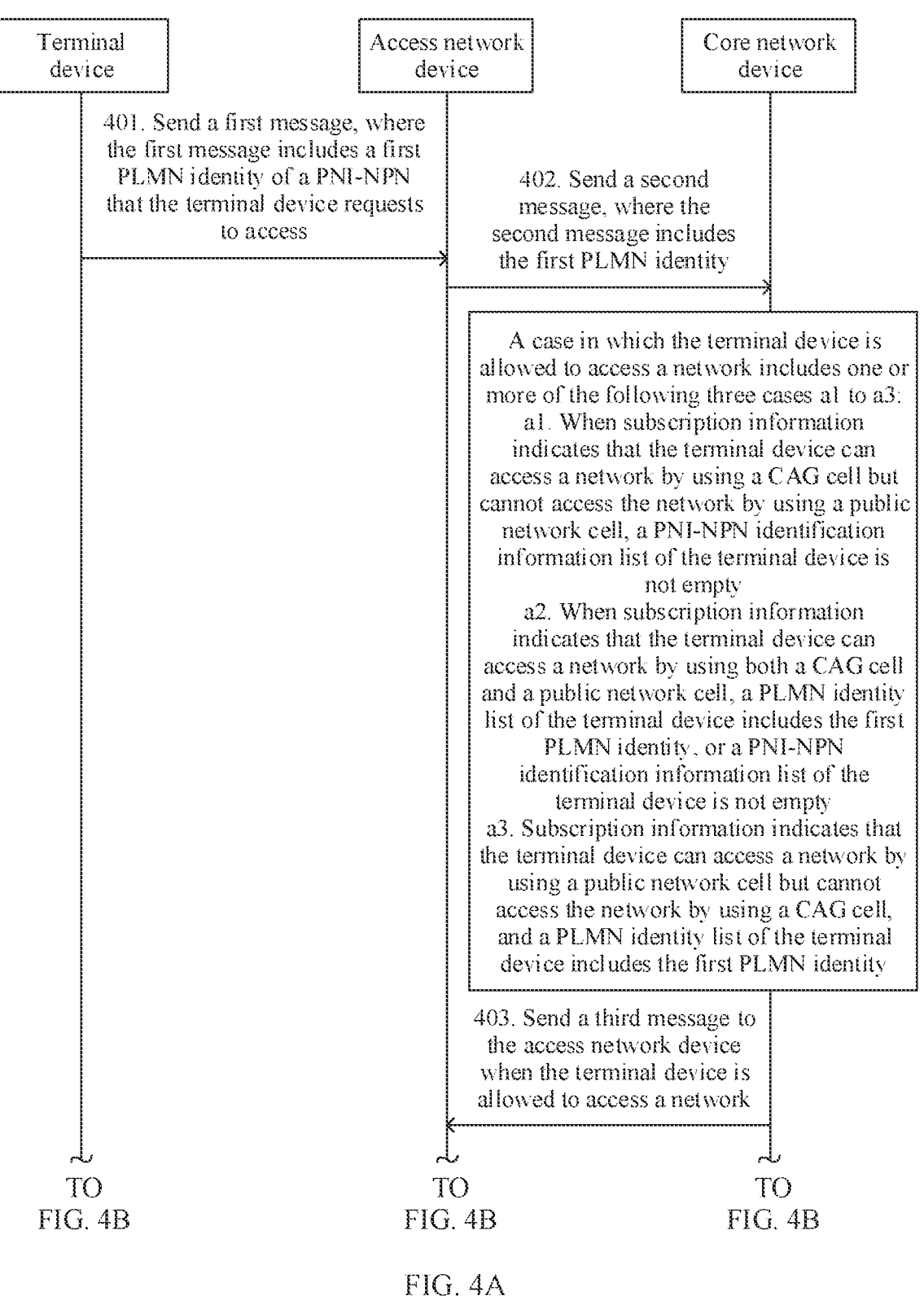

For example, referring to FIG. 4A and FIG. 4B, specific implementations of step 401 to step 403 in FIG. 4A are the same as those of step 201 to step 203, and details are not described herein again. As shown in FIG. 4B, in step 404, the access network device sends first target information to the core network device, and the first target information includes at least an identifier of a second cell. Optionally, the first target information further includes a second CAG identifier and/or a second PLMN identity. The second CAG identifier is the same as or different from the first CAG identifier. The second PLMN identity is the same as or different from the first PLMN identity. The second cell is a cell that supports a second PNI-NPN identified by the second CAG identifier and the second PLMN identity, and the terminal device is allowed to access the second PNI-NPN. In FIG. 4A and FIG. 4B, an example in which the first target information includes the identifier of the second cell, the second CAG identifier, and the second PLMN identity is used. After receiving the first target information, the core network device may connect the terminal device to the second PNI-NPN of the second cell.

In step 405, the access network device may further send the first target information to the terminal device, to instruct the terminal device to access the second PNI-NPN of the second cell. Optionally, the access network device may not send the first target information to the terminal device, and the core network device forwards the first target information to the terminal device after receiving the target information. Alternatively, the access network device does not send the first target information to the core network device, and the terminal device forwards the first target information to the core network device after receiving the first target information.

Optionally, if the second PNI-NPN is the same as the first PNI-NPN, the first target information may not include the second PNI-NPN identification information. If the second PNI-NPN is different from the first PNI-NPN, the first target information includes the second PNI-NPN identification information. Optionally, if the second PLMN identity is the same as the first PLMN identity, the first target information may not include the second PLMN identity. If the second PLMN identity is different from the first PLMN identity, the first target information includes the second PLMN identity. If the second CAG identifier is the same as the first CAG identifier, the first target information may not include the second CAG identifier. Otherwise, the first target information includes the second CAG identifier. Optionally, the access network device may send the first target information to the terminal device by using an RRC reconfiguration message. Optionally, the access network device may send the RRC reconfiguration message in an initial access process or a handover process.

For example, the terminal device requests to access the PNI-NPN4 in the cell 1. The identification information of the PNI-NPN 4 includes the PLMN identity 4 and the CAG identifier 1. As shown in the foregoing Table 1, the cell 1 does not support the PNI-NPN 4. As shown in the foregoing Table 2, the cell 2 supports the PNI-NPN4. Therefore, the access network device sends the first target information to the core network device, where the first target information includes an identifier of the cell 2, to instruct the core network device to connect the terminal device to the PNI-NPN 4 of the second cell. Alternatively, the access network device reselects, from the PNI-NPN accessible by the terminal device, a PNI-NPN supported by the cell 2. For example, if the PNI-NPN 5 is selected, the access network device sends the first target information to the core network device, where the first target information includes the identifier of the cell 2 and the PNI-NPN identifier 5, to instruct the core network device to connect the terminal device to the PNI-NPN 5 in the cell 2. Because a CAG identifier in the PNI-NPN identifier 5 is the CAG identifier 1, a CAG identifier in the PNI-NPN identifier 1 is also the CAG identifier 1. Therefore, the first target information may include the identifier of the cell 2 and the PLMN identity 5.

Improvement 1 of the Implementation 2:

When b1 or b2 in the implementation 2 is satisfied, the access network device may not send the fourth message to the core network device. In the improvement 1 of the implementation 2, the access network device may also perform the operation performed by the access network device in the improvement 1 in the implementation 1. A difference lies in that, in the improvement 1 of the implementation 2, the first target information includes at least an identifier of a second cell, or may further include the first PLMN identity and the first CAG identifier. The second cell is a cell that supports the first PNI-NPN identified by the first PLMN identity and the first CAG identifier. Alternatively, the first target information includes at least a second CAG identifier, or further includes an identifier of the first cell or the first PLMN identity. A second PNI-NPN identified by the second CAG identifier and the first PLMN identity is a PNI-NPN accessible by the terminal device.

Improvement 1 of the Implementation 3:

When 1 or b2 in the implementation 3 is satisfied, the access network device may not send the fourth message to the core network device. In the improvement 1 of the implementation 3, the access network device may also perform the operation performed by the access network device in the improvement 1 in the implementation 1. A difference lies in that, in the improvement 1 of the implementation 3, the first target information includes at least an identifier of a second cell and a second CAG identifier, or may further include the first PLMN identity. A PNI-NPN identified by the second CAG identifier and the first PLMN identity is a PNI-NPN supported by the second cell.

Alternatively, in the improvement 1 of the implementation 3, the first target information includes at least an identifier of a second cell, or may further include the first CAG identifier and/or the first PLMN identity. The second cell supports a PNI-NPN identified by the first CAG identifier and the first PLMN identity.

Alternatively, in the improvement 1 of the implementation 3, the first target information includes at least a second CAG identifier, or further includes the first PLMN identity and/or an identifier of the first cell. The first cell supports a network identified by the second CAG identifier and the first PLMN identity.

In the case of b2 or b3 in the implementation 1, b2 or b3 in the implementation 2, or b2 or b3 in the implementation 3, the access network device may not send the fourth message to the core network device. The access network device may store a PLMN identity supported by a second cell. The access network device may select a second cell that supports a public network identified by the first PLMN identity. The access network device may send an identifier of the second cell to the core network device. After receiving the identifier of the second cell, the core network device may connect the terminal device to the public network that is identified by the first PLMN identity that is supported by the second cell. The access network device may further send the identifier of the second cell to the terminal device. Alternatively, the access network device sends the identifier of the second cell to the terminal device, and the terminal device forwards the identifier of the second cell to the core network device. After receiving the identifier of the second cell, the core network device connects the terminal device to the public network that is identified by the first PLMN identity and that is of the second cell. Optionally, in addition to sending the identifier of the second cell to the core network device or the terminal device, the access network device may further send the first CAG identifier and/or the first PLMN identity to the core network device or the terminal device. Optionally, the access network device may send the identifier of the second cell to the terminal device by using an RRC reconfiguration message. Optionally, in addition to the identifier of the second cell, the RRC reconfiguration message further includes the first CAG identifier and/or the first PLMN identity. Optionally, the access network device may send the RRC reconfiguration message in an initial access process or a handover process.

Improvement 2 of the Implementation 1:

In the improvement 2 of the implementation 1, the access network device is a first access network device. In the case of b1 or b2 in the implementation 1, the first access network device may not send the fourth message to the core network device.

Figure 5A:
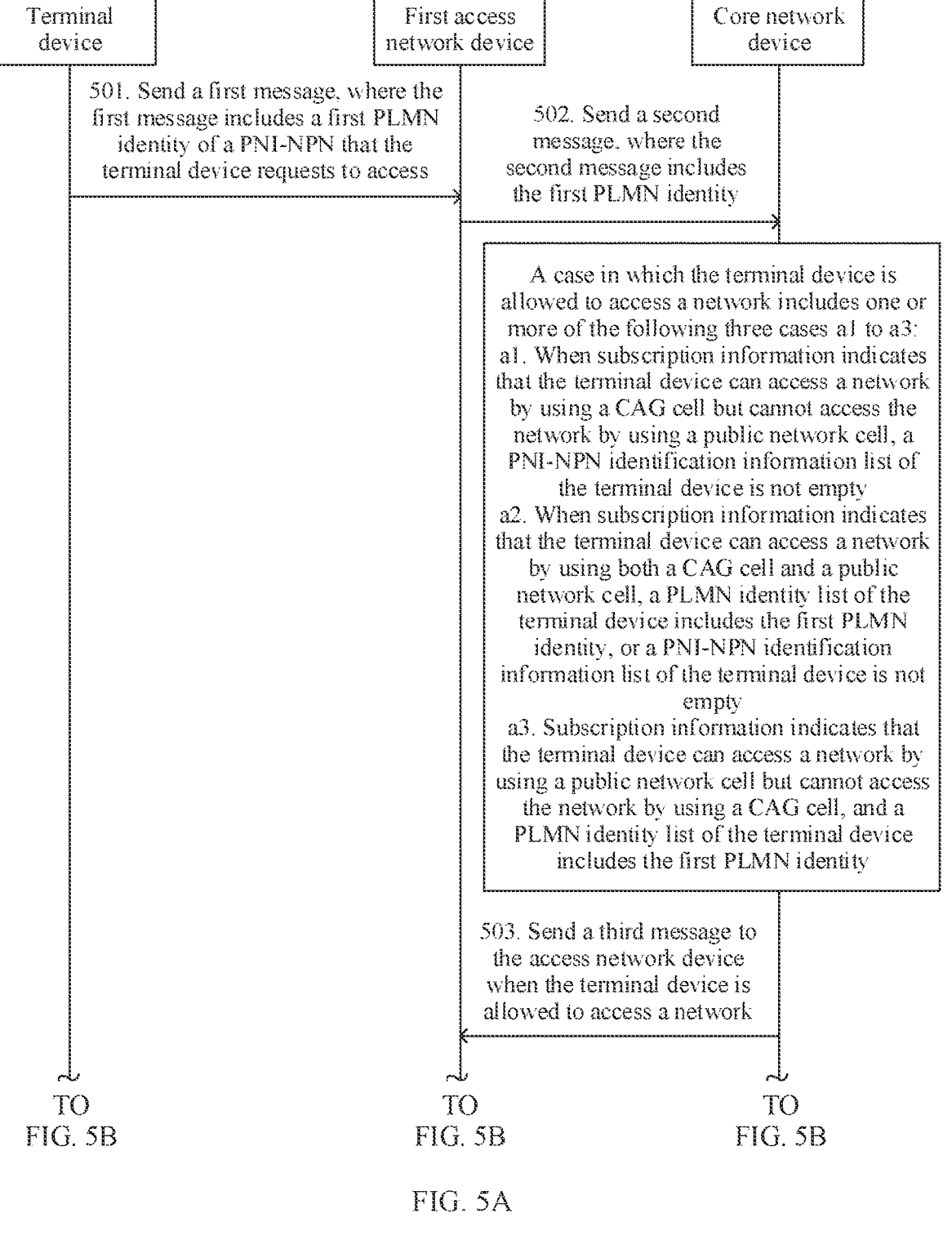

For example, referring to FIG. 5A to FIG. 5C, specific implementations of step 501 to step 503 in FIG. 5A are the same as those of step 201 to step 203, and details are not described herein again. As shown in FIG. 5B, in step 504, the first access network device sends fourth target information to a second access network device. Where the fourth target information includes one or more of the following information: identification information of the terminal device, an identifier of a second cell served by the second access network device, a second CAG identifier, a second PLMN identity, context information of the terminal device, the subscription information of the terminal device, or an identifier of the core network device. The second cell is a cell that supports a second PNI-NPN. The second PNI-NPN identified by the second CAG identifier and the second PLMN identity is a PNI-NPN accessible by the terminal device.

For example, the fourth target information may include the identification information of the terminal device, the identifier of the second cell, the second CAG identifier, the second PLMN identity, and the identifier of the core network device. In this way, the second access network device can check whether the second cell supports the second PNI-NPN identified by the second CAG identifier and the second PLMN identity, and when determining that the second cell supports the second PNI-NPN, send fifth target information to the first access network device and send sixth target information to the core network device. For another example, the fourth target information may include the identification information of the terminal device, the identifier of the second cell, the second CAG identifier, the second PLMN identity, the subscription information of the terminal device, and the identifier of the core network device. In this way, the second access network device can check whether the second cell supports the second PNI-NPN identified by the second CAG identifier and the second PLMN identity, check, based on the subscription information of the terminal device, whether the terminal device is allowed to access the second PNI-NPN, and when determining that the second cell supports the second PNI-NPN and the terminal device is allowed to access the second PNI-NPN, send fifth target information to the first access network device and send sixth target information to the core network device. For another example, the fourth target information may include the identification information of the terminal device and the subscription information of the terminal device. In this way, the second access network device selects, for the terminal device based on information about a network supported by a cell served by the second access network device and the subscription information of the terminal device, a network supported by a cell, for the terminal device to access. For another example, the fourth target information may include the identification information of the terminal device, the identifier of the second cell served by the second access network device, the second CAG identifier, the second PLMN identity, the context information of the terminal device, the subscription information of the terminal device, and the identifier of the core network device. In FIG. 5A to FIG. 5C, an example in which the fourth target information includes the identification information of the terminal device, the identifier of the second cell served by the second access network device, the second CAG identifier, the second PLMN identity, and the identifier of the core network device is used.

In step 505, after receiving the fourth target information, the second access network device sends the fifth target information to the first access network device. The fifth target information includes one or more of the following information: the identification information of the terminal device, the identifier of the second cell served by the second access network device, the second CAG identifier, the second PLMN identity, or configuration parameter information used by the terminal device to access the second cell. For example, the configuration parameter information may be configuration parameter information of a signalling radio bearer (SRB) or a data radio bearer (DRB) in the second cell. In FIG. 5A to FIG. 5C, an example in which the fifth target information includes the identification information of the terminal device, the identifier of the second cell, the second CAG identifier, the second PLMN identity, and the configuration parameter information used by the terminal device to access the second cell is used.

Alternatively, the fifth target information includes one or more of the following information: the identification information of the terminal device, an identifier of a third cell served by the second access network device, a third CAG identifier, a third PLMN identity, or configuration parameter information used by the terminal device to access the third cell. A third PNI-NPN identified by the third CAG identifier and the third PLMN identity is a PNI-NPN accessible by the terminal device. The third cell is a cell that supports the third PNI-NPN. In other words, the second access network device reselects, for the terminal device, a PNI-NPN accessible by the terminal device.

In step 506, after receiving the fifth target information, the first access network device sends the fifth target information to the terminal device. Optionally, the first access network device may include the fifth target information in an RRC reconfiguration message. The first access network device may send the fifth target information in an initial access process or a handover process.

In step 507, after receiving the fourth target information, the second access network device sends sixth target information to the core network device. The sixth target information includes one or more of the following information: the identification information of the terminal device, the identifier of the second cell served by the second access network device, the second CAG identifier, or the second PLMN identity. After receiving the sixth target information, the core network device may connect the terminal device to the second PNI-NPN of the second cell. Alternatively, the sixth target information includes one or more of the following information: the identification information of the terminal device, the identifier of the third cell served by the second access network device, the third CAG identifier, or the third PLMN identity. After receiving the sixth target information, the core network device may connect the terminal device to the third PNI-NPN of the third cell. In FIG. 5A to FIG. 5C, an example in which the sixth target information includes the identification information of the terminal device, the identifier of the second cell served by the second access network device, the second CAG identifier, and the second PLMN identity is used.

Improvement 2 of the Implementation 2:

When b1 or b2 in the implementation 2 is satisfied, the access network device may not send the fourth message to the core network device. In the improvement 2 of the implementation 2, the access network device may also perform the operation performed by the access network device in the improvement 2 in the implementation 1. Differences lie in that, in the improvement 2 of the implementation 2, the fourth target information includes one or more of the following information: identification information of the terminal device, an identifier of a second cell served by the second access network device, the first CAG identifier, the first PLMN identity, context information of the terminal device, the subscription information of the terminal device, or an identifier of the core network device.

The fifth target information includes one or more of the following information: the identification information of the terminal device, the identifier of the second cell served by the second access network device, the first CAG identifier, the first PLMN identity, or configuration parameter information used by the terminal device to access the second cell. The second cell is a cell that is served by the second access network device and that supports a network identified by the first CAG identifier and the first PLMN identity.

The sixth target information includes one or more of the following information: the identification information of the terminal device, the identifier of the second cell served by the second access network device, the first CAG identifier, or the first PLMN identity.

Improvement 2 of the Implementation 3:

When b1 or b2 in the implementation 3 is satisfied, the access network device may not send the fourth message to the core network device. In the improvement 2 of the implementation 3, the access network device may also perform the operation performed by the access network device in the improvement 2 in the implementation 1. Differences lie in that, in the improvement 2 of the implementation 3, the fourth target information includes one or more of the following information: identification information of the terminal device, an identifier of a second cell served by the second access network device, a second CAG identifier, the first PLMN identity, context information of the terminal device, the subscription information of the terminal device, or an identifier of the core network device. A PNI-NPN identified by the second CAG identifier and the first PLMN identity is a PNI-NPN supported by the terminal device and the second cell.

The fifth target information includes one or more of the following information: the identification information of the terminal device, the identifier of the second cell served by the second access network device, the second CAG identifier, the first PLMN identity, or configuration parameter information used by the terminal device to access the second cell. For example, the configuration parameter information may be configuration parameter information of all SRB or a DRB in the second cell. Alternatively, the fifth target information includes one or more of the following information: the identification information of the terminal device, an identifier of a, third cell served by the second access network device, a third CAG identifier, the first PLMN identity, or configuration parameter information used by the terminal device to access the second cell. A PNI-NPN identified by the third CAG identifier and the first PLMN identity is a PNI-NPN supported by the terminal device and the third cell.

The sixth target information includes one or more of the following information: the identification information of the terminal device, the identifier of the second cell served by the second access network device, the second CAG identifier, or the first PLMN identity. Alternatively, the sixth target information includes one or more of the following information: the identification information of the terminal device, the identifier of the third cell served by the second access network device, the third CAG identifier, or the first PLMN identity.

In a possible implementation, in the case of b2 or b3 in the implementation 1, b2 or b3 in the implementation 2, or b2 or b3 in the implementation 3, the first access network device may not send the fourth message to the core network device. The first access network device may store a PLMN identity supported by a cell served by the second access network device. The first access network device may determine a second cell that is served by the second access network device and that supports the first PLMN identity. The first access network device may send at least one of an identifier of the second cell, the first PLMN identity, context information of the terminal device, the subscription information of the terminal device, or an identifier of the core network device to the second access network device. The second cell is a cell that is served by the second access network device and that supports a public network identified by the first PLMN identity.

After receiving at least one of the identifier of the second cell, the first PLMN identity, the context information of the terminal device, the subscription information of the terminal device, or the identifier of the core network device, the second access network device sends at least one of the identifier of the terminal device, the identifier of the second cell, the first PLMN identity, and the configuration parameter information of the second cell to the first access network device, and sends at least one of the identifier of the terminal device, the identifier of the second cell, and the first PLMN identity to the core network device. After receiving the at least one of the identifier of the terminal device, the identifier of the second cell, and the first PLMN identity, the core network device connects the terminal device to a public network that is of the second cell and that is identified by the first PLMN identity.

FIG. 6 is a schematic flowchart of an access control method according to an embodiment of this application. As shown in FIG. 6, the access control method includes the following step 601 to step 606. The access control method shown in FIG. 6 is an improvement of the access control method shown in FIG. 2. Details are as follows:

601. A terminal device sends a first message to an access network device.

602. The access network device sends a second message to a core network device.

603. The core network device sends a third message to the access network device based on subscription information of the terminal device when the terminal device is allowed to access a network.

604. The access network device sends, when the terminal device is not allowed to access a network, a fourth message to the core network device based on the subscription information of the terminal device and information about a network that is supported by a first cell and that the terminal device requests to access.

For specific implementations of step 601 to step 604, refer to the descriptions in the foregoing embodiment, and details are not described herein again.

The fourth message may include a cause value, and the cause value is used to indicate a cause of a network access failure of the terminal device.

For example, when the terminal device is allowed to access a network by using a CAG cell but cannot access the network by using a public network cell, the cause value may indicate: A cell that the terminal device requests to access does not support any PNI-NPN accessible by the terminal device, or a cell that the terminal device requests to access does not support a PNI-NPN that is identified by the first PLMN identity and that is accessible by the terminal device.

Alternatively, when the terminal device is allowed to access a network by using both a CAG cell and a public network cell, the cause value may indicate: A cell that the terminal device requests to access does not support any PNI-NPN accessible by the terminal device, and the cell that the terminal device requests to access does not support a public network accessible by the terminal device; or a cell that the terminal device requests to access does not support a PNI-NPN or a public network that is identified by the first PLMN identity and that is accessible by the terminal device. Alternatively, when the terminal device is allowed to access a network by using a public network cell but cannot access the network by using a CAG cell, the cause value may indicate: A cell that the terminal device requests to access does not support a public network accessible by the terminal device, or a cell that the terminal device requests to access does not support a public network that is identified by the first PLMN identity and that is accessible by the terminal device. Optionally, the cause value may be represented by invalid NPN, invalid PNI-NPN, invalid CAG ID(s), invalid network, invalid PLMN, invalid PNI-NPN and PLMN, invalid NPN and PLMN, valid PLMN ID but PNI-NPN unavailable, PNI-NPN available but invalid PLMN ID, valid PLMN ID but NPN unavailable, or the like.

605. The core network device sends a fifth message to the access network device. For example, the fifth message may be a UE context release command, a registration reject message, or an error indication message.

In this embodiment of this application, after receiving the fourth message, the core network device sends the fifth message to the access network device. The fifth message includes the cause value, and the fifth message is used to instruct the access network device to release a resource configured for the terminal device. After receiving the fifth message, the access network device releases the resource configured for the terminal device. Optionally, the resource may be an interface resource, such as an NG interface resource or an S1 interface resource.

606. The access network device sends a sixth message to the terminal device. For example, the sixth message may be an RRC release message.

In this embodiment of this application, after receiving the fifth message, the access network device sends the sixth message to the terminal device. The sixth message includes the cause value, and the sixth message is used to instruct the terminal device to release the RRC connection. After receiving the sixth message, the terminal device releases the RRC connection to the terminal device. Alternatively, the sixth message is used to instruct the terminal device to release an air interface resource. After receiving the sixth message, the terminal device releases the air interface (Uu interface) resource of the terminal device.

According to the method described in FIG. 6, when the terminal device is not allowed to access a network, the RRC connection to the terminal device and the resource that is configured for the terminal device can be released in time.

Figure 7A:
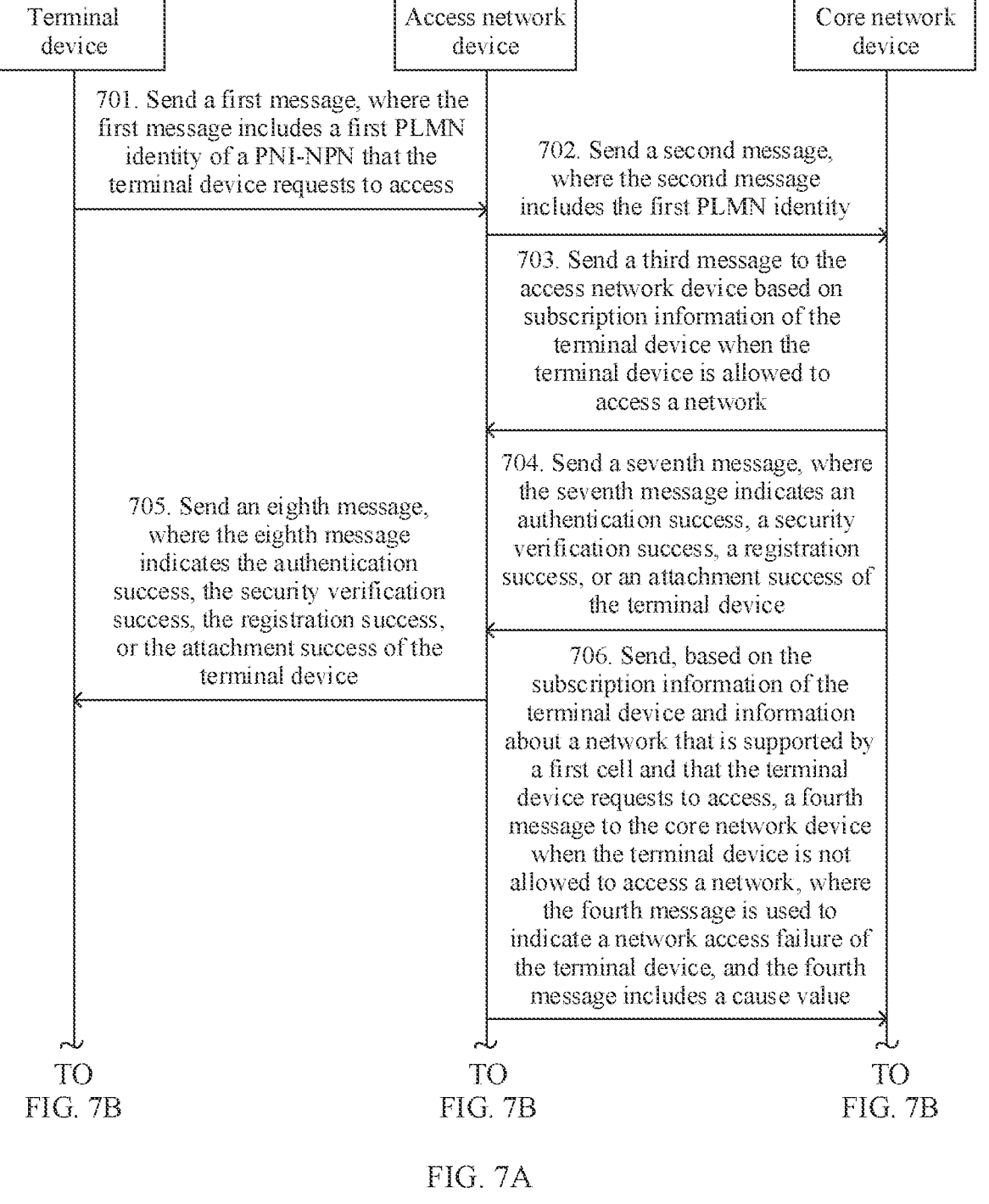

FIG. 7A and FIG. 7B are a schematic flowchart of an access control method according to an embodiment of this application. As shown in FIG. 7A and FIG. 7B, the access control method includes the following step 701 to step 710. The access control method shown in 7A and FIG. 7B is an improvement of the access control method shown in FIG. 6. Compared with that in FIG. 6, the access control method shown in FIG. 7A and FIG. 7B further includes step 704, step 705, step 709, and step 710. Details are as follows:

704. The core network device sends a seventh message to the access network device. For example, the seventh message may be a downlink information transport message or an initial context setup request message.

The seventh message is used to indicate an authentication success, a security verification success, a registration success, or an attachment success of the terminal device.

Step 704 may be performed when the core network device allows, based on the subscription information of the terminal device, the terminal device to access a network. The core network device may first send the seventh message and then send the third message, or the core network device may first send the third message and then send the seventh message. Alternatively, the third message and the seventh message are sent at the same time.

705. The access network device sends an eighth message to the terminal device. For example, the eighth message may be a downlink information transfer message.

In this embodiment of this application, after receiving the seventh message, the access network device sends the eighth message to the terminal device. The eighth message is used to indicate the authentication success, the security verification success, the registration success, or the attachment success of the terminal device.

709. The core network device sends a ninth message to the access network device. For example, the ninth message may be a downlink information transport message, a registration reject message, an error indication message, or an initial context setup failure message.

In this embodiment of this application, after receiving the fourth message, the core network device sends the ninth message to the access network device. The ninth message includes a cause value, and the ninth message indicates an authentication failure, a security verification failure, a registration failure, or an attachment failure of the terminal device. After receiving the fourth message, the core network device may interact with another core network device to release information such as registration of the terminal device and to release a related resource allocated to the terminal device. Step 707 may be performed before, after, or simultaneously with step 709.

710. The access network device sends a tenth message to the terminal device. For example, the tenth message may be a downlink information transfer message, an RRC release message, a registration reject message, or an error indication message.

In this embodiment of this application, after receiving the ninth message, the access network device sends the tenth message to the terminal device. The tenth message includes the cause value, and the tenth message indicates the authentication failure, the security verification failure, the registration failure, or the attachment failure of the terminal device. After receiving the tenth message, the terminal device may perform a detach process to release the registration information.

According to the method described in FIG. 7A and FIG. 7B, when the terminal device is not allowed to access a network, the registration release information of the terminal device can be released in time.

Figure 8:
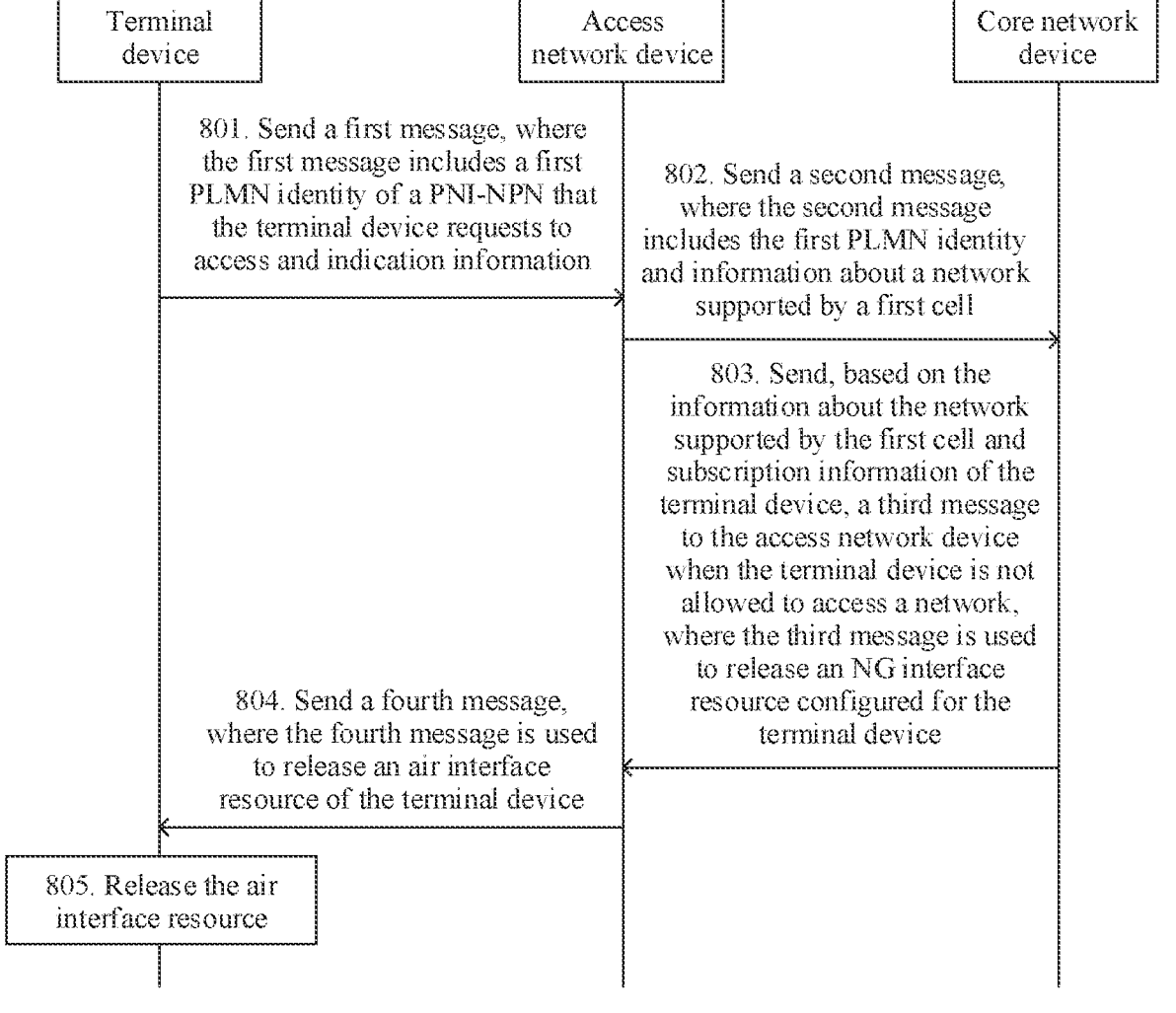

FIG. 8 is a schematic flowchart of an access control method according to an embodiment of this application. The method includes the following step 801 to step 805, Details are as follows:

801. A terminal device sends a first message to an access network device. For a type of the first message, refer to the type of the first message in step 201. Details are not described herein again.

The first message is used to request to access a network of a first cell. The first message includes a first PLMN identity of the network that the terminal device requests to access and indication information. If the terminal device requests to access a PNI-NPN, the first PLMN identity is a PLMN identity of the PNI-NPN. If the terminal device requests to access a public network, the PLMN identity is a PLMN identity of the public network. The first cell is a cell served by the access network device.

The indication information is used to indicate that the terminal device requests to access a PNI-NPN supported by the first cell. For example, when a bit value of the indication information is 0, it indicates that the terminal device requests to access the PNI-NPN supported by the first cell. Alternatively, when a hit value of the indication information is 1, it indicates that the terminal device requests to access the PNI-NPN supported by the first cell.

Alternatively, when the terminal device does not request to access the PNI-NPN supported by the first cell, the first message may not include the indication information. When the terminal device requests to access the PNI-NPN supported by the first cell, the first message includes the indication information. If the first message includes the indication information, the access network device sends information about a network supported by the first cell to a core network device.

In a possible implementation, the indication information is carried in AS information of the first message, so that the access network device can obtain the indication information through parsing. Sending the indication information in the AS information not only avoids a possibility that privacy is leaked due to a CAG ID carried in the AS information, but also enables the access network device to determine, based on the indication information, whether to send, to the core network device, information about the PNI-NPN supported by the first cell. In this way, a probability is avoided that the access network device sends the information about the PNI-NPN supported by the first cell to the core network device even if a public network terminal device requests to access the first cell.

In a possible implementation, the first PLMN identity corresponds to at least two CAG identifiers. If the first PLMN identity corresponds to one CAG identifier, after obtaining the first PLMN identity and the indication information, an unauthorized user can determine, based on a correspondence between a PLMN identity and a CAG identifier, a PNI-NPN that a user expects to access. When the first PLMN identity corresponds to at least two CAG identifiers, the indication information is carried in the first message. In this way, an unauthorized user can be prevented from obtaining information of a PNI-NPN that a user expects to access.

In a possible implementation, when the first PLMN identity corresponds to one CAG identifier, the first message may also include indication information.

In a possible implementation, the first PLMN identity corresponds to at least two CAG identifiers, or the first cell supports at least two CAG identifiers. When requesting to access the PNI-NPN, the terminal device may include the at least two CAG identifiers (or indexes (index) of the at least two CAG identifiers, or indexes of at least two pieces of PNI-NPN identification information) in the AS information of the first message. The indication information may be optionally carried. Optionally, at least one of the at least two CAG identifiers carried in the AS information is a CAG identifier corresponding to the PNI-NPN that the terminal device requests to access. For example, if the first PLMN identity corresponds to at least two CAG identifiers, after an unauthorized user obtains the first PLMN identity and the at least two CAG identifiers in the first message, the unauthorized user cannot determine, based on a correspondence between a PLMN identity and a plurality of CAG identifiers, a specific PNI-NPN that a user expects to access. When the first PLMN identity corresponds to at least two CAG identifiers, or the first cell supports at least two CAG identifiers, the at least two CAG identifiers are carried in the first message, and the indication information is optionally carried. In this way, an unauthorized user can be prevented from obtaining information of a PNI-NPN that a user expects to access.

Optionally, the at least two CAG identifiers carried in the AS information may not include a CAG identifier corresponding to any PNI-NPN that the terminal device requests to access. In this case, the at least two CAG identifiers may have a function of the indication information, to indicate that the terminal device requests to access the PNI-NPN supported by the first cell. The terminal device may request to access one or more PNI-NPNs supported by the first cell.

802. The access network device sends a second message to the core network device. For example, the second message may be an initial UE device message (initial UE message).

In this embodiment of this application, after receiving the first message, the access network device sends the second message to the core network device. The second message includes the first PLMN identity and the information about the network supported by the first cell.

In a possible implementation, the first message further includes NAS information, and the NAS information includes a first CAG identifier. The second message further includes NAS information, and the NAS information includes the first CAG identifier. Optionally, when the terminal device sends the first PLMN identity and the first CAG identifier to the access network device, the first PLMN identity and the first CAG identifier may not be sent in a same message. When the access network device sends the first PLMN identity and the first CAG identifier to the core network device, the first PLMN identity and the first CAG identifier may not be sent in a same message.

In a possible implementation, neither the first message nor the second message includes the first CAG identifier. In other words, the terminal device reports the selected CAG identifier neither in the AS information nor in the NAS information.

In a possible implementation, the second message further includes the indication information.

In a possible implementation, the information about the network supported by the first cell includes one or more of the following information: a CAG identifier that corresponds to the first PLMN identity and that is supported by the first cell, PNI-NPN identification information supported by the first cell, or a PLMN identity supported by the first cell. For example, if the first cell is the cell 1, the access network device may send the PNI-NPN identification information 1 and the PNI-NPN identification information 2 shown in the foregoing Table 1 and the PLMN identities 1 to 3 shown in the foregoing Table 3 to the core network device. Alternatively, if the first PLMN identity is the PLMN identity 1, the access network device sends the CAG identifier 1 to the core network device.

In a possible implementation, when the indication information indicates that the terminal device requests to access the PNI-NPN supported by the first cell, the access network device includes, in the second message, a CAG identifier that corresponds to the first identity and that is supported by the first cell, or the PNI-NPN identification information supported by the first cell. Overheads for sending the second message by the access network device to the core network device can be reduced by using the indication information.

803. The core network device sends, when the terminal device is not allowed to access a network, a third message to the access network device based on the information about the network supported by the first cell and the subscription information of the terminal device. For example, the third message may be a UE context release command, a registration reject message, or an error indication message.

In this embodiment of this application, after receiving the second message, the core network device sends, when the terminal device is not allowed to access a network, the third message to the access network device based on the information about the network supported by the first cell and the subscription information of the terminal device. The third message is used to instruct the access network device to release a resource configured for the terminal device. After receiving the third message, the access network device releases the resource configured for the terminal device. The resource may be an interface resource, such as an NG interface resource or an S1 interface resource.

In a possible implementation, the core network device determines, based on the information about the network supported by the first cell and the subscription information of the terminal device, whether to allow the terminal device to access a network, and sends the third message to the access network device when the terminal device is not allowed to access a network. Optionally, when the terminal device is allowed to access a network, the core network device may connect the terminal device to the network.

In a possible implementation, the core network device may determine, not only based on the information about the network supported by the first cell and the subscription information of the terminal device but also based on the first PLMN identity and/or the first CAG identifier and/or the indication information, whether to allow the terminal device to access a network.

For a case in which the core network device allows or does not allow the terminal device to access a network, based on the information about the network supported by the first cell and the subscription information of the terminal device, the terminal device to access the network, or a case in which the core network device allows or does not allow, based on the subscription information of the terminal device and the first PLMN identity and/or the first CAG identifier, the terminal device to access a network, refer to descriptions corresponding to the following implementation 4 to implementation 6. Details are not described herein.

804. The access network device sends a fourth message to the terminal device. For example, the fourth message may be an RRC release message.

In this embodiment of this application, after receiving the third message, the access network device sends the fourth message to the terminal device. The fourth message is used to instruct the terminal device to release an RRC connection.

805. The terminal device releases the RRC connection.

In this embodiment of this application, after receiving the fourth message, the terminal device releases the RRC connection. Alternatively, the fourth message is used to instruct the terminal device to release an air interface resource. After receiving the fourth message, the terminal device releases the air interface (Uu interface) resource of the terminal device.

In a possible implementation, the third message and the fourth message each further include a cause value, and the cause value is used to indicate a cause of a network access failure of the terminal device. For descriptions of the cause value, refer to the descriptions in the embodiment corresponding to FIG. 6. Details are not described herein again.

In a possible implementation, when the terminal device requests to access the PNI-NPN supported by the first cell, the first message does not include the indication information. When the terminal device does not request to access the PNI-NPN supported by the first cell, the first message includes the indication information. If the first message does not include the indication information, the access network device sends, to the core network device, the information about the network supported by the first cell. Otherwise, the access network device does not send, to the core network device, the information about the network supported by the first cell.

In a possible implementation, the indication information may also be used to indicate whether the terminal device requests to access a public network supported by the first cell. When the indication information indicates that the terminal device does not request to access the public network supported by the first cell, the access network device sends, to the core network device, the information about the network supported by the first cell. Otherwise, the access network device does not send, to the core network device, the information about the network supported by the first cell.

Alternatively, the terminal device may not include the indication information in the first message when the terminal device does not request to access the public network supported by the first cell. The terminal device includes the indication information in the first message when the terminal device requests to access the public network supported by the first cell. When the first message does not include the indication information, the access network device sends, to the core network device, the information about the network supported by the first cell. Otherwise, the access network device does not send, to the core network device, the information about the network supported by the first cell.

Alternatively, the terminal device may not include the indication information in the first message when the terminal device requests to access the public network supported by the first cell. The terminal device includes the indication information in the first message when the terminal device does not request to access the public network supported by the first cell. When the first message includes the indication information, the access network device sends, to the core network device, the information about the network supported by the first cell. Otherwise, the access network device does not send, to the core network device, the information about the network supported by the first.

It can be learned that by performing the method described in FIG. 8, the access network device may send information about a network supported by a cell to the core network device, so that the core network device can perform access control on the terminal device based on the information about the network supported by the cell. This helps the terminal device access a correct cell.

Based on three different implementations, the following describes a case in which the core network device allows or does not allow, based on the information about the network supported by the first cell and the subscription information of the terminal device, the terminal device to access a network, and a case in which the access network device allows or does not allow, based on the information about the network supported by the first cell and the subscription information of the terminal device, the terminal device to access a network.

Implementation 4:

The subscription information of the terminal device includes one or more of the following information: PNI-NPN identification information of a PNI-NPN accessible by the terminal device, a PLMN identity of a PLMN accessible by the terminal device, or an indication of whether the terminal device is allowed to access a network only by using a CAG cell. The information about the network supported by the first cell includes one or more of the following information: the CAG identifier that corresponds to the first PLMN identity and that is supported by the first cell, the PNI-NPN identification information supported by the first cell, or the PLMN identity supported by the first cell.

The case in which the core network device does not allow, based on the information about the network supported by the first cell and the subscription information of the terminal device, the terminal device to access a network includes one or more of the following three cases a1 to a3:

a1. When the subscription information indicates that the terminal device is allowed to access a network by using a CAG cell but cannot access the network by using a public network cell, the first cell does not support the PNI-NPN accessible by the terminal device or the PNI-NPN identification information of the PNI-NPN accessible by the terminal device is empty.

a2. When the subscription information indicates that the terminal device is allowed to access a network by using both a CAG cell and a public network cell, the first cell does not support the PNI-NPN accessible by the terminal device or the PNI-NPN identification information of the PNI-NPN accessible by the terminal device is empty, and the first cell does not support a public network identified by the first PLMN identity or the PLMN identity of the PLMN accessible by the terminal device does not include the first PLMN identity.

a3. When the subscription information indicates that the terminal device is allowed to access a network by using a public network cell but cannot access the network by using a CAG cell, the first cell does not support a public network identified by the first PLMN identity or the PLMN identity of the PLMN accessible by the terminal device does not include the first PLMN identity.

Correspondingly, the case in which the core network device allows, based on the information about the network supported by the first cell and the subscription information of the terminal device, the terminal device to access a network includes one or more of the following three cases b1 to b3:

b1. When the subscription information indicates that the terminal device is allowed to access a network by using a CAG cell but cannot access the network by using a public network cell, the first cell supports the PNI-NPN accessible by the terminal device.

b2. When the subscription information indicates that the terminal device is allowed to access a network by using both a CAG cell and a public network cell, the first cell supports the PNI-NPN accessible by the terminal device. Alternatively, when the subscription information indicates that the terminal device is allowed to access a network by using both a CAG cell and a public network cell, the first cell supports a public network identified by the first PLMN identity and the PLMN identity of the PLMN accessible by the terminal device includes the first PLMN identity.

b3. When the subscription inebriation indicates that the terminal device is allowed to access a network by using a public network cell but cannot access the network by using a CAG cell, the first cell supports a public network identified by the first PLMN identity, and the PLMN identity of the PLMN accessible by the terminal device includes the first PLMN identity.

Implementation 5:

If the NAS information of the first message and the NAS information of the second message further include the first CAG identifier, the case in which the core network device does not allow, based on the information about the network supported by the first cell and the subscription information of the terminal device, the terminal device to access a network includes one or more of the following cases:

a1. When the subscription information indicates that the terminal device is allowed to access a network by using a CAG cell but cannot access the network by using a public network cell, the first cell does not support a first PNI-NPN identified by the first PLMN identity and the first CAG identifier, or the first PNI-NPN is not a PNI-NPN accessible by the terminal device.

a2. When the subscription information indicates that the terminal device is allowed to access a network by using both a CAG cell and a public network cell, and the first cell does not support the first PNI-NPN identified by the first CAG identifier and the first PLMN identity or the first PNI-NPN is not a PNI-NPN accessible by the terminal device, the first cell does not support a public network identified by the first PLMN identity or the PLMN identity of the PLMN accessible by the terminal device does not include the first PLMN identity.

a3. This case is the same as a3 in the implementation 4. For details, refer to the descriptions of a3 in the implementation 4.

Correspondingly, the case in which the core network device allows, based on the information about the network supported by the first cell and the subscription information of the terminal device, the terminal device to access a network includes one or more of the following three cases 1 to b3:

b1. When the subscription information indicates that the terminal device is allowed to access a network by using a CAG cell but cannot access the network by using a public network cell, the first cell supports a first PIN-NPN identified by the first CAG identifier and the first PLMN identity, and the first PNI-NPN is a PNI-NPN accessible by the terminal device.

b2. When the subscription information indicates that the terminal device is allowed to access a network by using both a CAG cell and a public network cell, the first cell supports a first PNI-NPN, and the first PIN-NPN is a PNI-NPN accessible by the terminal device. Alternatively, when the subscription information indicates that the terminal device is allowed to access a network by using both a CAG cell and a public network cell, the first cell supports a public network identified by the first PLMN identity and the PLMN identity of the PLMN accessible by the terminal device includes the first PLMN identity.

b3. This case is the same as b3 in the implementation 4. For details, refer to the descriptions of b3 in the implementation 4.

Implementation 6:

That the terminal device is not allowed to access a network includes one or more of the following cases:

a1. When the subscription information indicates that the terminal device is allowed to access a network by using a CAG cell but cannot access the network by using a public network cell, the first cell does not support a PNI-NPN that is identified by the first PLMN identity and that is accessible by the terminal device or the PNI-NPN identification information of the PNI-NPN accessible by the terminal device does not include the first PLMN identity.

a2. When the subscription information indicates that the terminal device is allowed to access a network by using both a CAG cell and a public network cell, and the first cell does not support a PNI-NPN that is identified by the first PLMN identity and that is accessible by the terminal device or the PNI-NPN identification information of the PNI-NPN accessible by the terminal device does not include the first PLMN identity, the first cell does not support a public network identified by the first PLMN identity or the PLMN identity of the PLMN accessible by the terminal device does not include the first PLMN identity.

a3. This case is the same as a3 in the implementation 4. For details, refer to the descriptions of a3 in the implementation 4.

Correspondingly, the case in which the core network device allows, based on the information about the network supported by the first cell and the subscription information of the terminal device, the terminal device to access a network includes one or more of the following three cases b1 to b3:

b1. The subscription information indicates that the terminal device is allowed to access a network by using a CAG cell but cannot access the network by using a public network cell, the first cell supports a PNI-NPN that is identified by the first PLMN identity and that is accessible by the terminal device, and the PNI-NPN identification information of the PNI-NPN accessible by the terminal device includes the first PLMN identity.

b2. When the subscription information indicates that the terminal device is allowed to access a network by using both a CAG cell and a public network cell, the first cell supports a PNI-NPN that is identified by the first PLMN identity and that is accessible by the terminal device, and the PNI-NPN identification information of the PNI-NPN accessible by the terminal device includes the first PLMN identity. Alternatively, when the subscription information indicates that the terminal device is allowed to access a network by using both a CAG cell and a public network cell, the first cell supports a public network identified by the first PLMN identity and the PLMN identity of the PLMN accessible by the terminal device includes the first PLMN identity.

b3. This case is the same as b3 in the implementation 4. For details, refer to the descriptions of b3 in the implementation 4.

According to the foregoing implementation 4 to implementation 6, the terminal device is allowed to access a correct cell.

Figure 9:
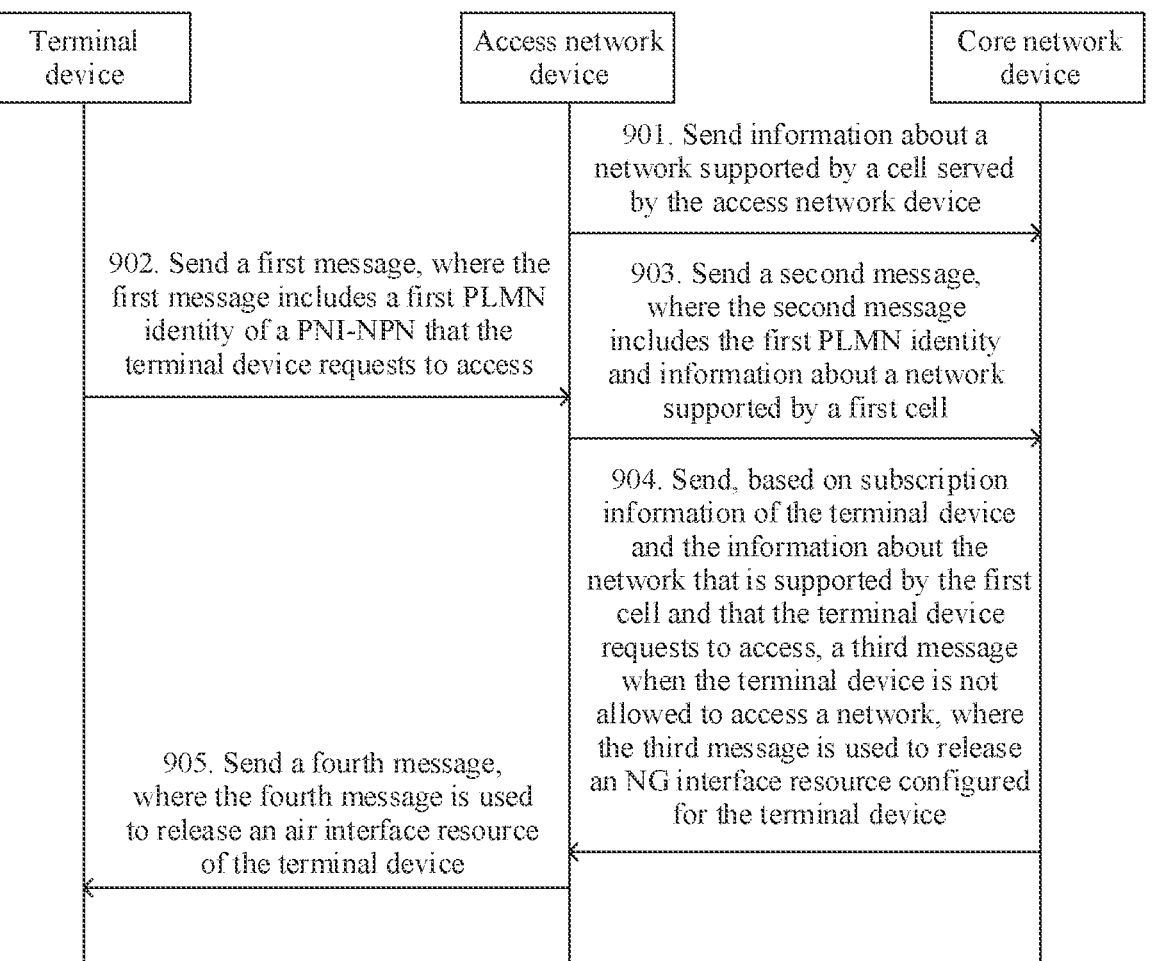

FIG. 9 is a schematic flowchart of an access control method according to an embodiment of this application. As shown in FIG. 9, the access control method includes the following step 901 to step 905.

901. An access network device sends information about a network supported by a cell served by the access network device to a core network device.

When an NG interface is set up or updated, the access network device may send, to the core network device, the information about the network supported by the cell served by the access network device. For example, the information about the network supported by the cell served by the access network device may be carried in an NG setup request message or a RAN configuration update message.

In a possible implementation, the information about the network supported by the cell served by the access network device includes one or more of the following information: cell identification information, PNI-NPN identification information corresponding to the cell, a PLMN identity corresponding to the cell, or a tracking area code (TAC) of the cell. The cell identification information may be a cell identity, a cell global identifier (cell global identification, CGI), or a physical cell identifier (PCI). The PNI-NPN identification information may include a PLMN identity and/or a CAG identifier. For example, if cells served by the access network device include a cell 1 and a cell 2, the access network device may send an identifier of the cell 1, PNI-NPN identification information corresponding to the cell 1, a PLMN identity corresponding to the cell 1, an identifier of the cell 2, PNI-NPN identification information corresponding to the cell 2, and a PLMN identity corresponding to the cell 2 to the core network device.

In a possible implementation, the core network device may further send, to the access network device, information about a network available to a cell served by the core network device or a cell served by the access network device. For example, an NG setup response message or an AMF configuration update message is used. The information about the network available to the cell served by the core network device or the cell served by the access network device includes one or more of the following information: cell identification information, PNI-NPN identification information corresponding to the cell, a PLMN identity corresponding to the cell, or a TAC of the cell. For example, if the core network device includes a cell 3 and a cell 4, the core network device may send an identifier of the cell 3, PNI-NPN identification information corresponding, to the cell 3, a NAN identity corresponding to the cell 3, an identifier of the cell 4, PNI-NPN identification information corresponding to the cell 4, and a PLMN identity corresponding to the cell 4 to the access network device.

902. A terminal device sends a first message to the access network device. For types of the first message and the second message, refer to the descriptions in the embodiment corresponding to FIG. 2. Details are not described herein again.

The first message includes a first PLMN identity of a PNI-NPN that the terminal device requests to access.

903. The access network device sends a second message to the core network device.

After receiving the first message, the access network device sends the second message to the core network device. The second message includes the first PLMN identity.

For specific implementations of step 902 and step 903, refer to the specific implementations of step 201 and step 202. Details are not described herein again.

904. The core network device sends, when the terminal device is not allowed to access a network, a third message to the access network device based on subscription information of the terminal device and information about a network that is supported by a first cell and that the terminal device requests to access. For example, the third message may be a UE context release command, a registration reject message, or an error indication message.

In this embodiment of this application, after receiving the second message, the core network device sends, when the terminal device is not allowed to access a network, the third message to the access network device based on the subscription information of the terminal device and the information about the network that is supported by the first cell and that the terminal device requests to access. The third message is used to instruct the access network device to release a resource configured for the terminal device. After receiving the third message, the access network device releases the resource configured for the terminal device.

Optionally, the resource may be an interface resource, such as an NG interface resource or an S1 interface resource.

905. The access network device sends a fourth message to the terminal device. For example, the fourth message may be an RRC release message.

In this embodiment of this application, after receiving the third message, the access network device sends the fourth message to the terminal device. The fourth message is used to instruct the terminal device to release an RRC connection. After receiving the fourth message, the terminal device releases the RRC connection. Alternatively, the sixth message is used to instruct the terminal device to release an air interface resource. After receiving the sixth message, the terminal device releases the air interface (Uu interface) resource of the terminal device.

In a possible implementation, the third message and the fourth message each further include a cause value, and the cause value is used to indicate a cause of a network access failure of the terminal device. For descriptions of the cause value, refer to the descriptions in the embodiment corresponding to FIG. 6. Details are not described herein again.

For a case in which the core network device allows or does not allow, based on the information about the network supported by the first cell and the subscription information of the terminal device, the terminal device to access the network, or a case in which the core network device allows or does not allow, based on the subscription information of the terminal device and the first PLMN identity and/or the first CAG identifier, the terminal device to access a network, refer to descriptions corresponding to the foregoing implementation 4 to implementation 6. Details are not described herein.

According to the method described in FIG. 9, the terminal device is allowed to access a correct cell.

Figure 10:
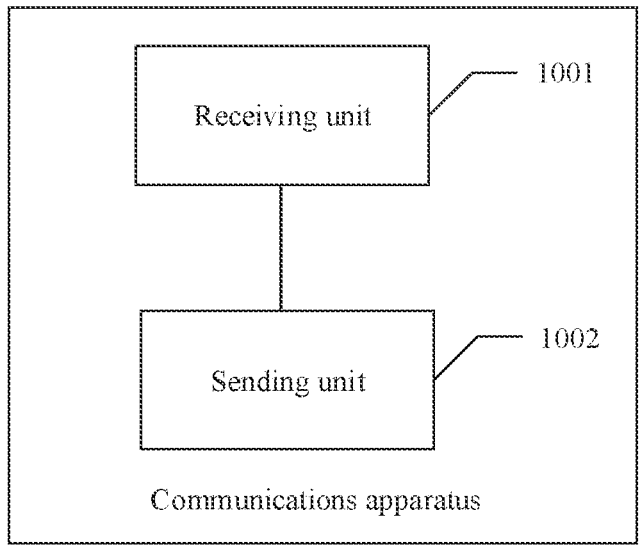
FIG. 10 is a schematic structural diagram of a communications apparatus according to an embodiment of this application.

FIG. 10 is a schematic structural diagram of a communications apparatus according to an embodiment of this application. The communications apparatus shown in FIG. 10 may be configured to perform some or all functions of the access network device in the method embodiment described in FIG. 8. Alternatively, the communications apparatus may be configured to perform some or all functions of the access network device in the method embodiment described in FIG. 8. The apparatus may be an access network device, an apparatus in an access network device, or an apparatus that can be used together with an access network device. The communications apparatus may alternatively be a chip system. The communications apparatus shown in FIG. 10 may include a receiving unit 1001 and a sending unit 1002. Details are as follows:

The receiving unit 1001 is configured to receive, by the access network device, a first message from a terminal device, where the first message includes a first public land mobile network (PLMN) identity of a network that the terminal device requests to access and indication information, and the indication information is used to indicate that the terminal device requests to access a public network integrated non-public network (PNI-NPN) supported by a first cell. The sending unit 1002 is configured to send a second message to a core network device, where the second message includes the first PLMN identity and information about a network supported by the first cell. The receiving unit 1001 is further configured to receive a third message from the core network device, where the third message is used to instruct the access network device to release a resource configured for the terminal device. The sending unit 1002 is further configured to send a fourth message to the terminal device, where the fourth message is used to instruct the terminal device to release a radio resource control (RRC) connection.

In a possible implementation, the information about the network supported by the first cell includes one or more of the following information: a closed access group (CAG) identifier that corresponds to the first PLMN identity and that is supported by the first cell, PNI-NPN identification information supported by the first cell, or a PLMN identity supported by the first cell, where the PNI-NPN identification information includes a PLMN identity and a CAG identifier.

In a possible implementation, the second message further includes the indication information.

In a possible implementation, the third message and the fourth information each further include a cause value, and the cause value is used to indicate a cause of a network access failure of the terminal device.

FIG. 10 is a schematic structural diagram of a communications apparatus according to an embodiment of this application. The communications apparatus shown in FIG. 10 may be configured to perform some or all functions of the core network device in the method embodiment described in FIG. 8. Alternatively, the communications apparatus may be configured to perform some or all functions of the core network device in the method embodiment described in FIG. 8. The apparatus may be a core network device, an apparatus in a core network device, or an apparatus that can be used together with a core network device. The communications apparatus may alternatively be a chip system. The communications apparatus shown in FIG. 10 may include a receiving unit 1001 and a sending unit 1002. Details are as follows:

The receiving unit 1001 is configured to receive a second message from an access network device, where the second message includes a first public land mobile network (PLMN) identity of a network that a terminal device requests to access and information about a network supported by a first cell. The sending unit 1002 is configured to send, when the terminal device is not allowed to access a network, a third message to the access network device based on the information about the network supported by the first cell and subscription information of the terminal device, where the third message is used to instruct the access network device to release a resource configured for the terminal device.

In a possible implementation, the information about the network supported by the first cell includes one or more of the following information: a closed access group (CAG) identifier that corresponds to the first PLMN identity and that is supported by the first cell, PNI-NPN identification information supported by the first cell, or a PLMN identity supported by the first cell, where the PNI-NPN identification information includes a PLMN identity and a CAG identifier.

In a possible implementation, the subscription information of the terminal device includes one or more of the following information: public network integrated non-public network (PNI-NPN) identification information of a PNI-NPN accessible by the terminal device, a PLMN identity of a PLMN accessible by the terminal device, or an indication of whether the terminal device is allowed to access a network only by using a closed access group (CAG) cell.

In a possible implementation, that the terminal device is not allowed to access a network includes one or more of the following cases: when the subscription information indicates that the terminal device is allowed to access a network by using a CAG cell but cannot access the network by using a public network cell, the first cell does not support the PNI-NPN accessible by the terminal device or the PNI-NPN identification information of the PNI-NPN accessible by the terminal device is empty: when the subscription information indicates that the terminal device is allowed to access a network by using both a CAG cell and a public network cell, and the first cell does not support the PNI-NPN accessible by the terminal device or the PNI-NPN identification information of the PNI-NPN accessible by the terminal device is empty, the first cell does not support a public network identified by the first PLMN identity or the PLMN identity of the PLMN accessible by the terminal device does not include the first PLMN identity; or when the subscription information indicates that the terminal device is allowed to access a network by using a public network cell but cannot access the network by using a CAG cell, the first cell does not support a public network identified by the first PLM identity or the PLMN identity of the PLMN accessible by the terminal device does not include the first PLMN identity.

In a possible implementation, that the terminal device is not allowed to access a network includes one or more of the following cases:

when the subscription information indicates that the terminal device is allowed to access a network by using a CAG cell but cannot access the network by using a public network cell, the first cell does not support a first PNI-NPN identified by the first CAG identifier and the first PLMN identity or the first PNI-NPN is not a PNI-NPN accessible by the terminal device; when the subscription information indicates that the terminal device is allowed to access a network by using both a CAG cell and a public network cell, and the first cell does not support the first PNI-NPN or the first PNI-NPN is not a PNI-NPN accessible by the terminal device, the first cell does not support a public network identified by the first PLMN identity or the PLMN identity of the PLMN accessible by the terminal device does not include the first PLMN identity; or when the subscription information indicates that the terminal device is allowed to access a network by using a public network cell but cannot access the network by using a CAG cell, the first cell does not support a public network identified by the first PLMN identity or the PLMN identity of the PLMN accessible by the terminal device does not include the first PLMN identity.

In a possible implementation, that the terminal device is not allowed to access a network includes one or more of the following cases:

when the subscription information indicates that the terminal device is allowed to access a network by using a CAG cell but cannot access the network by using a public network cell, the first cell does not support a PNI-NPN that is identified by the first PLMN identity and that is accessible by the terminal device or the PNI-NPN identification information of the PNI-NPN accessible by the terminal device does not include the first PLMN identity when the subscription information indicates that the terminal device is allowed to access a network by using both a CAG cell and a public network cell, and the first cell does not support a PNI-NPN that is identified by the first PLMN identity and that is accessible by the terminal device or the PNI-NPN identification information of the PNI-NPN accessible by the terminal device does not include the first PLMN identity, the first cell does not support a public network identified by the first PLM identity or the PLMN identity of the PLMN accessible by the terminal device does not include the first PLMN identity; or the subscription information indicates that the terminal device is allowed to access a network by using a public network cell but cannot access the network by using a CAG cell, and the first cell does not support a public network identified by the first PLMN identity or the PLMN identity of the PLMN accessible by the terminal device does not include the first PLMN identity.

In a possible implementation, the third message further includes a cause value, and the cause value is used to indicate a cause of a network access failure of the terminal device.

In a possible implementation, the second message further includes indication information, and the indication information is used to indicate whether the terminal device requests to access a public network integrated non-public network (PNI-NPN) supported by the first cell.

Figure 11:
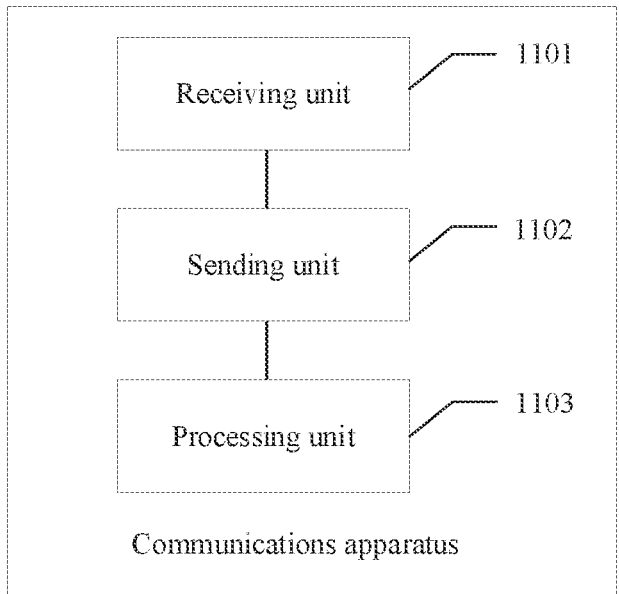
FIG. 11 is a schematic structural diagram of another communications apparatus according to an embodiment of this application.

FIG. 11 is a schematic structural diagram of a communications apparatus according to an embodiment of this application. The communications apparatus shown in FIG. 11 may be configured to perform some or all functions of the terminal device in the method embodiment described in FIG. 8. Alternatively, the communications apparatus may be configured to perform some or all functions of the terminal device in the method embodiment described in FIG. 8. The apparatus may be a terminal device, an apparatus in a terminal device, or an apparatus that can be used together with a terminal device. The communications apparatus may alternatively be a chip system. The communications apparatus shown in FIG. 11 may include a receiving unit 1101, a sending unit 1102, and a processing unit 1103. Details are as follows:

The sending unit 1102 is configured to send a first message to an access network device, where the first message includes a first public land mobile network (PLMN) identity of a network that the terminal device requests to access and indication information, and the indication information is used to indicate that the terminal device requests to access a public network integrated non-public network (PNI-NPN) supported by a first cell. The receiving unit 1101 is configured to receive a fourth message, where the fourth message is used to instruct the terminal device to release a radio resource control (RRC) connection. The processing unit 1103 is configured to release the RRC connection.

In a possible implementation, the fourth message includes a cause value, and the cause value is used to indicate a cause of a network access failure of the terminal device.

In a possible implementation, the first PLMN identity corresponds to at least two closed access group (CAG) identifiers.

FIG. 10 is a schematic structural diagram of a communications apparatus according to an embodiment of this application. The communications apparatus shown in FIG. 10 may be configured to perform some or all functions of the access network device in the method embodiments described in FIG. 2 to FIG. 7B. The apparatus may be an access network device, an apparatus in an access network device, or an apparatus that can be used together with an access network device. The communications apparatus may alternatively be a chip system. The communications apparatus shown in FIG. 10 may include a receiving unit 1001 and a sending unit 1002. Details are as follows:

The receiving unit 1001 is configured to receive a first message from a terminal device, where the first message includes a first public land mobile network (PLMN) identity of a public network integrated non-public network (PNI-NPN) that the terminal device requests to access. The sending unit 1002 is configured to send a second message to a core network device, where the second message includes the first PLMN identity. The receiving unit 1001 is further configured to receive a third message from the core network device, where the third message includes subscription information of the terminal device. The sending unit 1002 is further configured to send, based on the subscription information of the terminal device and information about a network that is supported by a first cell and that the terminal device requests to access, a fourth message to the core network device when the terminal device is not allowed to access a network, where the fourth message is used to indicate a network access failure of the terminal device.

In a possible implementation, the subscription information of the terminal device includes public network integrated non-public network (PNI-NPN) identification information of a PNI-NPN accessible by the terminal device, and/or an indication of whether the terminal device is allowed to access a network only by using a closed access group (CAG) cell. The information about the network supported by the first cell includes PNI-NPN identification information and/or a PLMN identity, where the PNI-NPN identification information includes a PLM identity and a CAG identifier.

In a possible implementation, that the terminal device is not allowed to access a network includes one or more of the following cases:

the subscription information indicates that the terminal device is allowed to access a network by using a CAG cell but cannot access the network by using a public network cell, and the first cell does not support the PNI-NPN accessible by the terminal device; the subscription information indicates that the terminal device is allowed to access a network by using both a CAG cell and a public network cell, the first cell does not support a public network identified by the first PLMN identity, and the first cell does not support the PNI-NPN accessible by the terminal device; or the subscription information indicates that the terminal device is allowed to access a network by using a public network cell but cannot access the network by using a CAG cell, and the first cell does not support a public network identified by the first PLMN identity.

In a possible implementation, NAS information in the first message and the second message further includes a first closed access group (CAG) identifier, the third message further includes the first CAG identifier, and that the terminal device is not allowed to access a network includes one or more of the following cases: the subscription information indicates that the terminal device is allowed to access a network by using a CAG cell but cannot access the network by using a public network cell, and the first cell does not support a first PNI-NPN identified by a first CAG identifier and the first PLMN identity; the subscription information indicates that the terminal device is allowed to access a network by using both a CAG cell and a public network cell, the first cell does not support a public network identified by the first PLMN identity, and the first cell does not support a first PNI-NPN; or the subscription information indicates that the terminal device is allowed to access a network by using a public network cell but cannot access the network by using a CAG cell, and the first cell does not support a public network identified by the first PLMN identity.

In a possible implementation, that the terminal device is not allowed to access a network includes one or more of the following cases: the subscription information indicates that the terminal device is allowed to access a network by using a CAG cell but cannot access the network by using a public network cell, and the first cell does not support a PNI-NPN that is identified by the first PLMN identity and that is accessible by the terminal device; the subscription information indicates that the terminal device is allowed to access a network by using both a CAG cell and a public network cell, the first cell does not support a public network identified by the first PLMN identity, and the first cell does not support a PNI-NPN that is identified by the first PLMN identity and that is accessible by the terminal device; or the subscription information indicates that the terminal device is allowed to access a network by using a public network cell but cannot access the network by using a CAG cell, and the first cell does not support a public network identified by the first PLMN identity.

In a possible implementation, the fourth message further includes a cause value, and the cause value is used to indicate a cause of a network access failure of the terminal device.

In a possible implementation, the receiving unit 1001 is further configured to receive a fifth message from the core network device, where the fifth message includes the cause value, and the fifth message is used to instruct the access network device to release a resource configured for the terminal device. The sending unit 1002 is further configured to send a sixth message to the terminal device, where the sixth message includes the cause value, and the sixth message is used to instruct the terminal device to release an RRC connection.

In a possible implementation, the receiving unit 1001 is further configured to receive a seventh message from the core network device, where the seventh message indicates an authentication success, a security verification success, a registration success, or an attachment success of the terminal device. The sending unit 1002 is further configured to send an eighth message to the terminal device, where the eighth message indicates the authentication success, the security verification success, the registration success, or the attachment success of the terminal device. The receiving unit 1001 is further configured to receive a ninth message from the core network device, where the ninth message includes the cause value, and the ninth message indicates an authentication failure, a security verification failure, a registration failure, or an attachment failure of the terminal device. The sending unit 1002 is further configured to send a tenth message to the terminal device, where the tenth message includes the cause value, and the tenth message indicates the authentication failure, the security verification failure, the registration failure, or the attachment failure of the terminal device.

FIG. 10 is a schematic structural diagram of a communications apparatus according to an embodiment of this application. The communications apparatus shown in FIG. 10 may be configured to perform some or all functions of the core network device in the method embodiments described in FIG. 2 to FIG. 7B. Alternatively, the communications apparatus may be configured to perform some or all functions of the core network device in the method embodiments described in FIG. 2 to FIG. 7B. The apparatus may be a core network device, an apparatus in a core network device, or an apparatus that can be used together with a core network device. The communications apparatus may alternatively be a chip system. The communications apparatus shown in FIG. 10 may include a receiving unit 1001 and a sending unit 1002. Details are as follows:

The receiving unit 1001 is configured to receive a second message from an access network device, where the second message includes a first public land mobile network (PLMN) identity of a public network integrated non-public network (PNI-NPN) that a terminal device requests to access. The sending unit 1002 is configured to send a third message to the access network device based on subscription information of the terminal device when the terminal device is allowed to access a network, where the third message includes the subscription information of the terminal device. The receiving unit 1001 is further configured to receive a fourth message from the access network device, where the fourth message is used to indicate a network access failure of the terminal device.

In a possible implementation, the subscription information of the terminal device includes one or more of the following information: PNI-NPN identification information of a PNI-NPN accessible by the terminal device, a PLMN identity of a PLMN accessible by the terminal device, or an indication of whether the terminal device is allowed to access a network only by using a closed access group (CAG) cell. The PNI-NPN identification information includes a PLMN identity and a CAG identifier.

In a possible implementation, that the terminal device is allowed to access a network includes one or more of the following cases: when the subscription information indicates that the terminal device is allowed to access a network by using a CAG cell but cannot access the network by using a public network cell, the PNI-NPN identification information of the terminal device is not empty; when the subscription information indicates that the terminal device is allowed to access a network by using both a CAG cell and a public network cell, the PLMN identity of the terminal device includes the first PLMN identity, or the PNI-NPN identification information of the terminal device is not empty; or the subscription information indicates that the terminal device is allowed to access a network by using a public network cell but cannot access the network by using a CAG cell, and the PLMN identity of the terminal device includes the first PLMN identity.

In a possible implementation, that the terminal device is allowed to access a network includes one or more of the following cases:

when the subscription information indicates that the terminal device is allowed to access a network by using a CAG cell but cannot access the network by using a public network cell, a first PNI-NPN identified by a first CAG identifier and the first PLMN identity is a PNI-NPN accessible by the terminal device; when the subscription information indicates that the terminal device is allowed to access a network by using both a CAG cell and a public network cell, the PLMN identity of the terminal device includes the first PLMN identity, or a first PNI-NPN is a PNI-NPN accessible by the terminal device; or the subscription information indicates that the terminal device is allowed to access a network by using a public network cell but cannot access the network by using a CAG cell, and the PLMN identity of the terminal device includes the first PLMN identity.

In a possible implementation, that the terminal device is allowed to access a network includes one or more of the following cases:

when the subscription information indicates that the terminal device is allowed to access a network by using a CAG cell but cannot access the network by using a public network cell, the PNI-NPN identification information of the terminal device includes the first PLMN identity; when the subscription information indicates that the terminal device is allowed to access a network by using both a CAG cell and a public network cell, the PLMN identity of the terminal device includes the first PLMN identity, or the PNI-NPN identification information of the terminal device includes the first PLMN identity; or the subscription information indicates that the terminal device is allowed to access a network by using a public network cell but cannot access the network by using a CAG cell, and the PLMN identity of the terminal device includes the first PLMN identity.

In a possible implementation, the fourth message further includes a cause value, and the cause value is used to indicate a cause of a network access failure of the terminal device.

In a possible implementation, the sending unit 1002 is further configured to send a fifth message to the access network device, where the fifth message includes the cause value, and the fifth message is used to instruct the access network device to release a resource configured for the terminal device.

In a possible implementation, the sending unit 1002 is further configured to send a seventh message to the access network device, where the seventh message indicates an authentication success, a security verification success, a registration success, or an attachment success of the terminal device.

The sending unit 1002 is further configured to send a ninth message to the access network device, where the ninth message includes the cause value, and the ninth message indicates an authentication failure, a security verification failure, a registration failure, or an attachment failure of the terminal device.

FIG. 10 is a schematic structural diagram of a communications apparatus according to an embodiment of this application. The communications apparatus shown in FIG. 10 may be configured to perform some or all functions of the access network device in the method embodiments described in FIG. 2 to FIG. 7B. Alternatively, the communications apparatus may be configured to perform some or all functions of the access network device in the method embodiments described in FIG. 2 to FIG. 7B. The apparatus may be an access network device, an apparatus in an access network device, or an apparatus that can be used together with an access network device. The communications apparatus may alternatively be a chip system. The communications apparatus shown in FIG. 10 may include a receiving unit 1001 and a sending unit 1002. Details are as follows:

The receiving unit 1001 is configured to receive a first message from a terminal device, where the first message includes a first public land mobile network (PLMN) identity of a public network integrated non-public network (PNI-NPN) that the terminal device requests to access. The sending unit 1002 is configured to send a second message to a core network device, where the second message includes the first PLMN identity. The receiving unit 1001 is further configured to receive a third message from the core network device, where the third message includes subscription information of the terminal device. The sending unit 1002 is further configured to send, based on the subscription information of the terminal device and information about a network that is supported by a first cell and that the terminal device requests to access, a message to the core network device when the terminal device is allowed to access a network, where the message is used to indicate a network access success of the terminal device.

In a possible implementation, the subscription information of the terminal device includes PNI-NPN identification information of a PNI-NPN accessible by the terminal device, and/or an indication of whether the terminal device is allowed to access a network only by using a closed access group (CAG) cell. The information about the network supported by the first cell includes PNI-NPN identification information and/or a PLMN identity, where the PNI-NPN identification information includes a PLMN identity and a CAG identifier.

In a possible implementation, that the terminal device is allowed to access a network includes one or more of the following cases: the subscription information indicates that the terminal device is allowed to access a network by using a CAG cell but cannot access the network by using a public network cell, and the first cell supports the PNI-NPN accessible by the terminal device; when the subscription information indicates that the terminal device is allowed to access a network by using both a CAG cell and a public network cell, the first cell supports a public network identified by the first PLMN identity and the PLMN identity of the terminal device includes the first PLMN identity, or the first cell supports the PNI-NPN accessible by the terminal device; or the subscription information indicates that the terminal device is allowed to access a network by using a public network cell but cannot access the network by using a CAG cell, and the first cell supports a public network identified by the first PLMN identity.

In a possible implementation, NAS information in the first message and the second message further includes a first closed access group (CAG) identifier, the third message further includes the first CAG identifier, and that the terminal device is allowed to access a network includes one or more of the following cases: the subscription information indicates that the terminal device is allowed to access a network by using a CAG cell but cannot access the network by using a public network cell, and the first cell supports a first PNI-NPN identified by a first CAG identifier and the first PLMN identity; when the subscription information indicates that the terminal device is allowed to access a network by using both a CAG cell and a public network cell, the first cell supports a public network identified by the first PLMN identity and the PLMN identity of the terminal device includes the first PLMN identity, or the first cell supports a first PNI-NPN, where the first PNI-NPN is a PNI-NPN accessible by the terminal device; or the subscription information indicates that the terminal device is allowed to access a network by using a public network cell but cannot access the network by using a CAG cell, and the first cell supports a public network identified by the first PLMN identity.

In a possible implementation, that the terminal device is allowed to access a network includes one or more of the following cases:

the subscription information indicates that the terminal device is allowed to access a network by using a CAG cell but cannot access the network by using a public network cell, and the first cell supports a PNI-NPN that is identified by the first PLMN identity and that is accessible by the terminal device; when the subscription information indicates that the terminal device is allowed to access a network by using both a CAG cell and a public network cell, the first cell supports a public network identified by the first PLMN identity and the PLMN identity of the terminal device includes the first PLMN identity, or the first cell supports a PNI-NPN that is identified by the first PLMN identity and that is accessible by the terminal device; or the subscription information indicates that the terminal device is allowed to access a network by using a public network cell but cannot access the network by using a CAG cell, and the first cell supports a public network identified by the first PLMN identity.

FIG. 10 is a schematic structural diagram of a communications apparatus according to an embodiment of this application. The communications apparatus shown in FIG. 10 may be configured to perform some or all functions of the access network device in the method embodiment described in FIG. 9. Alternatively, the communications apparatus may be configured to perform some or all functions of the access network device in the method embodiment described in FIG. 9. The apparatus may be an access network device, an apparatus in an access network device, or an apparatus that can be used together with an access network device. The communications apparatus may alternatively be a chip system. The communications apparatus shown in FIG. 10 may include a receiving unit 1001 and a sending unit 1002. Details are as follows:

The sending unit 1002 is configured to send, to a core network device, information about a network supported by a cell served by the access network device. The receiving unit 1001 is configured to receive a first message from a terminal device, where the first message includes a first public land mobile network (PLMN) identity of a public network integrated non-public network (PNI-NPN) that the terminal device requests to access. The sending unit 1002 is further configured to send a second message to the core network device, where the second message includes the first public land mobile network (PLMN) identity. The receiving unit 1001 is further configured to receive a third message from the core network device, where the third message is used to instruct the access network device to release a resource configured for the terminal device. The sending unit 1002 is further configured to send a fourth message to the terminal device, where the fourth message is used to instruct the terminal device to release an RRC connection.

In a possible implementation, the information about the network supported by the cell served by the access network device includes one or more of the following information: a cell identity, PNI-NPN identification information corresponding to the cell, or a PLMN identity corresponding to the cell. The PNI-NPN identification information includes a PLMN identity and a closed access group (CAG) identifier.

In a possible implementation, the third message and the fourth information each further include a cause value, and the cause value is used to indicate a cause of a network access failure of the terminal device.

In a possible implementation, the receiving unit 1001 is further configured to receive information about a network that is supported by a cell served by the core network device and that is from the core network device.

FIG. 10 is a schematic structural diagram of a communications apparatus according to an embodiment of this application. The communications apparatus shown in FIG. 10 may be configured to perform some or all functions of the core network device in the method embodiment described in FIG. 9. Alternatively, the communications apparatus may be configured to perform some or all functions of the core network device in the method embodiment described in FIG. 9. The apparatus may be a core network device, an apparatus in a core network device, or an apparatus that can be used together with a core network device. The communications apparatus may alternatively be a chip system. The communications apparatus shown in FIG. 10 may include a receiving unit 1001 and a sending unit 1002. Details are as follows:

The receiving unit 1001 is configured to receive information about a network that is supported by a cell served by an access network device and that is from the access network device.

The receiving unit 1001 is further configured to receive a second message from the access network device, where the second message includes a first public land mobile network (PLMN) identity of a public network integrated non-public network (PNI-NPN) that a terminal device requests to access.

The sending unit 1002 is configured to send, when the terminal device is not allowed to access a network, a third message to the access network device based on subscription information of the terminal device and information about a network that is supported by a first cell and that the terminal device requests to access, where the third message is used to instruct the access network device to release a resource configured for the terminal device.

In a possible implementation, the information about the network supported by the cell served by the access network device includes one or more of the following information: a cell identity, PNI-NPN identification information corresponding to the cell, or a PLMN identity corresponding to the cell. The PNI-NPN identification information includes a PLMN identity and a closed access group (CAG) identifier.

In a possible implementation, the subscription information of the terminal device includes one or more of the following information: PNI-NPN identification information of a PNI-NPN accessible by the terminal device, a PLMN identity of a PLMN accessible by the terminal device, or an indication of whether the terminal device is allowed to access a network only by using a closed access group (CAG) cell. The information about the network supported by the first cell includes one or more of the following information: PNI-NPN identification information or a PLMN identity supported by the first cell.

In a possible implementation, that the terminal device is not allowed to access a network includes one or more of the following cases:

when the subscription information indicates that the terminal device is allowed to access a network by using a CAG cell but cannot access the network by using a public network cell, the first cell does not support the PNI-NPN accessible by the terminal device or the PNI-NPN identification information of the terminal device is empty; when the subscription information indicates that the terminal device is allowed to access a network by using both a CAG cell and a public network cell, the first cell does not support the PNI-NPN accessible by the terminal device or the PNI-NPN identification information of the terminal device is empty, and the first cell does not support a public network identified by the first PLMN identity or the PLMN identity of the terminal device does not include the first PLMN identity; or when the subscription information indicates that the terminal device is allowed to access a network by using a public network cell but cannot access the network by using a CAG cell, the first cell does not support a public network identified by the first PLMN identity or the PLMN identity of the terminal device does not include the first PLMN identity.

In a possible implementation, that the terminal device is not allowed to access a network includes one or more of the following cases: when the subscription information indicates that the terminal device is allowed to access a network by using a CAG cell but cannot access the network by using a public network cell, the first cell does not support a first PNI-NPN identified by the first CAG identifier and the first PLMN identity or the first PNI-NPN is not a PNI-NPN accessible by the terminal device; when the subscription information indicates that the terminal device is allowed to access a network by using both a CAG cell and a public network cell, the first cell does not support the first PNI-NPN or the first PNI-NPN is not a PNI-NPN accessible by the terminal device, and the first cell does not support a public network identified by the first PLMN identity or the PLMN identity of the terminal device does not include the first PLMN identity or when the subscription information indicates that the terminal device is allowed to access a network by using a public network cell but cannot access the network by using a CAG cell, the first cell does not support a public network identified by the first PLMN identity or the PLMN identity of the terminal device does not include the first PLMN identity.

In a possible implementation, that the terminal device is not allowed to access a network includes one or more of the following cases:

when the subscription information indicates that the terminal device is allowed to access a network by using a CAG cell but cannot access the network by using a public network cell, the first cell does not support a PNI-NPN that is identified by the first PLMN identity and that is accessible by the terminal device or the PNI-NPN identification information of the terminal device does not include the first PLMN identity;

when the subscription information indicates that the terminal device is allowed to access a network by using both a CAG cell and a public network cell, the first cell does not support a PNI-NPN that is identified by the first PLMN identity and that is accessible by the terminal device or the PNI-NPN identification information of the terminal device does not include the first PLMN identity, and the first cell does not support a public network identified by the first PLMN identity or the PLMN identity of the terminal device does not include the first PLMN identity: or the subscription information indicates that the terminal device is allowed to access a network by using a public network cell but cannot access the network by using a CAG cell, and the first cell does not support a public network identified by the first PLMN identity or the PLMN identity of the terminal device does not include the first PLMN identity.

In a possible implementation, the third message further includes a cause value, and the cause value is used to indicate a cause of a network access failure of the terminal device.

In a possible implementation, the sending unit 1002 is further configured to send, to the core network device, information about a network supported by a cell served by the core network device.

Figure 12A:
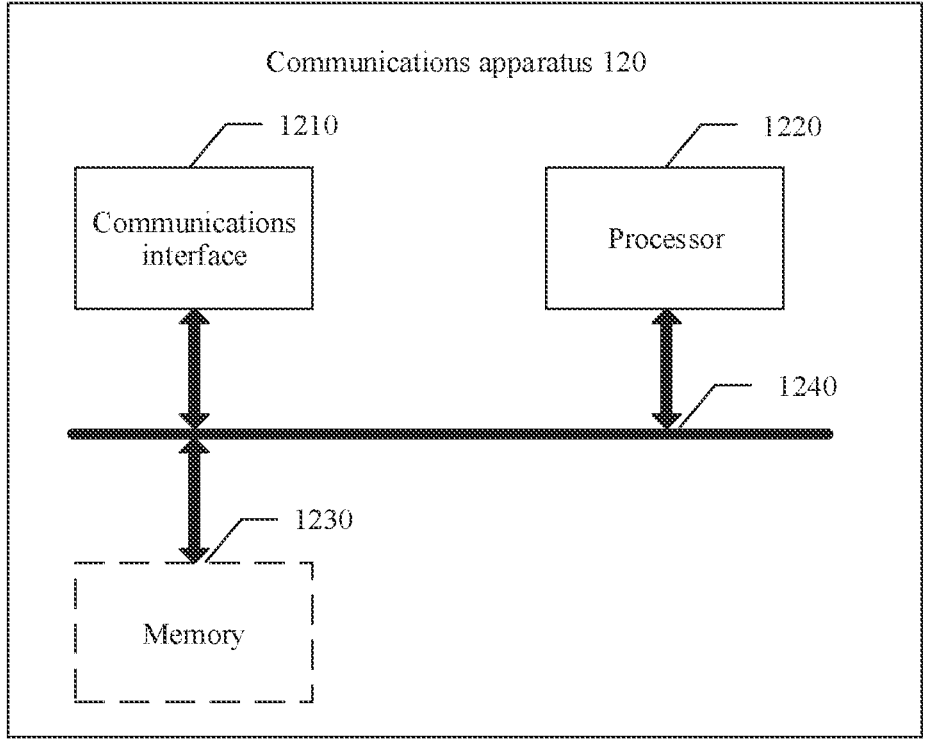
FIG. 12a is a schematic structural diagram of still another communications apparatus according to an embodiment of this application.

FIG. 12*a* shows a communications apparatus 120 according to an embodiment of this application. The communications apparatus is configured to implement functions of the terminal device/access network device/core network device in the foregoing methods. The apparatus may be a terminal device/an access network device/a core network device, or an apparatus used in a terminal device/an access network device/a core network device. For example, the terminal device may be a mobile phone, a wearable device, a tablet computer, or the like. The apparatus used in the terminal device/the access network device/the core network device may be a chip system or a chip in the terminal device. The chip system may include a chip, or may include a chip and another discrete component. The apparatus 120 includes at least one processor 1220, configured to implement a data processing function of the first terminal device in the methods provided in the embodiments of this application. The apparatus 120 may further include a communications interface 1210, configured to implement receiving and sending operations of the terminal device/the access network device/ the core network device in the methods provided in the embodiments of this application. In this embodiment of this application, the communications interface may be a transceiver, a circuit, a bus, a module, or a communications interface of another type, and is configured to communicate with another device through a transmission medium. For example, the communications interface 1210 is used by an apparatus in the apparatus 120 to communicate with another device. The processor 1220 receives and sends data through the communications interface 1210, and is configured to implement the methods in the foregoing method embodiments.

The apparatus 120 may further include at least one memory 1230, configured to store program instructions and/or data. The memory 1230 is coupled to the processor 1220. Coupling in this embodiment of this application may be indirect coupling or a communication connection between apparatuses, units, or modules in an electrical form, a mechanical form, or another form, and is used for information exchange between the apparatuses, the units, or the modules. The processor 1220 may operate in collaboration with the memory 1230. The processor 1220 may execute the program instructions stored in the memory 1230. At least one of the at least one memory may be included in the processor.

A specific connection medium between the communications interface 1210, the processor 1220, and the memory 1230 is not limited in this embodiment of this application. In this embodiment of this application, in FIG. 12a, the memory 1230, the processor 1220, and the communications interface 1210 are connected by using a bus 1240. The bus is represented by a bold line in FIG. 12a. A connection manner between other components is merely an example for description, and is not limited thereto. The bus may be classified into an address bus, a data bus, a control bus, and the like. For ease of indication, the bus is indicated by using only one bold line in FIG. 12a. However, it does not indicate that there is only one bus or only one type of bus.

When the apparatus 120 is specifically an apparatus used in a terminal device/an access network device/a core network device, for example, when the apparatus 120 is specifically a chip or a chip system, the communications interface 1210 may output or receive a baseband signal. When the apparatus 120 is specifically a terminal device, the communications interface 1210 may output or receive a radio frequency signal. In this embodiment of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general-purpose processor may be a microprocessor or any conventional processor or the like. The steps in the methods disclosed with reference to the embodiments of this application may be directly performed and completed by a hardware processor, or may be performed and completed by a combination of hardware in the processor and a software module.

Figure 12B:
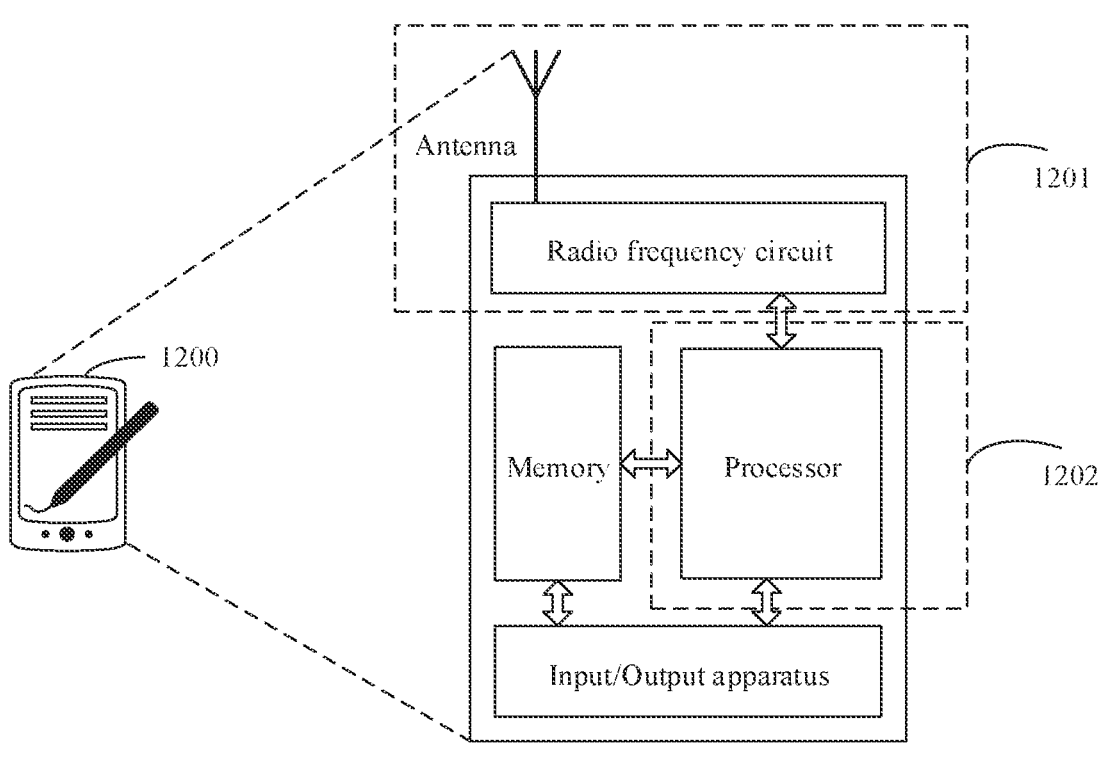
FIG. 12b is a schematic structural diagram of still another communications apparatus according to an embodiment of this application.

In an example, FIG. 12b is a schematic structural diagram of another terminal device 1200 according to an embodiment of this application. The terminal device may perform the operations performed by the terminal device in the foregoing method embodiments.

For ease of description, FIG. 12b shows only main components of the terminal device. As shown in FIG. 12b, the terminal device 1200 includes a processor, a memory, a radio frequency circuit, an antenna, and an input/output apparatus. The processor is mainly configured to: process a communication protocol and communication data, control the entire terminal device, execute a software program, and process data of the software program, for example, configured to support the terminal device in executing the procedures described in FIG. 3 to FIG. 7B. The memory is mainly configured to store the software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The terminal device 1200 may further include the input/output apparatus, such as a touchscreen, a display screen, or a keyboard, and is mainly configured to: receive data entered by a user, and output data to the user. It should be noted that some types of terminal devices may have no input/output apparatus.

After the terminal device is powered on, the processor may read a software program in a storage unit, explain and execute an instruction of the software program, and process data of the software program. When data needs to be sent in a wireless manner, after performing baseband processing on the to-be-sent data, the processor outputs a baseband signal to a radio frequency circuit. After performing radio frequency processing on the baseband signal, the radio frequency circuit sends a radio frequency signal to the outside through the antenna in an electromagnetic wave form. When data is sent to the terminal device, the radio frequency circuit receives a radio frequency signal through the antenna, converts the radio frequency signal into a baseband signal, and outputs the baseband signal to the processor; and the processor converts the baseband signal into data, and processes the data.

A person skilled in the art may understand that, for ease of description, FIG. 12b shows only one memory and one processor. An actual terminal device may have a plurality of processors and a plurality of memories. The memory may also be referred to as a storage medium, a storage device, or the like. This is not limited in the embodiments of this application.

In an optional implementation, the processor may include a baseband processor and a central processing unit (CPU). The baseband processor is mainly configured to process a communications protocol and communications data. The CPU is mainly configured to: control the entire terminal device, execute a software program, and process data of the software program. Optionally, the processor may alternatively be a network processor (NP) or a combination of a CPU and an NP The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. The memory may include a volatile memory, for example, a random-access memory (RAM). The memory may also include a non-volatile memory, for example, a flash memory, a hard disk drive (HDD), or a solid-state drive (SSD). The memory may further include a combination of the foregoing types of memories.

For example, in this embodiment of this application, as shown in FIG. 12b, the antenna that has a transceiver function and the radio frequency circuit may be considered as a communications unit 1201 of the terminal device 1200, and the processor having a processing function may be considered as a processing unit 1202 of the terminal device 1200.

The communications unit 1201 may also be referred to as a transceiver, a transceiver machine, a transceiver apparatus, or the like, and is configured to implement a transceiver function. Optionally, a component that is in the communications unit 1201 and that is configured to implement a reception function may be considered as a receiving unit, and a component that is in the communications unit 1201 and that is configured to implement a transmission function may be considered as a sending unit. In other words, the communications unit 1201 includes the receiving unit and the sending unit. For example, the receiving unit may also be referred to as a receiver machine, a receiver, a receive circuit, or the like, and the sending unit may be referred to as a transmitter machine, a transmitter, a transmit circuit, or the like.

In some embodiments, the communications unit 1201 and the processing unit 1202 may be integrated into one device, or may be separated as different devices. In addition, the processor and the memory may be integrated into one device, or may be separated as different devices.

The communications unit 1201 may be configured to perform receiving and sending operations of the terminal device in the foregoing method embodiments. The processing unit 1202 may be configured to perform a data processing operation of the first terminal device in the foregoing method embodiments.

An embodiment of the present invention further provides a computer-readable storage medium. The computer-readable storage medium stores instructions. When the instructions are run on a processor, the method procedures in the foregoing method embodiments are implemented.

An embodiment of the present invention further provides a computer program product. When the computer program product runs on a processor, the method procedures in the foregoing method embodiments are implemented.

All or some of the foregoing embodiments may be implemented by using software, hardware, firmware, or any combination thereof in the foregoing embodiments. When software is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium (for example, an SSD).

This application is described with reference to the flowcharts and/or the block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of another programmable data processing device generate an apparatus for implementing a specific function in one or more processes in the flowcharts and/or in one or more blocks in the block diagrams.

These computer program instructions may alternatively be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

It is clear that a person skilled in the art can make various modifications and variations to this application without departing from the spirit and scope of this application. This application is intended to cover these modifications and variations of this application, provided that they fall within the scope of protection defined by the following claims and their equivalent technologies in this application.

What is claimed is:

1. An access control method, applied to a core network device, wherein the access control method comprises:

receiving an initial user equipment message from an access network device, wherein the initial user equipment message comprises: a first public land mobile network identity and information about a network supported by a first cell, wherein the information about the network supported by the first cell includes a closed access group identifier that corresponds to the first public land mobile network identity and that is supported by the first cell, and wherein the closed access group identifier identifies a public network integrated non-public network;

sending an initial context setup request message to the access network device, wherein the initial context setup request message comprises:

public network integrated non-public network identification information of the public network integrated non-public network accessible by a terminal device, and an indication of whether the terminal device is allowed to access a network only by using a closed access group cell.

2. The access control method according to claim 1, wherein the public network integrated non-public network identification information comprises the first public land mobile network identity and the closed access group identifier.

3. The access control method according to claim 1, wherein the information about the network supported by the first cell comprises non-access stratum information, and the non-access stratum information comprises the closed access group identifier.

4. An access control method, applied to an access network device, wherein the access control method comprises:

sending an initial user equipment message to a core network device, wherein the initial user equipment message comprises: a first public land mobile network identity and information about a network supported by a first cell, wherein the information about the network supported by the first cell includes a closed access group identifier that corresponds to the first public land mobile network identity and that is supported by the first cell, and wherein the closed access group identifier identifies a public network integrated non-public network;

receiving an initial context setup request message from the core network device, wherein the initial context setup request message comprises:

public network integrated non-public network identification information of the public network integrated non-public network accessible by a terminal device, and an indication of whether the terminal device is allowed to access a network only by using a closed access group cell.

5. The access control method according to claim 4, wherein the public network integrated non-public network identification information comprises the first public land mobile network identity and the closed access group identifier.

6. An access control apparatus, wherein the access control apparatus comprises:

at least one processor; and one or more memories coupled to the at least one processor and storing program instructions for execution by the at least one processor to:

receive an initial user equipment message from an access network device, wherein the initial user equipment message comprises: a first public land mobile network identity and information about a network supported by a first cell, wherein the information about the network supported by the first cell includes a closed access group identifier that corresponds to the first public land mobile network identity and that is supported by the first cell, and wherein the closed access group identifier identifies a public network integrated non-public network;

send an initial context setup request message to the access network device, wherein the initial context setup request message comprises:

public network integrated non-public network identification information of the public network integrated non-public network accessible by a terminal device, and an indication of whether the terminal device is allowed to access a network only by using a closed access group cell.

7. The access control apparatus according to claim 6, wherein the public network integrated non-public network identification information comprises the first public land mobile network identity and the closed access group identifier.

8. The access control apparatus according to claim 6, wherein the information about the network supported by the first cell comprises non-access stratum information, and the non-access stratum information comprises the closed access group identifier.

9. An access control apparatus, wherein the access control apparatus comprises:

at least one processor; and one or more memories coupled to the at least one processor and storing program instructions for execution by the at least one processor to:

send an initial user equipment message to a core network device, wherein the initial UE message comprises: a first public land mobile network identity and information about a network supported by a first cell, wherein the information about the network supported by the first cell includes a closed access group identifier that corresponds to the first public land mobile network identity and that is supported by the first cell, and wherein the closed access group identifier identifies a public network integrated non-public network;

receive an initial context setup request message from the core network device, wherein the initial context setup request message comprises:

public network integrated non-public network identification information of the public network integrated non-public network accessible by a terminal device, and an indication of whether the terminal device is allowed to access a network only by using a closed access group cell.

10. The access control apparatus according to claim 9, wherein the public network integrated non-public network identification information comprises the first public land mobile network identity and the closed access group identifier.

11. The access control apparatus according to claim 9, wherein the information about the network supported by the first cell comprises non-access stratum information, and the non-access stratum information comprises the closed access group identifier.

* * * * *